US011037525B2

(12) United States Patent
Shiokawa et al.

(10) Patent No.: US 11,037,525 B2
(45) Date of Patent: Jun. 15, 2021

(54) DISPLAY SYSTEM AND DATA PROCESSING METHOD

(71) Applicant: Semiconductor Energy Laboratory Co., Ltd., Kanagawa-ken (JP)

(72) Inventors: Masataka Shiokawa, Kanagawa (JP); Natsuko Takase, Kanagawa (JP); Hideaki Okamoto, Tokyo (JP); Kensuke Yoshizumi, Kanagawa (JP); Daiki Nakamura, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 0 days.

(21) Appl. No.: 16/625,983

(22) PCT Filed: Jun. 14, 2018

(86) PCT No.: PCT/IB2018/054352
§ 371 (c)(1),
(2) Date: Dec. 23, 2019

(87) PCT Pub. No.: WO2019/003026
PCT Pub. Date: Jan. 3, 2019

(65) Prior Publication Data
US 2020/0126510 A1    Apr. 23, 2020

(30) Foreign Application Priority Data

Jun. 27, 2017 (JP) .............................. JP2017-125173
Jul. 21, 2017 (JP) .............................. JP2017-141465

(51) Int. Cl.
*G09G 5/02* (2006.01)
*G09G 5/00* (2006.01)
*H04N 1/60* (2006.01)

(52) U.S. Cl.
CPC ............. *G09G 5/026* (2013.01); *G09G 5/003* (2013.01); *G09G 2360/145* (2013.01)

(58) Field of Classification Search
CPC combination set(s) only.
See application file for complete search history.

(56) References Cited

U.S. PATENT DOCUMENTS 6,061,477 A    5/2000  Lohmeyer et al.
6,219,022 B1   4/2001  Yamazaki et al.
(Continued)

FOREIGN PATENT DOCUMENTS

CN    001167965 A    12/1997
CN    001334554 A    2/2002
(Continued)

OTHER PUBLICATIONS

International Search Report re Application No. PCT/IB2018/054352, dated Oct. 2, 2018.
(Continued)

*Primary Examiner* — Wesner Sajous
(74) *Attorney, Agent, or Firm* — Husch Blackwell LLP

(57) ABSTRACT

A display system with high display quality in which display unevenness is reduced is provided. The display system includes a processing unit and a display portion. The processing unit generates second image data by using first image data. The display portion displays an image on the basis of the second image data. The processing unit includes three layers. The first image data is supplied to the first layer. The first image data contains a plurality of pieces of data. The plurality of pieces of data each correspond to any one of the plurality of pixels. The first layer generates first arithmetic data by making the number of data corresponding to one pixel larger than the number of the first image data by using the first image data. The second layer generates second
(Continued)

arithmetic data by multiplying the first arithmetic data by a weight coefficient. The third layer generates the second image data by making the number of data corresponding to one pixel smaller than the number of the second arithmetic data by using the second arithmetic data.

21 Claims, 42 Drawing Sheets

(56) References Cited

U.S. PATENT DOCUMENTS

| | | | |
|---|---|---|---|
| 7,674,650 B2 | 3/2010 | Akimoto et al. | |
| 7,732,819 B2 | 6/2010 | Akimoto et al. | |
| 7,910,490 B2 | 3/2011 | Akimoto et al. | |
| 7,932,521 B2 | 4/2011 | Akimoto et al. | |
| 8,003,989 B2 | 8/2011 | Nakajima et al. | |
| 8,023,055 B2 | 9/2011 | Nakajima et al. | |
| 8,274,077 B2 | 9/2012 | Akimoto et al. | |
| 8,629,069 B2 | 1/2014 | Akimoto et al. | |
| 8,654,270 B2 | 2/2014 | Nakajima et al. | |
| 8,669,550 B2 | 3/2014 | Akimoto et al. | |
| 8,796,069 B2 | 8/2014 | Akimoto et al. | |
| 9,041,875 B2 | 5/2015 | Nakajima et al. | |
| 9,099,562 B2 | 8/2015 | Akimoto et al. | |
| 9,640,630 B2 | 5/2017 | Nakajima et al. | |
| 9,934,826 B2 | 4/2018 | Kurokawa | |
| 2002/0009237 A1 | 1/2002 | Tezuka et al. | |
| 2002/0154089 A1 | 10/2002 | Yamazaki et al. | |
| 2008/0246781 A1 | 10/2008 | Surati et al. | |
| 2010/0208944 A1* | 8/2010 | Fukunishi | H04N 5/23229 382/107 |
| 2012/0139974 A1* | 6/2012 | Sakai | G09G 3/3426 345/690 |
| 2014/0225943 A1* | 8/2014 | Shiobara | G09G 3/3607 345/694 |
| 2014/0307079 A1* | 10/2014 | Aragaki | G06T 5/002 348/79 |
| 2017/0270405 A1 | 9/2017 | Kurokawa | |
| 2017/0301769 A1 | 10/2017 | Nakajima et al. | |
| 2018/0040107 A1* | 2/2018 | Hayashi | H04N 5/23245 |
| 2018/0045867 A1* | 2/2018 | Kunugise | H04N 1/407 |
| 2018/0061344 A1 | 3/2018 | Kurokawa | |
| 2019/0348011 A1 | 11/2019 | Kurokawa | |

FOREIGN PATENT DOCUMENTS

| | | |
|---|---|---|
| EP | 1 174 823 A2 | 1/2002 |
| JP | 08-305325 A | 11/1996 |
| JP | 2000-215305 A | 8/2000 |
| JP | 2000-511715 | 9/2000 |
| JP | 2001-053283 A | 2/2001 |
| JP | 2002-040985 A | 2/2002 |
| JP | 2002-281294 A | 9/2002 |
| JP | 2007-096055 A | 4/2007 |
| JP | 2007-123861 A | 5/2007 |
| JP | 2010-521705 | 6/2010 |
| JP | 2018-120217 A | 8/2018 |
| KR | 2002-0008768 A | 1/2002 |
| KR | 2009-0122377 A | 11/2009 |
| WO | WO 1997/039420 A1 | 10/1997 |
| WO | WO 2008/115464 A1 | 9/2008 |
| WO | WO 2018/134701 A1 | 7/2018 |

OTHER PUBLICATIONS

Written Opinion re Application No. PCT/IB2018/054352, dated Oct. 2, 2018.

* cited by examiner

200a

200a

200b

200b

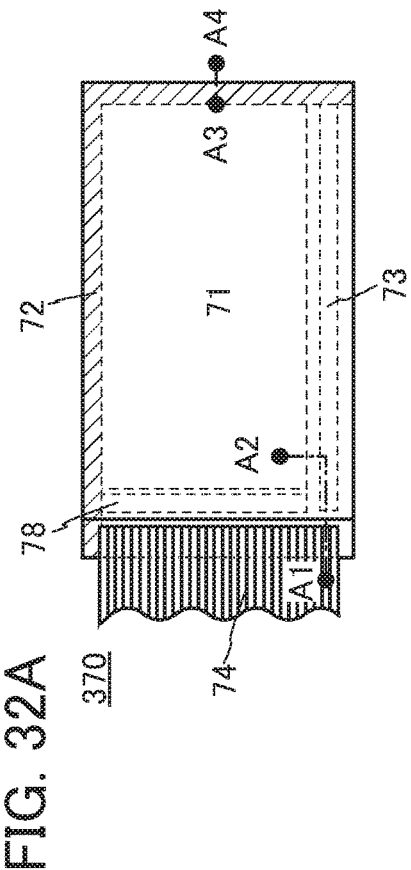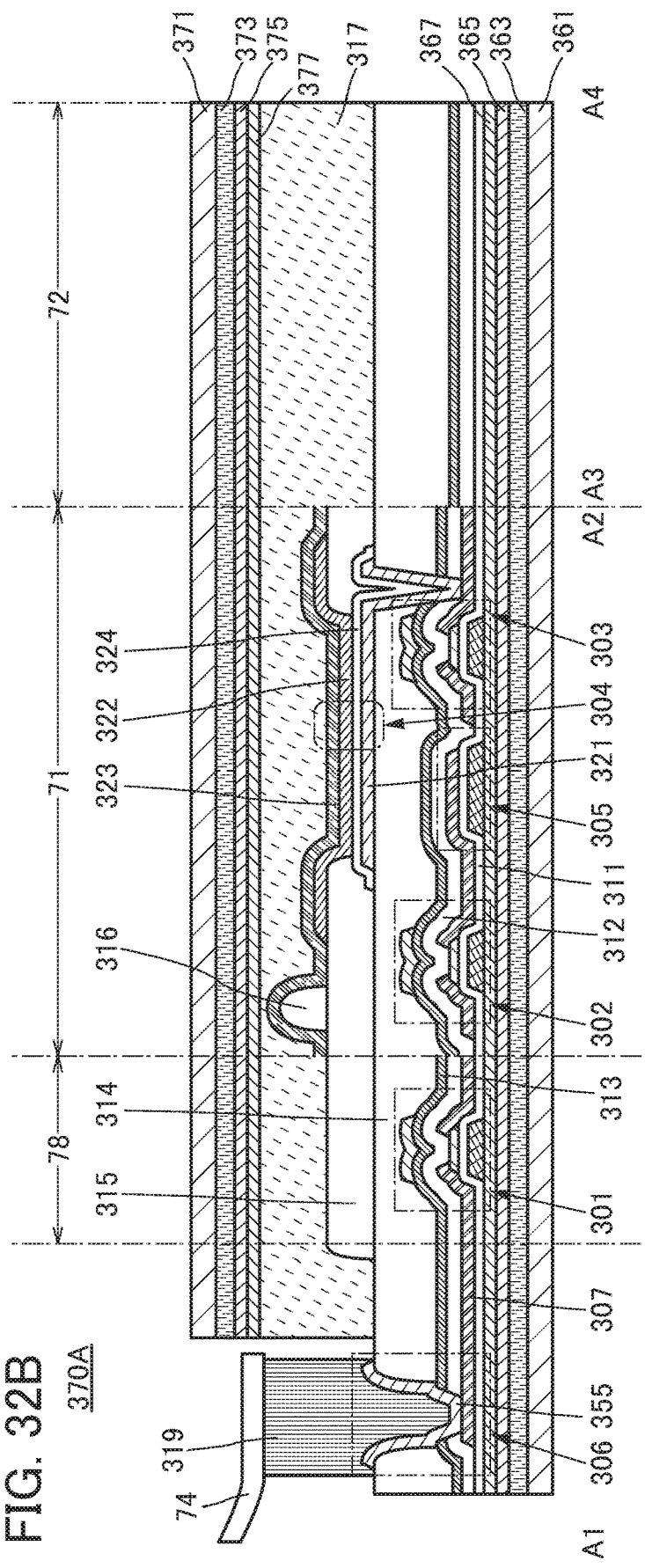

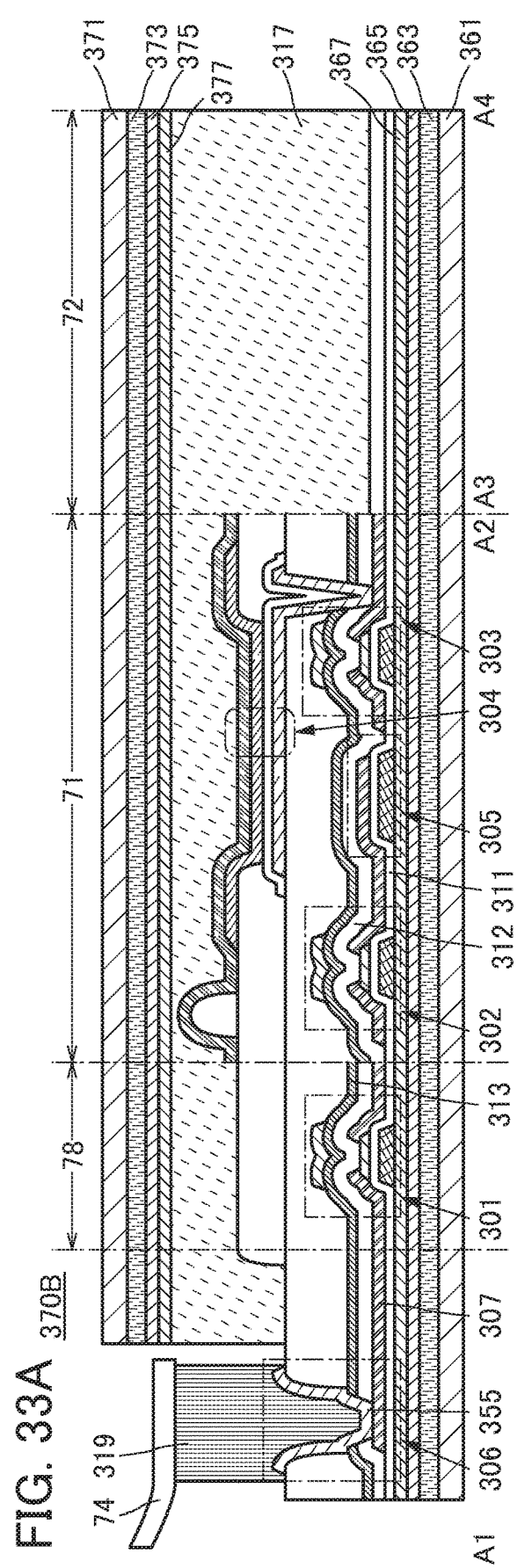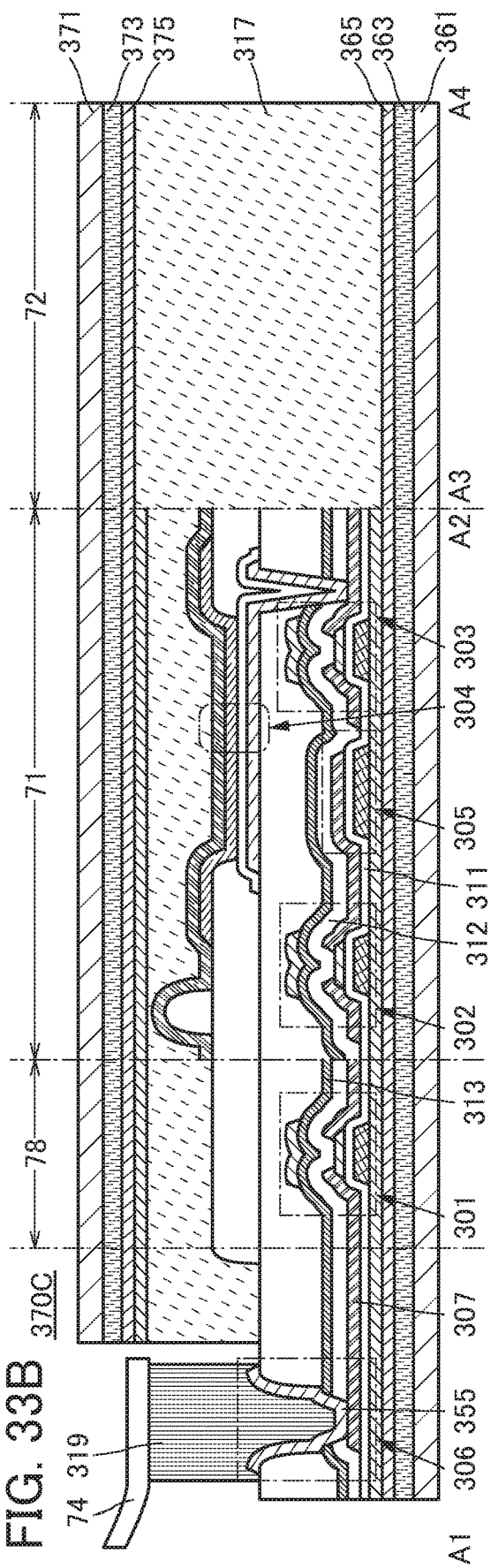

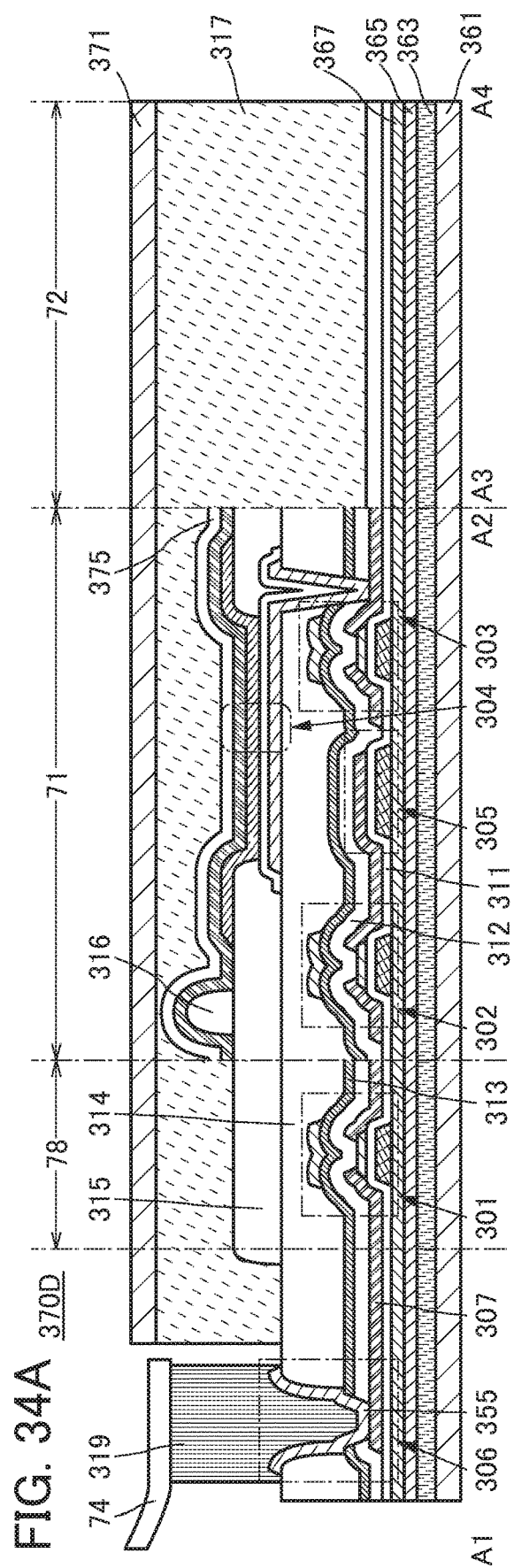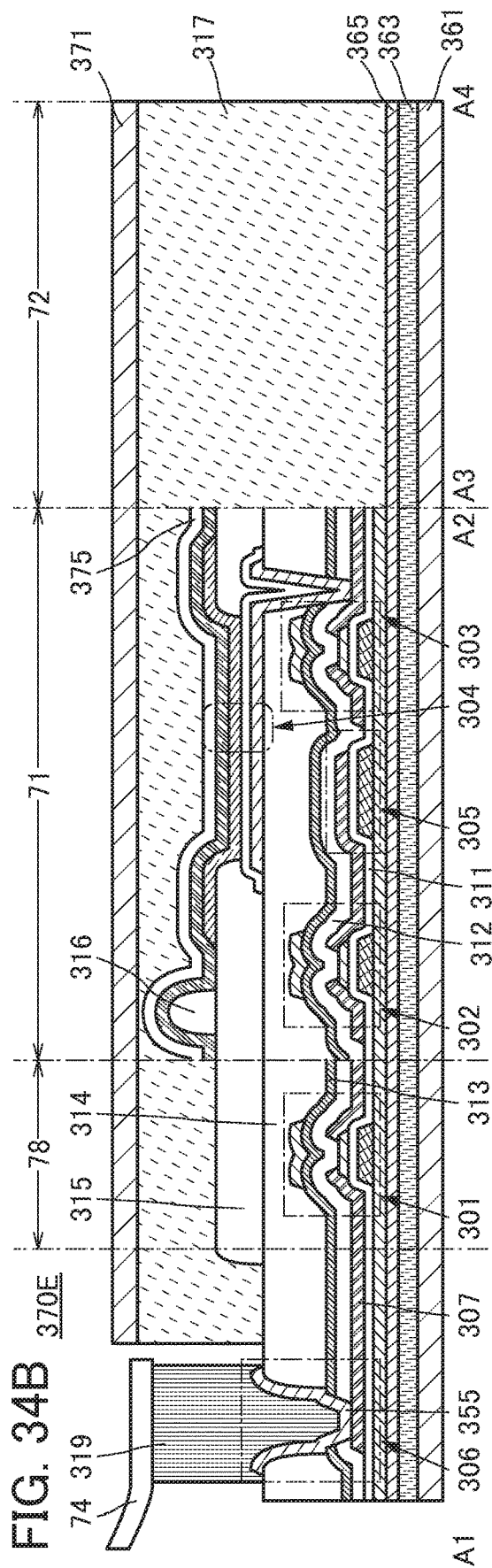

DISPLAY SYSTEM AND DATA PROCESSING METHOD

This application is a 371 of international application PCT/IB2018/054352 filed on Jun. 14, 2018 which is incorporated herein by reference.

TECHNICAL FIELD

One embodiment of the present invention relates to a display system and a data processing method.

Note that one embodiment of the present invention is not limited to the above technical field. Examples of the technical field of one embodiment of the present invention include a semiconductor device, a display device, a light-emitting device, a display system, an electronic device, a lighting device, an input device (e.g., a touch sensor), an input-output device (e.g., a touch panel), a driving method thereof, and a manufacturing method thereof.

In this specification and the like, a semiconductor device generally means a device that can function by utilizing semiconductor characteristics. A display device (e.g., a liquid crystal display device and a light-emitting display device), a projection device, a lighting device, an electro-optical device, a power storage device, a memory device, a semiconductor circuit, an imaging device, an electronic device, and the like may be referred to as a semiconductor device. Alternatively, they may include a semiconductor device.

BACKGROUND ART

In recent years, display devices with high resolution have been demanded. For example, display devices including a large number of pixels, such as full high definition (1920×1080 pixels), 4K (e.g., 3840×2160 pixels or 4096×2160 pixels), and 8K (e.g., 7680×4320 pixels or 8192×4320 pixels) display devices, have been actively developed.

Furthermore, larger display devices have been required. For example, the screen size of the mainstream home-use televisions has been 50 inches or more diagonally. A larger screen size allows a larger amount of information to be displayed at a time, and a further increase in screen size of digital signage and the like has been demanded.

Flat panel displays typified by liquid crystal display devices and light-emitting display devices are widely used as display devices. Although transistors used in such display devices are mainly formed using silicon as a semiconductor material, a technique in which a transistor formed using a metal oxide is used for a pixel of a display device has been developed in recent years.

Patent Document 1 discloses a technique in which amorphous silicon is used for a semiconductor material of a transistor. Patent Documents 2 and 3 each disclose a technique in which a metal oxide is used for a semiconductor material of a transistor.

REFERENCE

[Patent Document]
[Patent Document 1] Japanese Published Patent Application No. 2001-053283
[Patent Document 2] Japanese Published Patent Application No. 2007-123861
[Patent Document 3] Japanese Published Patent Application No. 2007-096055

An increase in the pixel of a display device produces the following problem: the influence of variation in the characteristics of transistors and variation in the characteristics of display elements is increased, which results in noticeable display unevenness.

In the case where a display device includes a plurality of display panels arranged to have a large display region, the problem is a noticeable boundary between the display panels due to variation in the characteristics of the display panels.

An object of one embodiment of the present invention is to provide a display device or a display system with high display quality. Another object of one embodiment of the present invention is to provide a display device or a display system in which display unevenness is reduced. Another object of one embodiment of the present invention is to provide a display device or a display system with high resolution. Another object of one embodiment of the present invention is to provide a display device or a display system having a large display region. Another object of one embodiment of the present invention is to provide a display device or a display system capable of operating at a high frame frequency. Another object of one embodiment of the present invention is to provide a display device or a display system with low power consumption.

Note that the descriptions of these objects do not disturb the existence of other objects. One embodiment of the present invention does not necessarily achieve all the objects. Other objects can be derived from the description of the specification, the drawings, and the claims.

DISCLOSURE OF INVENTION

A display system of one embodiment of the present invention includes a processing unit and a display portion. The processing unit has a function of generating second image data by using first image data. The display portion has a function of displaying an image on the basis of the second image data. The display portion includes a plurality of pixels. The processing unit includes a first layer, a second layer, and a third layer. The first image data is supplied to the first layer. The first image data contains a plurality of pieces of data. The plurality of pieces of data each correspond to any one of the plurality of pixels. The first layer has a function of generating first arithmetic data by making the number of data corresponding to one pixel larger than the number of the first image data by using the first image data. The second layer has a function of generating second arithmetic data by multiplying the first arithmetic data by a weight coefficient. The third layer has a function of generating the second image data by making the number of data corresponding to one pixel smaller than the number of the second arithmetic data by using the second arithmetic data.

A display system of one embodiment of the present invention includes a processing unit and a display portion. The processing unit has a function of generating second image data by using first image data. The display portion has a function of displaying an image on the basis of the second image data. The display portion includes a plurality of pixels. The processing unit includes a first layer, a second layer, and a third layer. The first image data is supplied to the first layer. The first layer has a function of generating first arithmetic data by using the first image data. The first layer has a function of supplying the first arithmetic data to the second layer. The second layer has a function of generating second arithmetic data by using the first arithmetic data and a weight coefficient. The second layer has a function of supplying the second arithmetic data to the third layer. The third layer has a function of generating the second image data by using the second arithmetic data. The first image data contains a pieces of first data corresponding to one pixel (a is an integer greater than or equal to 1). The first arithmetic data contains b pieces of second data corresponding to one pixel (b is an integer greater than a). The weight coefficient contains b pieces of third data corresponding to one pixel. The second arithmetic data contains b pieces of fourth data corresponding to one pixel. The second image data contains c pieces of fifth data corresponding to one pixel (c is an integer less than b). The fourth data is a product of any one piece of the second data and any one piece of the third data.

The display portion may further include a first display region, a second display region, a first driver circuit, and a second driver circuit. The first driver circuit has a function of driving the first display region. The second driver circuit has a function of driving the second display region.

The processing unit may have a function of correcting only data corresponding to part of the pixels among the first image data.

The processing unit may have a function of generating the second image data by using a neural network.

The processing unit may further include a neural network circuit.

The processing unit may further include a transistor containing a metal oxide in a channel formation region or a transistor containing silicon in a channel formation region.

One embodiment of the present invention is an electronic device including the display system having any one of the above structures and at least any one of an antenna, a battery, a housing, a camera, a speaker, a microphone, and an operation button.

One embodiment of the present invention is a data processing method including the steps of obtaining first luminance data based on an image displayed on a display device by inputting first image data to the display device and updating a value of a correction filter for correcting image data by using the first luminance data.

One embodiment of the present invention is a data processing method including the steps of obtaining first luminance data based on an image displayed on a display device by inputting first image data to the display device, updating a value of a correction filter for correcting image data by using the first luminance data, generating second image data by correcting the first image data by the correction filter whose value is updated by using the first luminance data, obtaining second luminance data based on an image displayed on the display device by inputting the second image data to the display device, and updating a value of the correction filter by using the second luminance data.

For example, the first image data contains coordinate data and gray level data of a first color. The gray level data of the first color includes a plurality of gray level values corresponding to different coordinates. When the number of gray levels that can be expressed by the gray level data of the first color is k bits, the plurality of gray level values are each greater than or equal to $2^{k-2}$ and less than or equal to $3 \times 2^{k-2}$, where k is an integer greater than or equal to 2. The plurality of gray level values are preferably the same value.

The first image data may further contain gray level data of a second color and gray level data of a third color. The gray level data of the second color includes a plurality of gray level values corresponding to the different coordinates. The gray level data of the third color includes a plurality of gray level values corresponding to the different coordinates.

The plurality of gray level values of the gray level data of the second color and the plurality of gray level values of the gray level data of the third color are preferably 0. Alternatively, when the number of gray levels that can be expressed by the gray level data of the second color is m bits (m is an integer greater than or equal to 2), the plurality of gray level values of the gray level data of the second color are preferably each greater than or equal to $2^{m-2}$ and less than or equal to $3 \times 2^{m-2}$. Similarly, when the number of gray levels that can be expressed by the gray level data of the third color is n bits (n is an integer greater than or equal to 2), the plurality of gray level values of the gray level data of the third color are preferably each greater than or equal to $2^{n-2}$ and less than or equal to $3 \times 2^{n-2}$. The plurality of gray level values of the gray level data of the second color are preferably the same value and the plurality of gray level values of the gray level data of the third color are preferably the same value.

The first luminance data is preferably obtained with a two-dimensional luminance meter.

One embodiment of the present invention is a display system including a processing unit and a display portion. The processing unit has a function of generating output data by using image data and a correction filter whose value is updated by the data processing method according to any of the above structures. The display portion has a function of displaying an image on the basis of the output data.

One embodiment of the present invention can provide a display device or a display system with high display quality. Another embodiment of the present invention can provide a display device or a display system in which display unevenness is reduced. Another embodiment of the present invention can provide a display device or a display system with high resolution. Another embodiment of the present invention can provide a display device or a display system having a large display region. Another embodiment of the present invention can provide a display device or a display system capable of operating at a high frame frequency. Another embodiment of the present invention can provide a display device or a display system with low power consumption.

Note that the descriptions of these effects do not preclude the existence of other effects. One embodiment of the present invention does not necessarily achieve all the effects. Other effects can be derived from the description of the specification, the drawings, and the claims.

BRIEF DESCRIPTION OF DRAWINGS

In the accompanying drawings:

FIGS. 14B-1 and 14B-2 illustrate an example of processing performed in the display device;

FIGS. 32A and 32B illustrate a structure example of a display panel;

FIGS. 33A and 33B illustrate a structure example of a display panel;

FIGS. 34A and 34B illustrate a structure example of a display panel;

BEST MODE FOR CARRYING OUT THE INVENTION

Figure 1A:
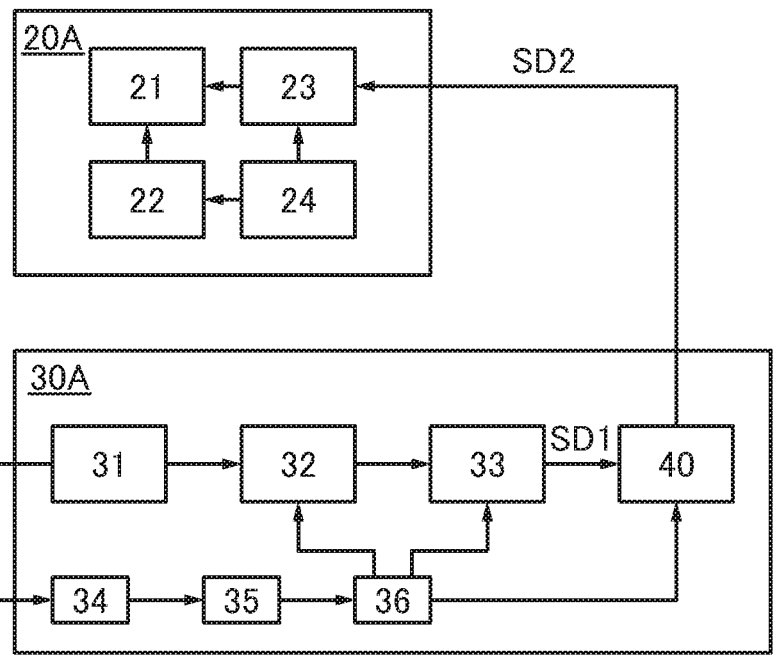
FIGS. 1A and 1B illustrate examples of a display system.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in the structures of the present invention described below, the same portions or portions having similar functions are denoted by the same reference numerals in common in different drawings and repetitive description thereof will be omitted. Further, the same hatching pattern is applied to portions having similar functions, and the portions are not especially denoted by reference numerals in some cases.

The position, size, range, or the like of each structure illustrated in drawings is not accurately represented in some cases for easy understanding. Therefore, the disclosed invention is not necessarily limited to the position, size, range, or the like disclosed in the drawings.

Note that the terms "film" and "layer" can be interchanged with each other depending on the case or circumstances. For example, the term "conductive layer" can be changed into the term "conductive film". Also, the term "insulating film" can be changed into the term "insulating layer".

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is called an oxide semiconductor in some cases. In other words, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

Embodiment 1

In this embodiment, a display system of one embodiment of the present invention will be described with reference to FIGS. 1A and 1B, FIG. 2, FIG. 3, FIG. 4, FIGS. 5A to 5C, FIG. 6, FIG. 7, FIG. 8, FIG. 9, FIG. 10, FIG. 11, FIGS. 12A and 12B, FIGS. 13A to 13C, and FIGS. 14A, 14B-1, and 14B-2.

The display system of one embodiment of the present invention includes a processing unit and a display portion. The processing unit has a function of generating second image data by using first image data. The display portion has a function of displaying an image on the basis of the second image data. The display portion includes a plurality of pixels. The processing unit includes a first layer, a second layer, and a third layer. The first image data is supplied to the first layer. The first image data contains a plurality of pieces of data. The plurality of pieces of data each correspond to any one of the plurality of pixels. The first layer has a function of generating first arithmetic data by making the number of data corresponding to one pixel larger than the number of the first image data by using the first image data. The second layer has a function of generating second arithmetic data by multiplying the first arithmetic data by a weight coefficient. The third layer has a function of generating the second image data by making the number of data corresponding to one pixel smaller than the number of the second arithmetic data by using the second arithmetic data.

When the first image data contains a pieces of first data corresponding to one pixel (a is an integer greater than or equal to 1), for example, the first layer generates the first arithmetic data containing b pieces of second data corresponding to one pixel (b is an integer greater than a). Next, the second layer generates the second arithmetic data by using the first arithmetic data and a weight coefficient. The weight coefficient contains b pieces of third data corresponding to one pixel. The second arithmetic data contains b pieces of fourth data corresponding to one pixel. That is, the number of the data corresponding to one pixel for the second arithmetic data is the same as that for the first arithmetic data. The fourth data is a product of any one piece of the second data and any one piece of the third data. The third layer generates the second image data containing c pieces of fifth data corresponding to one pixel (c is an integer less than b) by using the second arithmetic data.

A larger number of data corresponding to one pixel leads to a larger number of parameters used for correction of image data. Thus, the accuracy of image correction can be improved. When image data is corrected by such a processing unit including three layers, a picture with inconspicuous display unevenness or an inconspicuous junction can be displayed on the display portion.

<1-1. Configuration Example 1 of Display System>

FIG. 1A is a block diagram of a display system 10A.

The display system 10A has a function of generating image data by using data received from the outside and displaying a picture on the basis of the image data.

The display system 10A includes a display portion 20A and a signal generation portion 30A. The signal generation portion 30A has a function of generating image data by using data received from the outside. The display portion 20A has a function of displaying a picture on the basis of the image data.

The display portion 20A includes a pixel portion 21, a scan line driver circuit 22 (also referred to as a gate driver), a signal line driver circuit 23 (also referred to as a source driver), and a timing controller 24.

The signal generation portion 30A includes a front end portion 31, a decoder 32, a first processing unit 33, a receiving portion 34, an interface 35, a control portion 36, and a second processing unit 40.

Figure 1B:
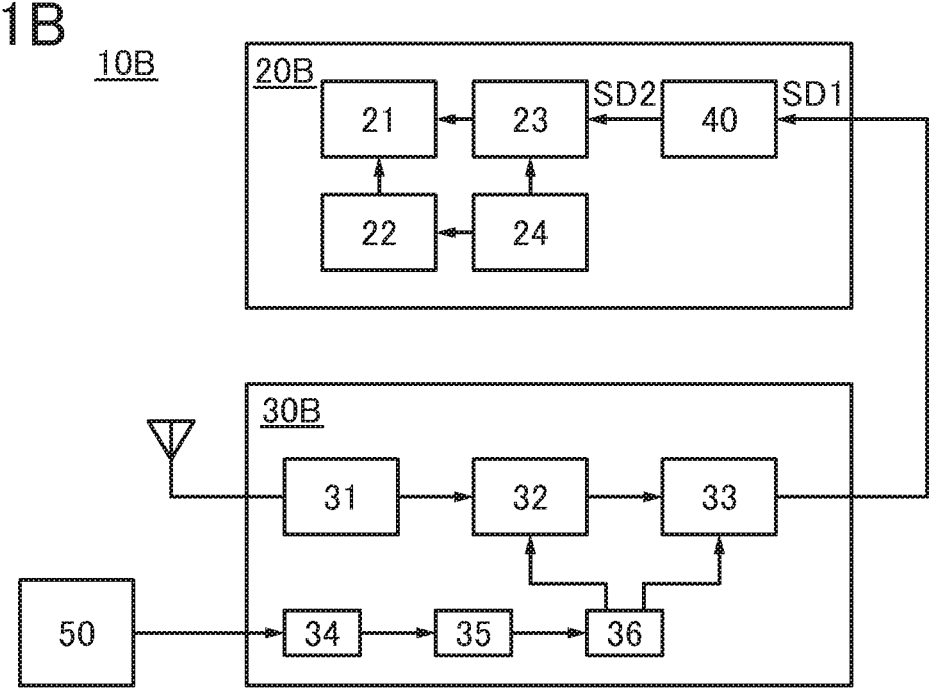

As in a display system 10B illustrated in FIG. 1B, the second processing unit 40 may be included not in a signal generation portion 30B but in a display portion 20B. Alternatively, the second processing unit 40 may be provided separately from the display portion and the signal generation portion.

Components of the display portion 20A and the signal generation portion 30A will be described below. Note that the components can be included in the display portion 20B and the signal generation portion 30B.

The pixel portion 21 includes a plurality of pixels. The pixel portion 21 has a function of displaying a picture.

The pixel includes a display element and has a function of displaying a predetermined gray level. The gray level of the pixel is controlled with signals supplied from the scan line driver circuit 22 and the signal line driver circuit 23, so that the pixel portion 21 displays a predetermined picture.

The scan line driver circuit 22 has a function of supplying a signal for selecting the pixel (this signal is also referred to as a selection signal) to the pixel portion 21.

The signal line driver circuit 23 has a function of supplying a signal for displaying a predetermined gray level on the pixel (this signal is also referred to as a video signal) to the pixel portion 21. When a video signal is supplied to the pixel to which a selection signal has been supplied, the pixel displays a predetermined gray level and the pixel portion 21 displays a predetermined picture.

The timing controller 24 has a function of generating a timing signal (a clock signal, a start pulse signal, or the like) used in the scan line driver circuit 22, the signal line driver circuit 23, or the like. One or both of the timing for outputting a selection signal from the scan line driver circuit 22 and the timing for outputting a video signal from the signal line driver circuit 23 is/are controlled by the timing signal generated by the timing controller 24. In the case where the display portion 20A includes the plurality of scan line driver circuits 22, the timings for outputting signals from the plurality of scan line driver circuits 22 are synchronized by the timing signal generated by the timing controller 24. Similarly, in the case where the display portion 20A includes the plurality of signal line driver circuits 23, the timings for outputting signals from the plurality of signal line driver circuits 23 are synchronized by the timing signal generated by the timing controller 24.

The front end portion 31 has a function of performing signal processing as appropriate in response to a signal input from the outside. For example, a broadcast signal encoded by a predetermined method and modulated, or the like is input to the front end portion 31. The front end portion 31 can have a function of demodulating a received video signal and an analog-digital conversion function, for example. Furthermore, the front end portion 31 may also have a function of correcting an error. Data that is received by the front end portion 31 and subjected to the signal processing is output to the decoder 32.

The decoder 32 has a function of decoding an encoded signal. In the case where image data contained in a broadcast signal input to the front end portion 31 has been compressed, the data is decompressed by the decoder 32. For example, the decoder 32 can have a function of performing entropy decoding, inverse quantization, inverse orthogonal transform such as inverse discrete cosine transform (IDCT) or inverse discrete sine transform (IDST), intra-frame prediction, inter-frame prediction, and the like.

As a coding standard in 8K broadcasts, a standard of H.265/MPEG-H high efficiency video coding (hereinafter referred to as HEVC) is employed. In the case where the image data included in the broadcast signal input to the front end portion 31 is encoded according to HEVC, decoding according to HEVC is performed by the decoder 32. Image data generated by the decoding process by the decoder 32 is output to the first processing unit 33.

The first processing unit 33 has a function of performing image processing on the image data input from the decoder 32, generating first image data SD1, and outputting the first image data SD1 to the second processing unit 40.

Examples of the image processing are noise removal processing, gray level transformation processing, tone correction processing, luminance correction processing, and the like. The tone correction processing or the luminance correction processing can be performed with the use of gamma correction or the like. Furthermore, the first processing unit 33 may have a function of pixel interpolation processing accompanying up-conversion of the resolution, a function of frame interpolation processing accompanying up-conversion of the frame frequency, or the like.

The noise removing processing is removal of various noise, such as mosquito noise which appears near outline of texts and the like, block noise which appears in high-speed moving images, random noise which causes flicker, and dot noise caused by up-conversion of the resolution.

The gray level transformation processing is processing in which the gray levels of the first image data SD1 are transformed into gray levels corresponding to output characteristics of the display portion 20A. For example, in the case where the number of gray levels is increased, gray level values corresponding to pixels are interpolated to input image data with a small number of gray levels and assigned to the pixels, so that processing of histogram smoothing can be performed. In addition, high-dynamic range (HDR) processing which increases the dynamic range is also included in the gray level transformation processing.

The tone correction processing is processing in which the tone of a picture is corrected. The luminance correction processing corrects the brightness (luminance contrast) of a picture. The luminance and tone of a picture displayed on the display portion 20A are corrected to be optimal, in accordance with the kind, luminance, or color purity of lighting of a room in which the display portion 20A is provided, for example.

The pixel interpolation processing is processing in which data that does not originally exist is interpolated when resolution up-conversion is performed. For example, as data of the colors of a pixel that is newly interpolated (e.g., the gray level values corresponding to the colors, red (R), green (G), and blue (B)), data is interpolated to be data of the color intermediate between the colors of pixels around the pixel with reference to data of the colors of the pixels around the pixel.

The frame interpolation processing is processing in which an image for a frame that does not exist originally (an interpolation frame) is generated in the case where the frame frequency of a picture to be displayed is increased. For example, an image for an interpolation frame which is interposed between two images is generated from a difference between the two images. Alternatively, images for a plurality of interpolation frames can be generated between two images. For example, when the frame frequency of image data is 60 Hz, a plurality of interpolation frames are generated, so that the frame frequency of a video signal output to the display portion 20A can be increased twofold (120 Hz), fourfold (240 Hz), eightfold (480 Hz), or the like.

Note that it is also possible to perform the above image processing by a processing unit which is provided separately from the first processing unit 33. One or more of the image processing may be performed by the second processing unit 40.

The receiving portion 34 has a function of receiving data or a control signal input from the outside. The input of the data or the control signal to the receiving portion 34 can be performed with an arithmetic processing device 50, a remote controller, a portable information terminal (e.g., a smartphone or a tablet), an operation button or a touch panel provided on the display portion 20A, or the like.

The arithmetic processing device 50 can supply a weight coefficient used in the second processing unit 40 or the like to the display system 10A. As the arithmetic processing device 50, a calculator having high arithmetic processing properties, such as a computer, a server, or a cloud, can be used. The arithmetic processing device 50 can supply a weight coefficient obtained by learning to the second processing unit 40 through the receiving portion 34.

The interface 35 has a function of performing signal processing on the data or the control signal received by the receiving portion 34 as appropriate and outputting the data or the signal to the control portion 36.

The control portion 36 has a function of supplying the control signals to the circuits included in the signal generation portion 30A. For example, the control portion 36 has a function of supplying the control signals to the decoder 32, the first processing unit 33, and the second processing unit 40. The control by the control portion 36 can be performed on the basis of the control signal received by the receiving portion 34 or the like.

The second processing unit 40 has a function of generating second image data SD2 by correcting the first image data SD1 input from the first processing unit 33. The second image data SD2 generated by the second processing unit 40 is output to the signal line driver circuit 23.

For example, the second processing unit 40 has a function of correcting the first image data SD1 to make display unevenness of the pixel portion 21 hardly visible. For example, there might occur display unevenness because of a variation in transistor characteristics or capacitor size in the pixel portion 21, an adverse effect by the parasitic resistance or parasitic capacitance of signal lines, an in-plane variation in the drive capability of the signal line driver circuit 23, an in-plane variation in display element characteristics, and the like. Even in this case, the second image data SD2 generated by the second processing unit 40 enables a picture with inconspicuous unevenness to be displayed.

Furthermore, in the case where the pixel portion 21 is divided into a plurality of regions, for example, the second processing unit 40 has a function of correcting the first image data SD1 so as to compensate for the picture discontinuity at the boundary between the regions. The second image data SD2 generated by the second processing unit 40 enables a picture with inconspicuous unevenness to be displayed.

<1-2. Configuration Example 1 of Pixel Portion>

The division of the pixel portion 21 and compensation at the junction by the second processing unit 40 will be described below in detail.

In the case where many pixels 25 are provided in the pixel portion 21 to display a high-resolution picture, the length of scan lines and signal lines is increased, which causes an increase in parasitic resistance due to the scan lines and the signal lines. Furthermore, the scan lines and the signal lines are provided so as to intersect with each other. Therefore, when the number of the pixels 25 is increased, the number of intersections is also increased, causing an increase in parasitic capacitance formed by the scan lines and the signal lines.

In such a case, a configuration in which the pixel portion is divided into a plurality of regions and a scan line driver circuit and a signal line driver circuit are provided for each region can be employed. With such a configuration, the length of one scan line or one signal line connected to one driver circuit can be shortened, which can reduce parasitic resistance and parasitic capacitance and thereby enables a quick supply of signals. Thus, a high-resolution picture can be precisely displayed.

In the case where the resolution of the display device is 8K, the resolution of one region of the pixel portion that is divided into four regions is 4K, for example. Thus, one 8K display device can be driven by using a plurality of IC chips (also simply referred to as ICs) and a plurality of printed circuit boards (also referred to as PCBs) that are for 4K display devices. That is, the IC, the printed circuit board, and the like that are for 4K display devices can be used for the 8K display device, and a technique relating to a display device with lower resolution can be effectively used.

Figure 2:
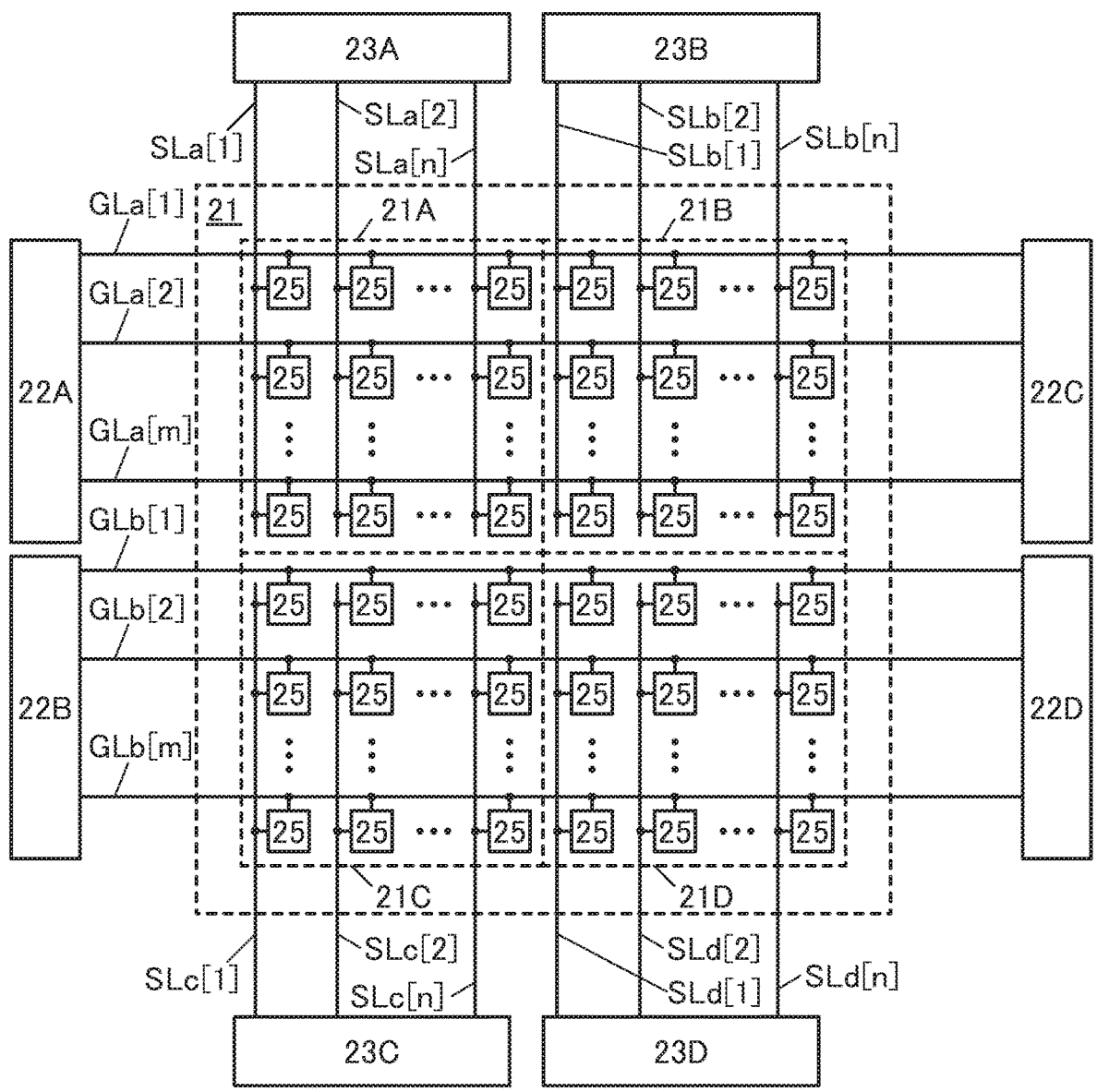
FIG. 2 illustrates an example of a display portion.

FIG. 2 illustrates a configuration example of the display portion 20 in which the pixel portion 21 is divided into four regions.

The display portion 20 includes the pixel portion 21, four scan line driver circuits 22 (scan line driver circuits 22A, 22B, 22C, and 22D), and four signal line driver circuits 23 (signal line driver circuits 23A, 23B, 23C, and 23D).

The pixel portion 21 includes the plurality of pixels 25 as illustrated in FIG. 2. FIG. 2 illustrates an example in which the pixel portion 21 includes the plurality of pixels 25 arranged in a matrix of 2m rows and 2n columns (m and n are each an integer greater than or equal to 1).

The pixel portion 21 is divided into four regions (regions 21A, 21B, 21C, and 21D). The four regions each include the plurality of pixels 25 arranged in a matrix of m rows and n columns.

The display portion 20 includes 2m scan lines GL (also referred to as selection signal lines, gate lines, or the like). Specifically, the display portion 20 includes m scan lines GLa and m scan lines GLb. The m scan lines GLa and the m scan lines GLb each extend in the row direction. The m scan lines GLa are each electrically connected to the plurality of pixels 25 arranged in the row direction in the region 21A and the region 21B. The m scan lines GLb are each electrically connected to the plurality of pixels 25 arranged in the row direction in the region 21C and the region 21D.

In this specification and the like, the scan line GLa electrically connected to the pixels 25 in the i-th row (i is an integer greater than or equal to 1 and less than or equal to m) in the region 21A and the region 21B is referred to as a scan line GLa[i]. Similarly, the scan line GLb electrically connected to the pixels 25 in the i-th row (i is an integer greater than or equal to 1 and less than or equal to m) in the region 21C and the region 21D is referred to as a scan line GLb[i].

One end of the scan line GLa is electrically connected to the scan line driver circuit 22A and the other end of the scan line GLa is electrically connected to the scan line driver circuit 22C. That is, the scan line driver circuit 22A and the scan line driver circuit 22C face each other with the region 21A and the region 21B positioned therebetween. Similarly, one end of the scan line GLb is electrically connected to the scan line driver circuit 22B and the other end of the scan line GLb is electrically connected to the scan line driver circuit 22D. That is, the scan line driver circuit 22B and the scan line driver circuit 22D face each other with the region 21C and the region 21D positioned therebetween.

The scan line driver circuits 22A and 22C have a function of supplying a selection signal to the scan line GLa. The scan line driver circuits 22B and 22D have a function of supplying a selection signal to the scan line GLb. The wirings GL each have a function of transferring, to the pixel 25, a selection signal supplied from the scan line driver circuit 22. In this case, the timings for outputting selection signals from the scan line driver circuits 22A and 22C are synchronized, and the timings for outputting selection signals from the scan line driver circuits 22B and 22D are synchronized.

The scan line driver circuits 22A and 22C each have a function of sequentially supplying selection signals to scan lines GLa[1] to GLa[m]. In other words, the scan line driver circuits 22A and 22C each have a function of sequentially scanning the scan lines GLa[1] to GLa[m]. After being performed up to the scan line GLa[m], scanning is sequentially performed again from the scan line GLa[1]. Similarly, the scan line driver circuits 22B and 22D each have a function of sequentially supplying selection signals to scan lines GLb[1] to GLb[m].

Two scan line driver circuits 22 simultaneously supply selection signals to one scan line GL, so that capability of supplying the selection signals to the scan line can be improved. Note that in the case where the transmission of selection signals is not hindered, one of the scan line driver circuits 22A and 22C and one of the scan line driver circuits 22B and 22D can be omitted.

The display portion 20 includes 4n signal lines SL (also referred to as video signal lines, source lines, or the like). Specifically, the display portion 20 includes n signal lines SLa, n signal lines SLb, n signal lines SLc, and n signal lines SLd. The n signal lines SLa, the n signal lines SLb, the n signal lines SLc, and the n signal lines SLd each extend in the column direction. The n signal lines SLa are each electrically connected to the plurality of pixels 25 arranged in the column direction in the region 21A. Similarly, the signal lines SLb, SLc, and SLd are electrically connected to the pixels 25 arranged in the column direction in the regions 21B, 21C, and 21D, respectively.

In this specification and the like, the signal line SLa electrically connected to the pixels 25 in the j-th column (j is an integer greater than or equal to 1 and less than or equal to n) in the region 21A is referred to as a signal line SLa[j]. Similarly, the signal lines SLb, SLc, and SLd electrically connected to the pixels 25 in the j-th column in the respective regions 21B, 21C, and 21D are referred to as signal lines SLb[j], SLc[j], and SLd[j], respectively.

The signal line SLa is electrically connected to the signal line driver circuit 23A. Similarly, the signal lines SLb, SLc, and SLd are electrically connected to the signal line driver circuits 23B, 23C, and 23D, respectively.

The signal line driver circuit 23A has a function of supplying a video signal to the signal line SLa. Similarly, the signal line driver circuits 23B, 23C, and 23D have a function of supplying a video signal to the signal lines SLb, SLc, and SLd, respectively. The signal lines SL each have a function of transmitting, to the pixel 25, the video signal supplied from the signal line driver circuit 23.

In FIG. 2, the upper region in the pixel portion 21 is divided into the regions 21A and 21B, and the lower region in the pixel portion 21 is divided into the regions 21C and 21D. In this case, the timings for outputting video signals from the signal line driver circuits 23A and 23B are synchronized, and the timings for outputting video signals from the signal line driver circuits 23C and 23D are synchronized. Alternatively, the timings for outputting video signals from the signal line driver circuits 23A, 23B, 23C, and 23D may be synchronized. Note that the signal line driver circuits which supply video signals to the regions 21A and 21B may be formed by a circuit in which the signal line driver circuits 23A and 23B are integrated. The signal line driver circuits which supply video signals to the regions 21C and 21D may be formed by a circuit in which the signal line driver circuits 23C and 23D are integrated. Furthermore, the signal line driver circuits 23A, 23B, 23C, and 23D may each be formed of a plurality of signal line driver circuits.

The pixel 25 includes a display element. Examples of the display element in the pixel 25 include a liquid crystal element and a light-emitting element. As the liquid crystal element, a transmissive liquid crystal element, a reflective liquid crystal element, a transflective liquid crystal element, or the like can be used. Examples of the light-emitting element include self-luminous light-emitting elements such as an organic light-emitting diode (OLED), a light-emitting diode (LED), a quantum-dot light-emitting diode (QLED), and a semiconductor laser. As the display element, a Micro Electro Mechanical Systems (MEMS) shutter element, an optical interference type MEMS element, a display element using a microcapsule method, an electrophoretic method, an electrowetting method, an Electronic Liquid Powder (registered trademark) method, or the like can be used.

The number of the pixels 25 can be set freely. In order to display a high-resolution picture, it is preferable to arrange many pixels. For example, the number of provided pixels is preferably more than or equal to 1920×1080 in the case where a 2K picture is displayed. Furthermore, the number of provided pixels is preferably more than or equal to 3840×2160 or more than or equal to 4096×2160 in the case where a 4K picture is displayed. Moreover, the number of provided pixels is preferably more than or equal to 7680×4320 or more than or equal to 8192×4320 in the case where an 8K picture is displayed. Moreover, a larger number of pixels 25 can be provided in the pixel portion 21.

Although an example in which the pixel portion 21 is divided into four regions is illustrated in FIG. 2, the division number is not particularly limited and can be set freely.

In the case where the pixel portion 21 is divided into the plurality of regions as illustrated in FIG. 2, the picture continuity at a junction between the two regions is preferably ensured. However, an error of the gray level displayed by the pixels 25 tends to occur particularly at the junction and in the vicinity thereof owing to the influence of the parasitic resistance or parasitic capacitance of the signal lines SL or the like.

Figure 3:
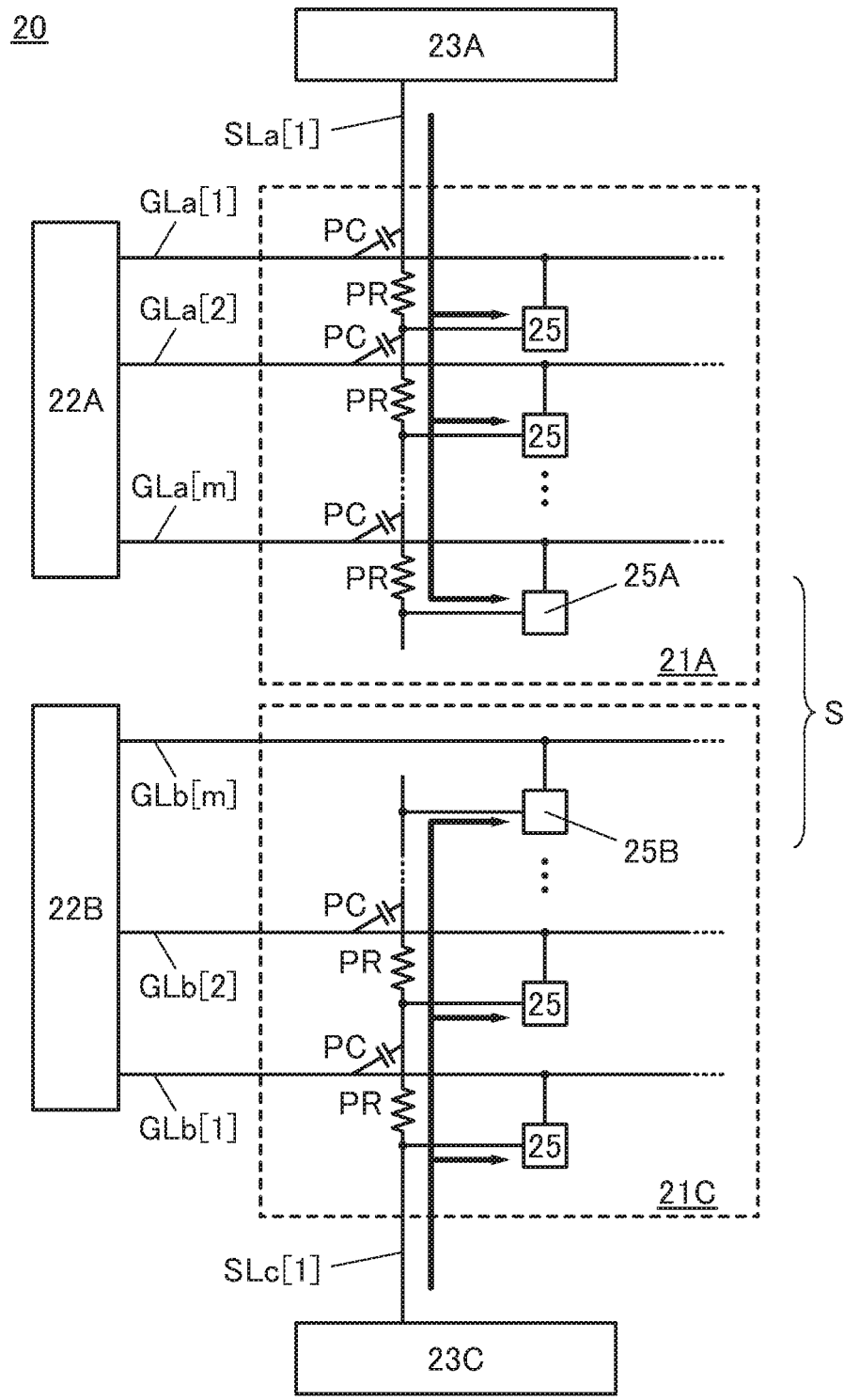
FIG. 3 illustrates an operation example of a display portion.

As an example, a case in which video signals are supplied to signal lines SLa[1] and SLc[1] as illustrated in FIG. 3 is considered. Here, parasitic resistance PR, parasitic capacitance PC formed at the intersections of the signal lines SL and the scan lines GL or the like, or the like is added to the signal lines SL. More specifically, as the distance between the pixel 25 and the signal line driver circuit 23 is longer and the path of a video signal in the signal line SL is longer, the parasitic resistance PR increases. Moreover, as the number of intersections of the scan lines GL and the signal lines SL is larger, the parasitic capacitance PC increases. The increase in the parasitic resistance PR or the parasitic capacitance PC delays the video signal, for example, and an error might be caused in the video signal supplied to the pixels 25.

The error of the video signal reaches its maximum when the video signal is supplied to the pixel 25 which is positioned farthest from the signal line driver circuit 23 (pixels 25A and 25B in the drawing). Thus, picture discontinuity tends to occur particularly in the region where such pixels 25 are adjacent to each other (a region S in the drawing).

Alternatively, to ensure the picture continuity, the pulse width of selection signals can be determined in consideration of the pixels 25A and 25B provided in the vicinity of the ends of the signal lines SL. However, in this case, the selection period for all the pixels 25 has to be long, increasing the time required to select all the rows. This lengthens the time required to update the picture and accordingly lowers the operation speed.

Here, the display system of one embodiment of the present invention includes the second processing unit 40 having a function of correcting a video signal by utilizing artificial intelligence (AI). Specifically, the second processing unit 40 can correct the video signal so as to relieve the picture discontinuity at a junction between two regions. This makes it possible to display the picture with an inconspicuous junction, so that the display quality of the display portion 20 can be improved.

Note that artificial intelligence refers to a computer that imitates the intelligence of human beings. For example, an artificial neural network (ANN) can be used for the second processing unit 40. The artificial neural network is a circuit that imitates a neural network composed of neurons and synapses, and is a kind of artificial intelligence. In this specification and the like, the term "neural network" particularly refers to the artificial neural network.

<1-3. Configuration Example of Second Processing Unit 40>

Figure 4:
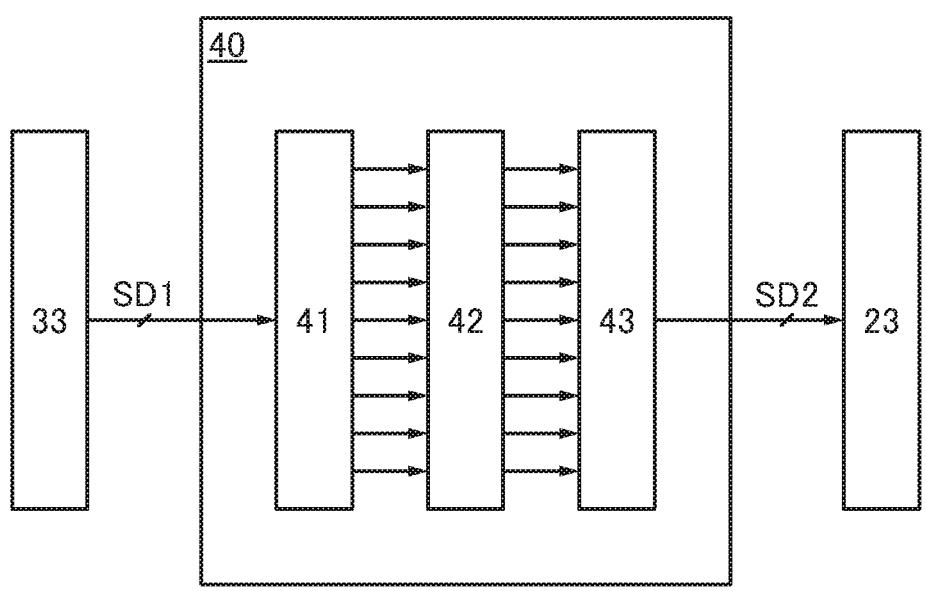
FIG. 4 illustrates an example of a processing unit.

FIG. 4 illustrates a configuration example of the second processing unit 40.

The second processing unit 40 includes a first layer 41, a second layer 42, and a third layer 43. The second processing unit 40 has a function of generating the second image data SD2 by correcting the input first image data SD1.

The first layer 41 can generate arithmetic data containing a larger amount of data than the first image data SD1 by using the input first image data SD1. In the case where the first image data SD1 contains three kinds of data (data for red (R), data for green (G), and data for blue (B)) for one pixel, for example, the first layer 41 generates arithmetic data containing four or more kinds of data for one pixel. Thus, the accuracy of correction in the second processing unit 40 can be improved.

The second layer 42 can multiply the arithmetic data generated in the first layer 41 by a weight coefficient. For example, filter processing can be performed in the second layer 42.

The third layer 43 can generate the second image data SD2 containing a smaller amount of data than the arithmetic data, which has been multiplied by a weight coefficient in the second layer 42, by using the arithmetic data. The number of data contained in the second image data SD2 can be determined in accordance with the structure of the pixel 25. In the case where the pixel 25 includes three subpixels of red, green, and blue (RGB), for example, the second image data SD2 preferably contains three kinds of data of RGB for one pixel. In the case where the pixel 25 includes four subpixels of RGBW or RGBY (W and Y represent white and yellow, respectively), the second image data SD2 preferably contains four kinds of data of RGBW or RGBY for one pixel.

Figure 5A:
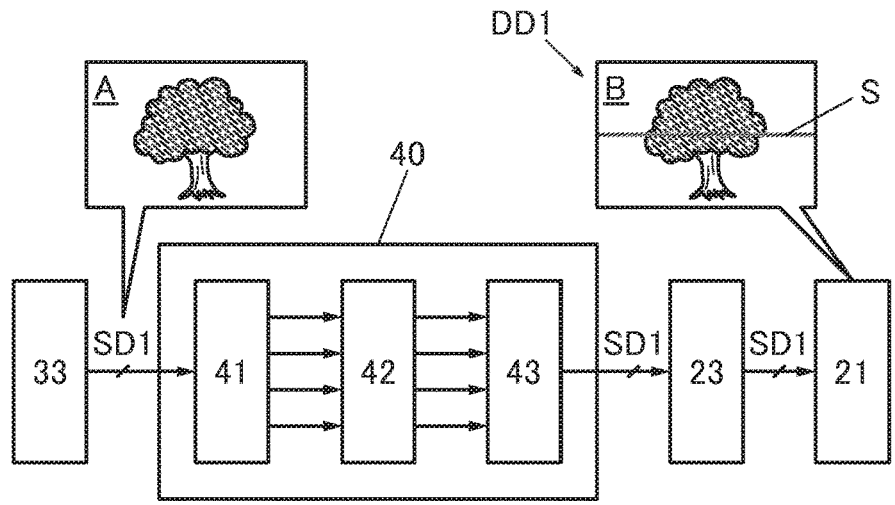
FIGS. 5A to 5C illustrate an example of processing performed in a display system.
Figure 5B:
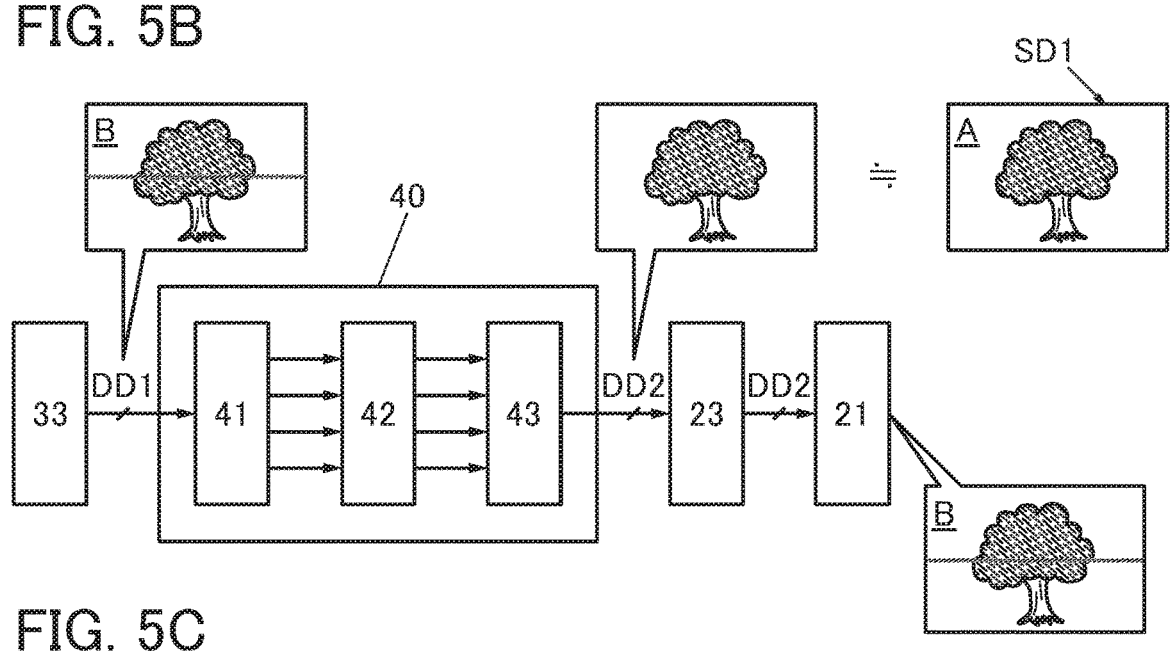
Figure 5C:
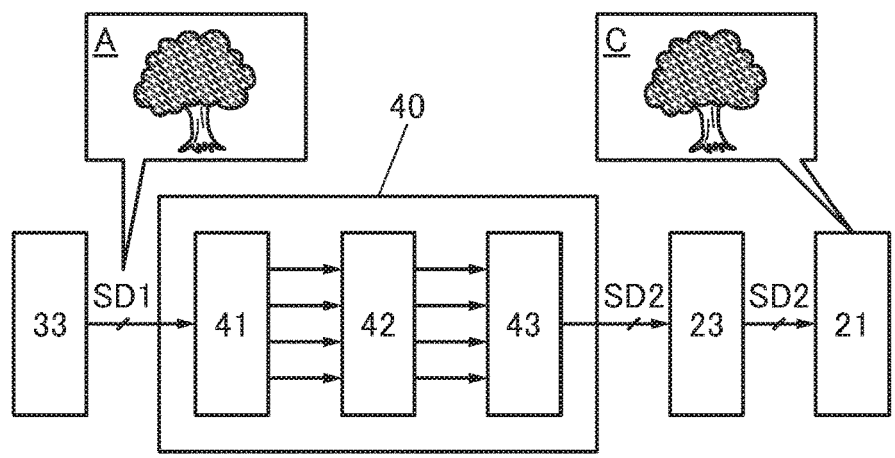

FIGS. 5A to 5C illustrate a specific learning and inference example in the second processing unit 40. FIG. 5A illustrates a state before learning by the second processing unit 40. FIG. 5B illustrates a state at the time of learning by the second processing unit 40. FIG. 5C illustrates a state at the time of inference by the second processing unit 40 after the learning.

First in FIG. 5A, the first image data SD1 is output from the first processing unit 33. The first image data SD1 is image data corresponding to a picture A. Before learning by the second processing unit 40, the first image data SD1 is not corrected and is output to the signal line driver circuit 23 through the second processing unit 40. The first image data SD1 is supplied to the pixel portion 21, and the pixel portion 21 displays a picture on the basis of the first image data SD1. The picture actually displayed on the pixel portion 21 at this time is referred to as a picture B. Note that the picture B may be displayed on the pixel portion 21 by supplying the first image data SD1 from the first processing unit 33 to the signal line driver circuit 23 directly, that is, without through the second processing unit 40.

Here, in the case where the pixel portion 21 is divided into a plurality of regions, picture discontinuity might occur in the vicinity of the region S at the junction as described above (see FIG. 3). FIG. 5A illustrates a state in which the junction is recognized in the picture B.

If a junction, display unevenness, or the like is recognized in the picture B, learning by the second processing unit 40 is performed.

For the learning by the second processing unit 40, image data corresponding to the picture B actually displayed on the pixel portion 21 (hereinafter denoted as image data DD1) is used as learning data.

The image data DD1 can be obtained by taking the picture displayed on the pixel portion 21 with an image sensor, a camera, or the like, for example. Furthermore, in the case where the gray levels of the pixels 25 can be determined from the signals obtained from the pixels 25 (e.g., the potentials held in the pixels 25 or the current flowing through the pixels 25), the image data DD1 can be obtained by reading out the signals.

In addition, the image data DD1 preferably contains luminance data. The luminance data can be obtained with a luminance meter. Specifically, accurate luminance distribution of the pixel portion 21 can be obtained with a two-dimensional luminance meter (also referred to as a two-dimensional color luminance meter), an optical inspection system for displays, or the like. By using the luminance data, display unevenness can be identified in more detail as compared with the case where gray level data is used. Thus, the accuracy of image correction can be improved. The obtained luminance data can be appropriately normalized to be used.

For example, luminance data is preferably obtained from display in which display unevenness is easily recognized (e.g., gray display). Thus, the effect of correction can be enhanced.

The first image data SD1 contains coordinate data and a plurality of pieces of gray level data. The plurality of pieces of gray level data are gray level data of different colors. Here, an example in which the first image data SD1 contains gray level data of three colors (gray level data of red, gray level data of green, and gray level data of blue) will be described. The gray level data of different colors each include a plurality of gray level values corresponding to different coordinates.

For example, when the number of gray levels that can be expressed by the gray level data of red is k bits ($2^k$ gray levels, where k is an integer greater than or equal to 2), the gray level data of red preferably includes a plurality of gray level values of greater than or equal to $2^{k-2}$ and less than or equal to $3 \times 2^{k-2}$. The gray level values may be different depending on coordinates but preferably the same for all the coordinates. Similarly, when the number of gray levels that can be expressed by the gray level data of green is m bits ($2^m$ gray levels, where m is an integer greater than or equal to 2), the gray level data of green preferably includes a plurality of gray level values of greater than or equal to $2^{m-2}$ and less than or equal to $3 \times 2^{m-2}$. When the number of gray levels that can be expressed by the gray level data of blue is n bits ($2^n$ gray levels, where n is an integer greater than or equal to 2), the gray level data of blue preferably includes a plurality of gray level values of greater than or equal to $2^{n-2}$ and less than or equal to $3 \times 2^{n-2}$. If the gray level data of different colors can express the same number of gray levels, the plurality of gray level values of the gray level data of all the colors are preferably the same value. In the case where the number of gray levels that can be expressed is different between colors, the gray level values may be different between colors.

Alternatively, the first image data SD1 may obtain luminance data of each of red display, green display, and blue display. In this case, display unevenness can also be corrected, whereby display quality can be further improved.

Here, the case where red display is performed is described as an example. When the number of gray levels that can be expressed by the gray level data of red is k bits ($2^k$ gray levels, where k is an integer greater than or equal to 2), the gray level data of red preferably includes a plurality of gray level values of greater than or equal to $2^{k-2}$ and less than or equal to $3 \times 2^{k-2}$. Specifically, when the number of gray levels that can be expressed by the gray level data of red is 8 bits (256 gray levels), the gray level data of red preferably includes a plurality of gray level values of greater than or equal to $2^6$ and less than or equal to $3 \times 2^6$ (i.e., greater than or equal to 64 and less than or equal to 192). The gray level values may be different depending on coordinates but preferably the same for all the coordinates. The gray level data of green and the gray level data of blue preferably include a plurality of gray level values of 0.

Note that the resolution of (number of pixels for) the image data DD1 is preferably the same as that of the pixel portion 21. In the case where the resolution of the image data DD1 is different from that of the pixel portion 21, processing for adjusting the resolution of the image data DD1 to match that of the pixel portion 21 is preferably performed in a portion other than the second processing unit 40.

Supervised learning is preferably performed by the second processing unit 40. The first image data SD1 is preferably used as teacher data.

Specifically, the image data DD1 is supplied to the second processing unit 40 as illustrated in FIG. 5B. In the second processing unit 40, a weight coefficient used in the second processing unit 40 is updated so that the difference between corrected image data DD2 and the first image data SD1 becomes equal to or lower than a certain level. A gradient descent method or the like can be used to update the weight coefficient, and a backpropagation method or the like can be used for calculation of a gradient. The update of the weight coefficient repeats until the difference between the image data DD2 and the first image data SD1 becomes equal to or lower than a certain level. Note that the allowable range of the difference can be determined arbitrarily.

When the difference between the image data DD2 and the first image data SD1 finally becomes equal to or lower than a certain level, the second processing unit 40 finishes learning. As illustrated in FIG. 5B, the image data DD1 is input to the second processing unit 40 which has finished the learning, whereby the corrected image data DD2 is output to the signal line driver circuit 23. Then, the image data DD2 is supplied to the pixel portion 21, and the pixel portion 21 displays a picture on the basis of the image data DD2. The picture actually displayed on the pixel portion 21 at this time is similar to the picture B (difference between the picture actually displayed at this time and the picture B is lower than or equal to a certain level).

The initial value of the weight coefficient used in the second processing unit 40 may be determined by random numbers. Because the initial value of the weight coefficient may influence the learning speed (e.g., the convergent speed of the weight coefficient or the prediction accuracy of the second processing unit 40), the initial value of the weight coefficient may be changed if the learning speed is low. Alternatively, the initial value of the weight coefficient may be determined by advance learning.

Next, the first image data SD1 is corrected by the inference of the second processing unit 40 which has performed the above-described learning. As illustrated in FIG. 5C, when the first image data SD1 is input to the second processing unit 40, the second processing unit 40 performs arithmetic operation using the weight coefficient updated by the learning and corrects the first image data SD1. The result of the arithmetic operation is output from the second processing unit 40 as the second image data SD2 and supplied to the pixel portion 21 through the signal line driver circuit 23.

Here, the second image data SD2 is image data corrected by the second processing unit 40 which has performed the learning (FIG. 5B) so as to compensate for the junction in the picture B. Therefore, when the second image data SD2 is supplied to the pixel portion 21, a picture C whose junction is not recognized is displayed. The picture C is similar to the picture A (difference between the picture C and the picture A is lower than or equal to a certain level).

Note that the correction of the first image data SD1 can be performed for each pixel. In this case, the weight coefficient used at the inference of the second processing unit 40 is changed for each pixel.

The correction of the first image data SD1 can also be performed for only the pixels in a certain region. For example, the region where correction is performed can be limited to the region S illustrated in FIG. 3 (a region where the region 21A and the region 21C are adjacent to each other) and the vicinity thereof.

When only image data which is supplied to the region S and the vicinity thereof is corrected among the first image data SD1, learning is performed by extracting only the image data in the region S and the vicinity thereof from the picture A and the picture B in FIGS. 5A to 5C. Then, the second processing unit 40 corrects the image data, which is supplied to the region S and the vicinity thereof, of the first image data SD1 and does not correct other image data.

The number of pixels whose image data is corrected by the second processing unit 40 is reduced in such a manner, whereby the amount of arithmetic operation by the second processing unit 40 can be reduced. Therefore, power consumption can be reduced and arithmetic operation speed can be increased.

A region where signal correction is performed can be set freely. For example, the second processing unit 40 can correct signals supplied to the pixels 25 connected to the scan lines GLa[i] to GLa[m] (i is a given integer greater than or equal to 3m/4 and less than or equal to m) and the pixels 25 connected to the scan lines GLb[i] to GLb[m].

Moreover, in the case where correction processing (e.g., gamma correction, dimming, or toning) is performed by the first processing unit 33, either the image data which has not been subjected to the correction or the image data which has been subjected to the correction processing can be used as learning data used for learning by the second processing unit 40. In the case where the image data which has not been subjected to the correction processing is used, the correction processing may be performed in the second processing unit 40. In this case, the correction processing performed in the first processing unit 33 can be omitted or reduced in number, so that signal processing can be simplified.

By correcting the image data by using the second processing unit 40 in the above-described manner, the junction is not recognized in the displayed picture. Thus, the quality of a high-resolution picture can be improved.

The above-described learning by the second processing unit 40 can be performed by using the arithmetic processing device 50 or the like provided outside the signal generation portion 30. By using software loaded in the arithmetic processing device 50, learning by the second processing unit 40 can be performed. Furthermore, the weight coefficient obtained by the learning is supplied to the second processing unit 40 through the receiving portion 34, so that the weight coefficient used in the second processing unit 40 can be updated. The leaning by the second processing unit 40 outside the display system can simplify the structure of the display system.

Furthermore, the update of the weight coefficient can also be performed by the transmission of a control signal to the receiving portion 34 with a remote controller or the like by a user. This allows an easy upgrade of a produce by a user after the shipment of the product.

The permission for the update of the weight coefficient can be given to only the display system which is utilized by a user having a specific right. Thus, service such as provision of high-quality TV broadcasting to only specific users is possible.

Next, processing performed in the second processing unit 40 will be described with reference to FIG. 6, FIG. 7, FIG. 8, and FIG. 9. Processing performed in the first layer 41 is described with reference to FIG. 6, processing performed in the second layer 42 is described with reference to FIG. 7, and processing performed in the third layer 43 is described with reference to FIG. 8 and FIG. 9.

Figure 6:
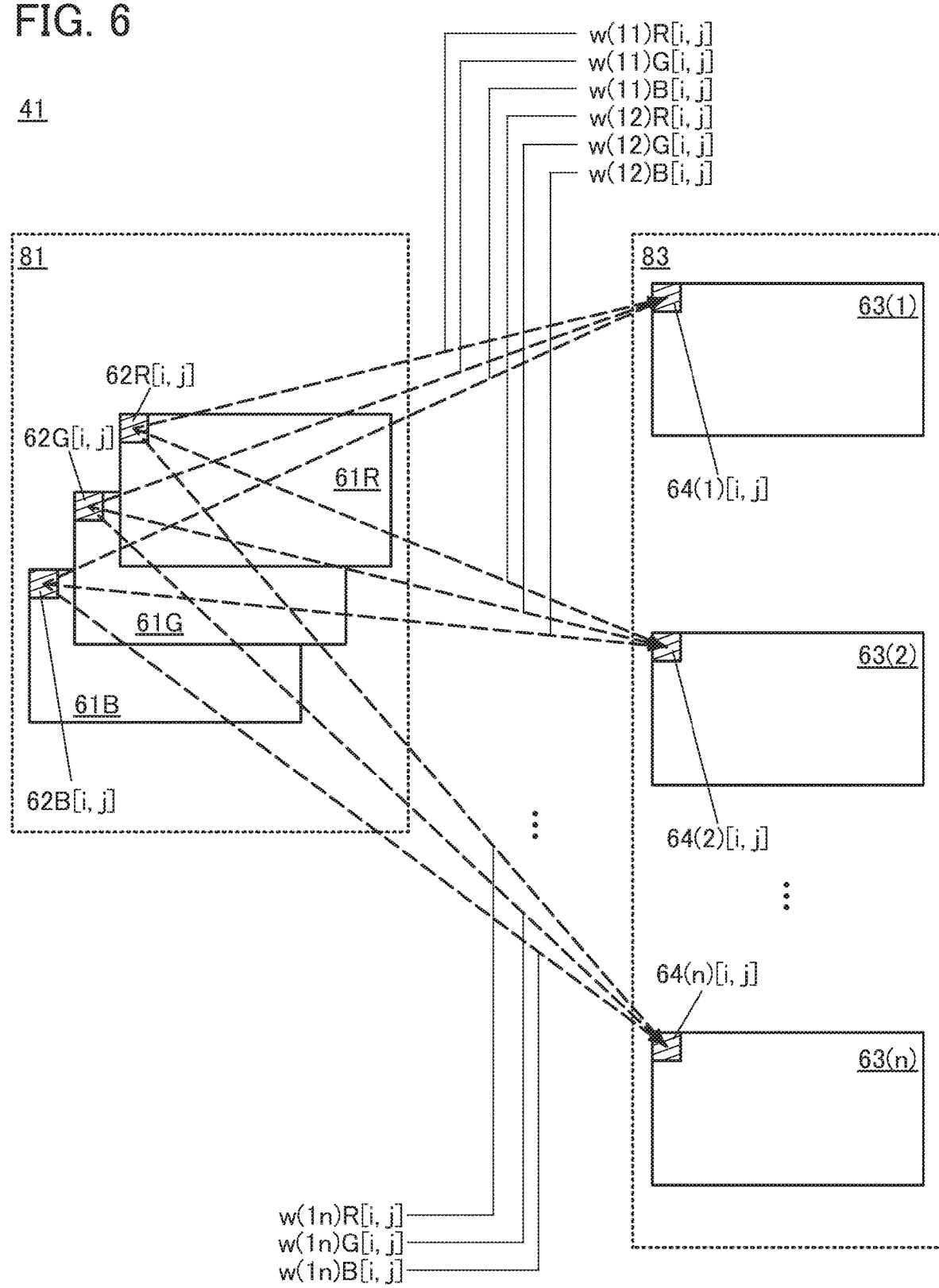
FIG. 6 illustrates an example of processing performed in a first layer.

First, image data 81 is input to the first layer 41. In the first layer 41, arithmetic data 83 is generated by using the image data 81 as shown in FIG. 6.

The image data 81 corresponds to the first image data SD1 illustrated in FIG. 5A or the like at inference and corresponds to the image data DD1 illustrated in FIG. 5B or the like at learning.

The image data 81 contains one or more image data 61. FIG. 6 illustrates an example in which the image data 81 contains three pieces of image data 61. Specifically, the image data 81 shown in FIG. 6 contains image data 61R, image data 61G, and image data 61B.

The image data 61R, the image data 61G, and the image data 61B contain a plurality of pieces of pixel data 62R, a plurality of pieces of pixel data 62G, and a plurality of pieces of pixel data 62B, respectively. The number of the pixel data 62R, 62G, and 62B is the same as the number of pixels for the image data 81.

In this specification and the like, the pixel data 62R corresponding to a pixel 25[$i$, $j$] is denoted as pixel data 62R[i, j]. Similarly, the pixel data 62G corresponding to the pixel 25[$i$, $j$] is denoted as pixel data 62G[i, j] and the pixel data 62B corresponding to the pixel 25[$i$, $j$] is denoted as pixel data 62B[i,j].

The image data 81 contains three pieces of pixel data 62 for one pixel. That is, the number of the image data 61 and the number of the pixel data 62 for one pixel are the same. Specifically, the image data 81 contains the pixel data 62R[i, j], 62G[i, j], and 62B[i, j] corresponding to the pixel 25[$i$, $j$].

The arithmetic data 83 contains a plurality of pieces of arithmetic data 63. The number of the arithmetic data 63 is larger than the number of the image data 61. FIG. 6 illustrates an example in which n pieces of arithmetic data 63 (n is an integer greater than or equal to 4) are generated by using the image data 81. The arithmetic data 83 contains a larger amount of data than the image data 81. Thus, the amount of data used for arithmetic operation in the second layer 42 can be increased, so that the accuracy of correction of image data in the second processing unit 40 can be improved.

Arithmetic data 63($x$) (x is an integer greater than or equal to 1 and less than or equal to n) contains a plurality of pieces of arithmetic data 64($x$). The number of the arithmetic data 64($x$) is the same as the number of pixels for the image data 81. In this specification, the arithmetic data 64($x$) corresponding to the pixel 25[$i$, $j$] is denoted as arithmetic data 64($x$)[i, j].

Note that n pieces of arithmetic data 63 are separately generated. In addition, The plurality of pieces of arithmetic data 64 are separately generated.

Here, a generation method of arithmetic data 64(1)[$i$, $j$] of arithmetic data 63(1) and a generation method of arithmetic data 64(2)[$i$, $j$] of arithmetic data 63(2) are described as examples.

Three pieces of pixel data 62 corresponding to the pixel 25[$i$, $j$] are multiplied by different weight coefficients and the three products are added to each other, whereby the arithmetic data 64(1)[i, j] can be generated. Specifically, the arithmetic data 64(1)[i, j] can be generated by adding the product of the pixel data 62R[i, j] and a weight coefficient w(11)R[I, j], the product of the pixel data 62G[i, j] and a weight coefficient w(11)G[i, j], and the product of the pixel data 62B[i,j] and a weight coefficient w(11)B[i, j] to each other.

Furthermore, three pieces of pixel data 62 corresponding to the pixel 25[i, j] are multiplied by different weight coefficients from those in generation of the arithmetic data 64(1)[i, j], and the three products are added to each other, whereby the arithmetic data 64(2)[i, j] can be generated. Specifically, the arithmetic data 64(2)[i, j] can be generated by adding the product of the pixel data 62R[i, j] and a weight coefficient w(12)R[i, j], the product of the pixel data 62G[i, j] and a weight coefficient w(12)G[i, j], and the product of the pixel data 62B[i, j] and a weight coefficient w(12)B[i, j] to each other.

Similarly, three pieces of pixel data 62 corresponding to the pixel 25[i, j] are multiplied by different weight coefficients from those in generation of other arithmetic data 64, and the three products are added to each other, whereby n pieces of arithmetic data 64 can be generated. The larger the number of the arithmetic data 63 corresponding to one pixel is, the larger the number of weight coefficients used in the second layer 42 can be. Therefore, the accuracy of correction in the second processing unit 40 can be improved, and it is preferable.

The number of weight coefficients is preferably the same as the number of the pixel data 62. In this case, the weight coefficient for each pixel data 62 can be determined independently; therefore, the accuracy of processing performed in the first layer 41 can be improved. Note that the number of the weight coefficients may be smaller than the number of the pixel data 62 according to circumstances. For example, a weight coefficient may be determined for each image data 61 or each pixel 25.

In the first layer 41, the arithmetic data 64(x)[i, j] is generated by convoluting pixel data which corresponds to one pixel 25[i, j] of the image data 61R, 61G, and 61B. Therefore, it can be said that the first layer 41 uses a convolutional neural network (CNN). A weight coefficient used for arithmetic operation in the first layer 41 corresponds to the filter value of a filter with a size of 1×1.

Figure 7:
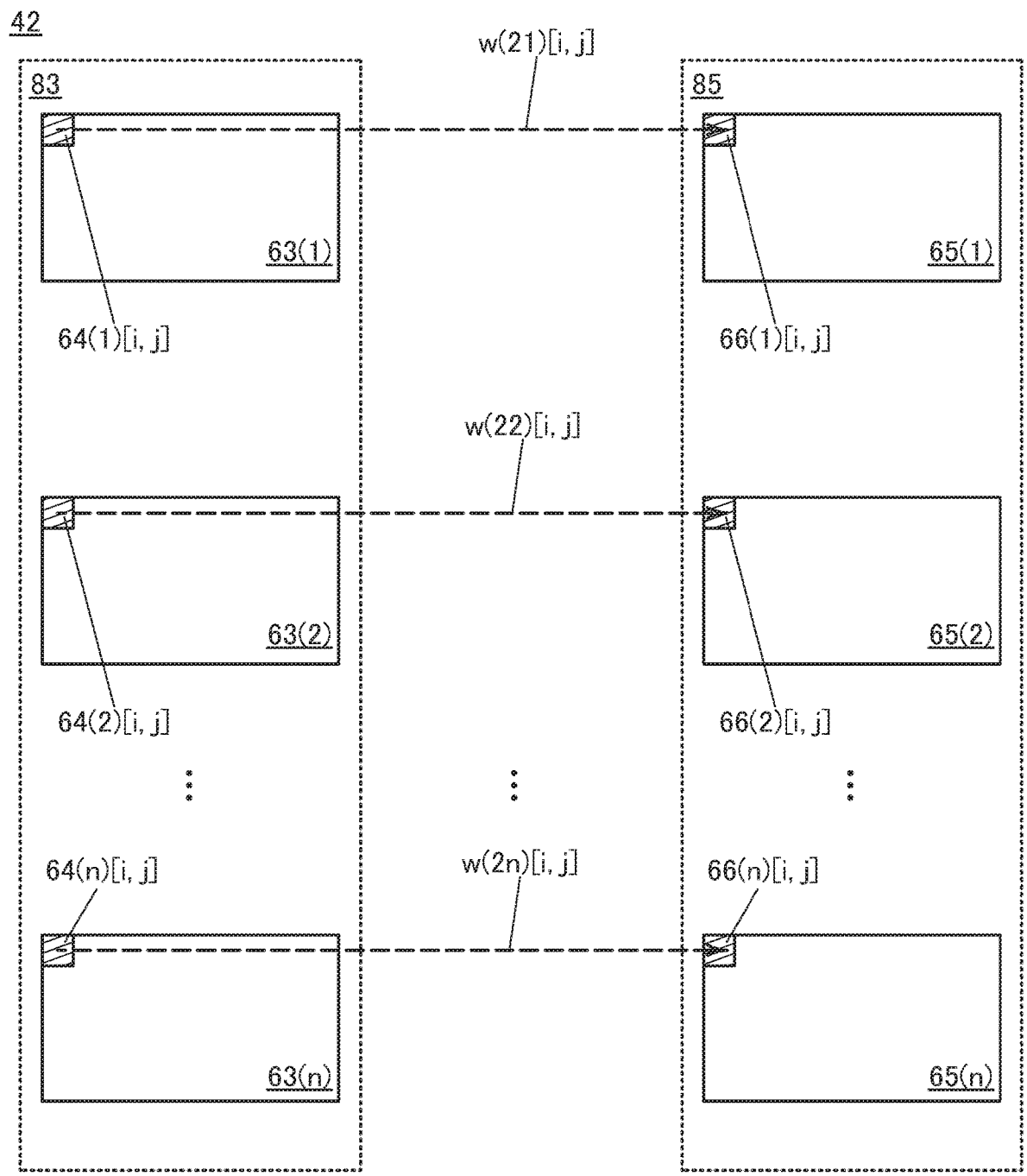
FIG. 7 illustrates an example of processing performed in a second layer.

Then, the arithmetic data 83 is input from the first layer 41 to the second layer 42. As shown in FIG. 7, arithmetic data 85 is generated in the second layer 42 by using the arithmetic data 83.

The arithmetic data 85 contains a plurality of pieces of arithmetic data 65. The number of the arithmetic data 65 is the same as the number of the arithmetic data 63. FIG. 7 illustrates an example in which n pieces of arithmetic data 65 (n is an integer greater than or equal to 4) are generated by using the arithmetic data 83.

Arithmetic data 65(x) (x is an integer greater than or equal to 1 and less than or equal to n) contains a plurality of pieces of arithmetic data 66(x). The number of the arithmetic data 66(x) is the same as the number of pixels for the image data 81. In this specification, the arithmetic data 66(x) corresponding to the pixel 25[i, j] is denoted as arithmetic data 66(x)[i, j].

Note that n pieces of arithmetic data 65 are separately generated. In addition, the plurality of pieces of arithmetic data 66 are separately generated.

Here, a generation method of arithmetic data 66(1)[i, j] of arithmetic data 65(1) and a generation method of arithmetic data 66(2)[i, j] of arithmetic data 65(2) are described as examples.

Arithmetic data 63(1)[i, j] corresponding to the pixel 25[i, j] is multiplied by a weight coefficient w(21)[i, j], whereby the arithmetic data 66(1)[i, j] can be generated.

Arithmetic data 63(2)[i, j] corresponding to the pixel 25[i, j] is multiplied by a weight coefficient w(22)[i, j], whereby the arithmetic data 66(2)[i, j] can be generated.

Similarly, n pieces of arithmetic data 63 corresponding to the pixel 25[i, j] are multiplied by different weight coefficients, whereby n pieces of arithmetic data 66 can be generated. The larger the number of the arithmetic data 63 corresponding to one pixel is, the more various the weight coefficients by which the arithmetic data 63 can be multiplied can be. Thus, when the arithmetic data 63 is input to the second layer 42, the data can be corrected with high accuracy in the second processing unit 40 as compared with the case where the image data 81 is directly input to the second layer 42 without through the first layer 41. In this case, the second processing unit 40 can correct image data with high accuracy, whereby display quality of the display portion can be improved.

The number of weight coefficients is preferably the same as the number of the arithmetic data 64. In this case, a weight coefficient for each arithmetic data 64 can be determined independently; therefore, the accuracy of processing performed in the second layer 42 can be improved. Note that the number of the weight coefficients may be smaller than the number of the arithmetic data 64 according to circumstances. For example, a weight coefficient may be determined for each arithmetic data 63 or each pixel 25.

Figure 8:
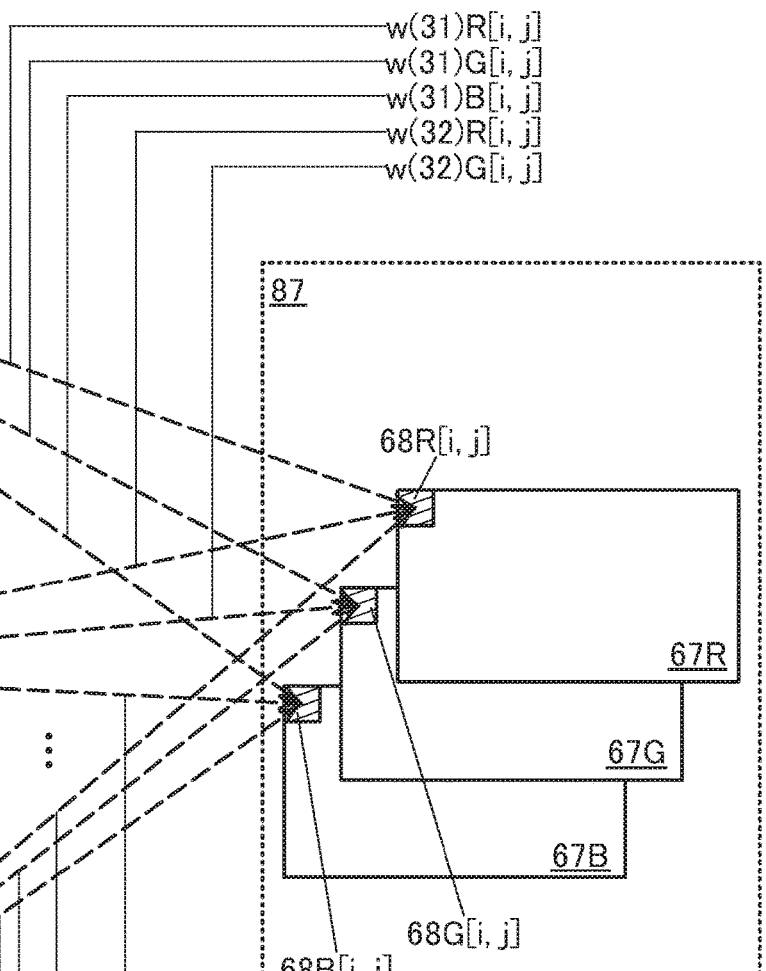
FIG. 8 illustrates an example of processing performed in a third layer.

Then, the arithmetic data 85 is input from the second layer 42 to the third layer 43. As shown in FIG. 8, image data 87 is generated in the third layer 43 by using the arithmetic data 85.

The image data 87 corresponds to the second image data SD2 illustrated in FIG. 5C or the like at inference and corresponds to the image data DD2 illustrated in FIG. 5B or the like at learning.

The image data 87 contains one or more image data 67. The number of the image data 67 is smaller than the number of the arithmetic data 65. The number of the image data 67 is preferably the same as the number of subpixels of the pixel 25. FIG. 8 illustrates an example in which the image data 87 contains three pieces of image data 67. Specifically, the image data 87 shown in FIG. 8 contains image data 67R, image data 67G, and image data 67B.

The image data 67R, the image data 67G, and the image data 67B contain a plurality of pieces of pixel data 68R, a plurality of pieces of pixel data 68G, and a plurality of pieces of pixel data 68B, respectively.

In this specification and the like, the pixel data 68R corresponding to the pixel 25[i, j] is denoted as pixel data 68R[i, j]. Similarly, the pixel data 68G corresponding to the pixel 25[i, j] is denoted as pixel data 68G[i, j] and the pixel data 68B corresponding to the pixel 25[i, j] is denoted as pixel data 68B[i,j].

Figure 9:
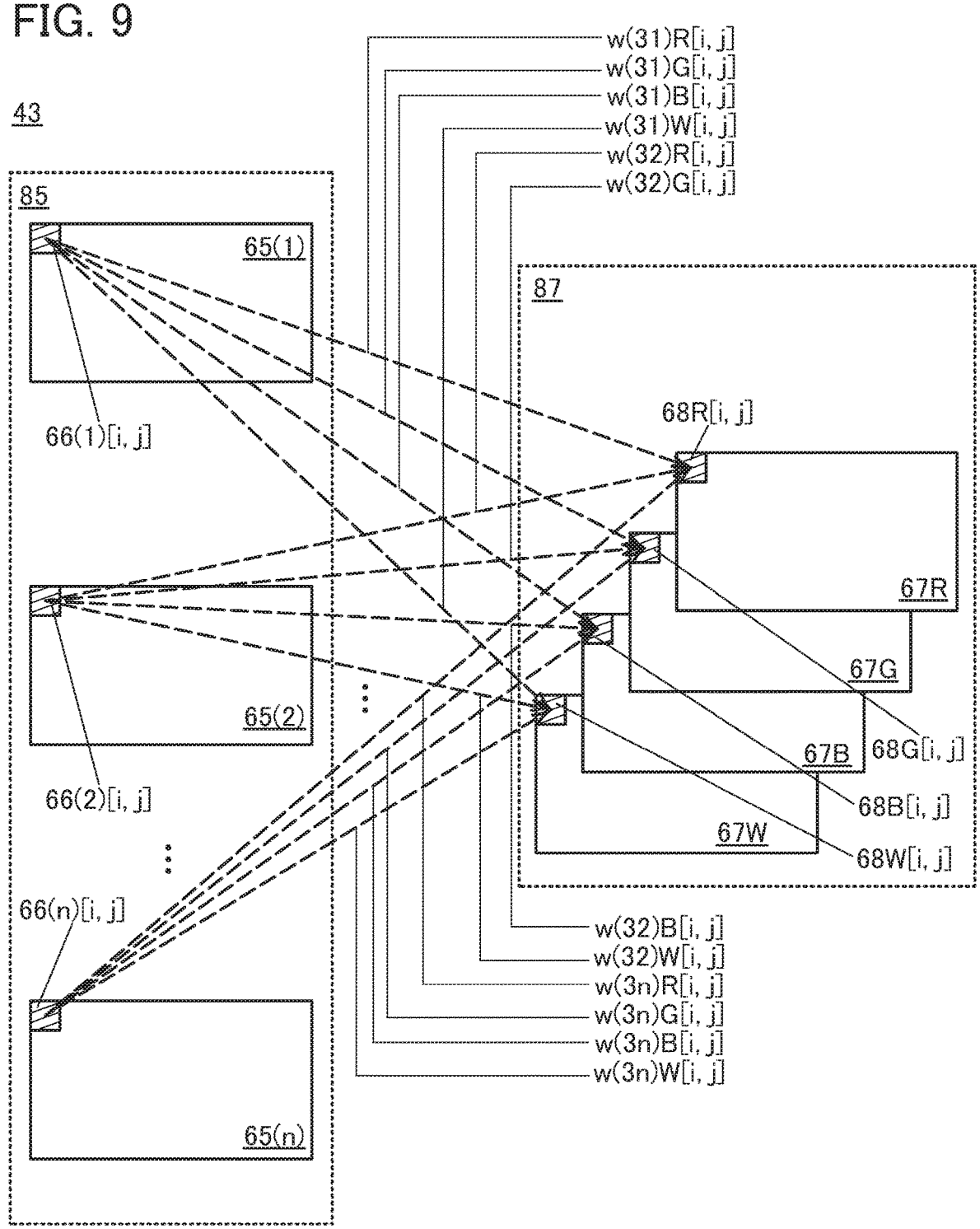
FIG. 9 illustrates an example of processing performed in a third layer.

FIG. 9 shows a modification example. FIG. 9 illustrates an example in which the image data 87 contains four pieces of image data 67. Specifically, the image data 87 shown in FIG. 9 contains the image data 67R, the image data 67G, the image data 67B, and .image data 67W.

Note that the image data 67 are separately generated. In addition, the plurality of pieces of pixel data 68 are separately generated.

Here, a generation method of the pixel data 68R[i, j] of the image data 67R and a generation method of the pixel data 68G[i, j] of the image data 67G are described as examples.

Here, n pieces of arithmetic data 66 corresponding to the pixel 25U, are multiplied by different weight coefficients and the n products are added to each other, whereby the pixel data 68R[i, j] can be generated. Specifically, the n products (the product of the arithmetic data 66(1)[i, j] and a weight coefficient w(31)R[i, j] to the product of the arithmetic data 66(n)[i, j] and a weight coefficient w(3n)R[i, j]) are added to each other, whereby the pixel data 68R[i, j] can be generated.

Furthermore, n pieces of arithmetic data 66 corresponding to the pixel 25[i, j] are multiplied by different weight coefficients from those in generation of the pixel data 68G[i, j] and the n products are added to each other, whereby the pixel data 68G[i, j] can be generated. Specifically, the n products (the product of the arithmetic data 66(1)[i, j] and a weight coefficient w(31)G[i, j] to the product of the arithmetic data 66(n)[i,j] and a weight coefficient w(3n)G[i,j]) are added to each other, whereby the pixel data 68G[i, j] can be generated.

Similarly, n pieces of arithmetic data 66 corresponding to the pixel 25[i, j] are multiplied by different weight coefficients from those in generation of other pixel data 68 and the n products are added to each other, whereby n pieces of pixel data 68 can be generated.

One arithmetic data 66(1)[i, j] is used for generating the pixel data 68R[i, j], 68G[i, j], and 68B[i, j]. These three pieces of pixel data 68 are preferably generated by multiplying the arithmetic data 66(1)[i, j] by different weight coefficients.

The number of weight coefficients is preferably the same as the number of the arithmetic data 66. In this case, the weight coefficient for each arithmetic data 66 can be determined independently; therefore, the accuracy of processing performed in the third layer 43 can be improved. Note that the number of the weight coefficients may be smaller than the number of the arithmetic data 66 according to circumstances. For example, a weight coefficient may be determined for each arithmetic data 65 or each pixel 25.

In the third layer 43, the pixel data 68R[i, j] is generated by convoluting the arithmetic data 66 which corresponds to one pixel 25[i, j] of n pieces of arithmetic data 65. Therefore, it can be said that the third layer 43 uses, like the first layer 41, a convolutional neural network (CNN).

When the image data is corrected using such a second processing unit 40 including the three layers, a picture with inconspicuous display unevenness or an inconspicuous junction can be displayed in the display system of one embodiment of the present invention.

The second processing unit 40 may be capable of performing part or the whole of image processing that can be performed in the first processing unit 33. In this case, the first processing unit 33 can be simplified or omitted. For example, the second processing unit 40 may be capable of gray level transformation processing. Specifically, the second processing unit 40 may have a function of generating the second image data SD2 of 12-bit gray levels (4096 gray levels) by using the first image data SD1 of 8-bit gray levels (256 gray levels).

<1-4. Configuration Example 2 of Pixel Portion>

Figure 10:
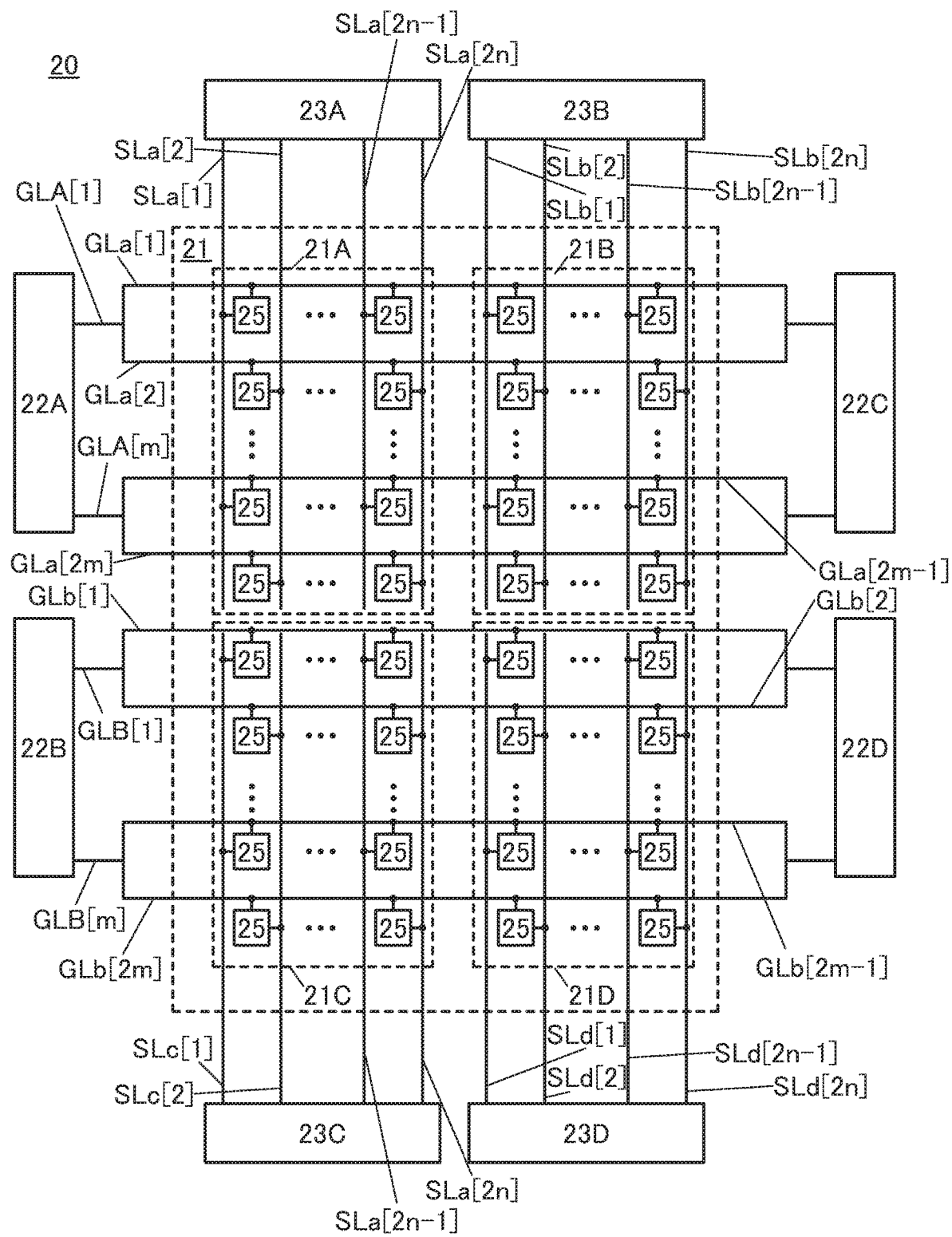
FIG. 10 illustrates an example of a display portion.

FIG. 10 illustrates a configuration example of the display portion 20 which is different from that in FIG. 2. In the display portion 20, the pixel portion 21 is divided into four regions.

The display portion 20 illustrated in FIG. 10 is different from the display portion 20 illustrated in FIG. 2 in that two signal lines SL are provided for the pixels 25 in one column and that the pixel 25 electrically connected to one signal line SL and the pixel 25 electrically connected to the other signal line SL are alternately arranged.

The display portion 20 includes the pixel portion 21, four scan line driver circuits 22 (the scan line driver circuits 22A, 22B, 22C, and 22D), and four signal line driver circuits 23 (the signal line driver circuits 23A, 23B, 23C, and 23D).

The pixel portion 21 includes the plurality of pixels 25 as illustrated in FIG. 10. FIG. 10 illustrates an example in which the pixel portion 21 includes the plurality of pixels 25 arranged in a matrix of 4m rows and 2n columns (m and n are each an integer greater than or equal to 1).

The pixel portion 21 is divided into four regions (the regions 21A, 21B, 21C, and 21D). The four regions each include the plurality of pixels 25 arranged in a matrix of 2m rows and n columns.

The display portion 20 includes m scan lines GLA, m scan lines GLB, 2m scan lines GLa, and 2m scan lines GLb. A scan line GLA[i] (i is an integer greater than or equal to 1 and less than or equal to m) is electrically connected to a scan line GLa[2i−1] and a scan line GLa[2i], and the pixels 25 electrically connected to the scan lines GLa in two rows are selected simultaneously. Similarly, a scan line GLB[i] (i is an integer greater than or equal to 1 and less than or equal to m) is electrically connected to a scan line GLb[2i−1] and a scan line GLb[2i], and the pixels 25 electrically connected to the scan lines GLb in two rows are selected simultaneously.

Since the pixels 25 in two rows can be selected simultaneously, the time for writing a video signal can be longer. Thus, insufficient writing of a video signal can be prevented even in high-speed driving at an increased frame frequency. For example, even when the frame frequency is more than or equal to 120 Hz, insufficient writing of the video signal can be prevented.

The configuration of the display system of one embodiment of the present invention is not limited to the configuration in which two signal lines SL are provided for the pixels 25 in one column, and three, four, or five or more signal lines SL may be provided for the pixels 25 in one column.

<1-5. Configuration Example 2 of Display System>

Next, the case where a display portion of a display system includes a plurality of display panels will be described.

Figure 11:
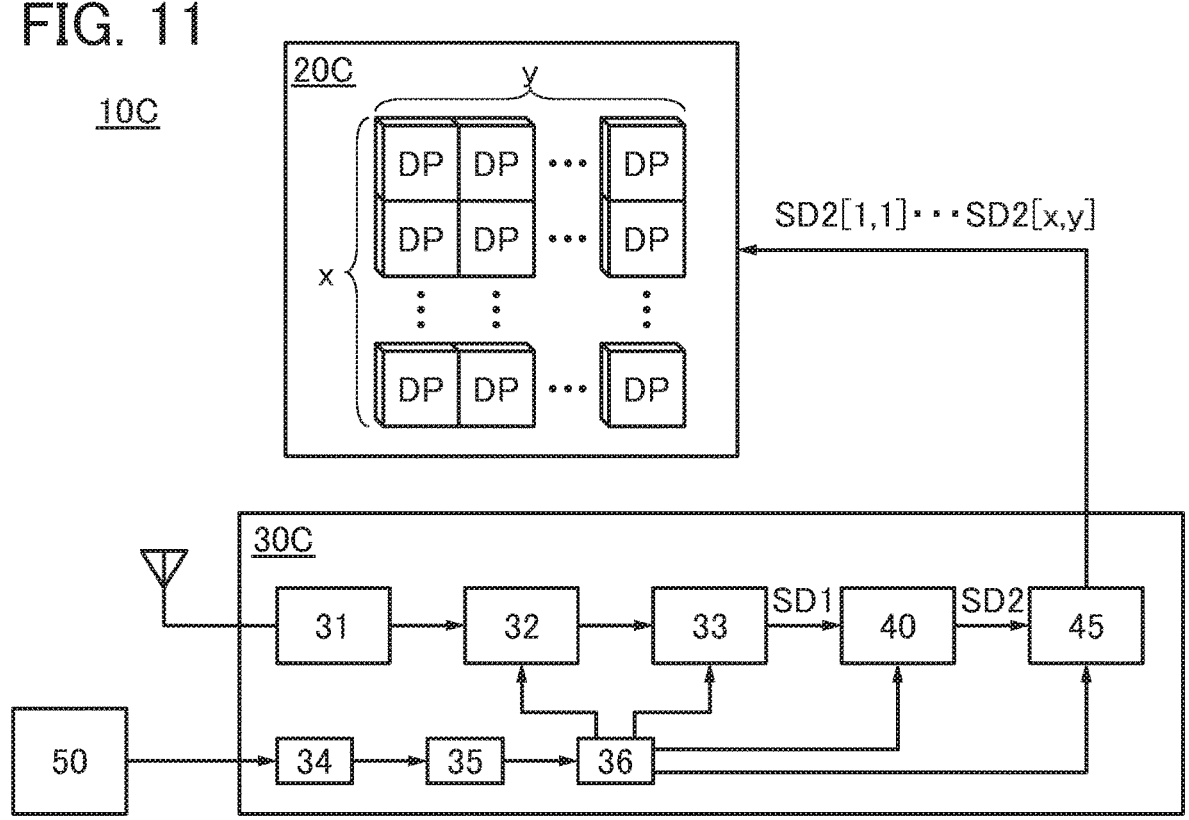
FIG. 11 illustrates an example of a display system.

FIG. 11 is a block diagram of a display system 10C.

The display system 10C has a function of generating image data by using data received from the outside and displaying a picture on the basis of the image data.

The display system 10C includes a display portion 20C and a signal generation portion 30C. The display portion 20C includes a plurality of display panels DP. The signal generation portion 30C has a function of generating image data by using data received from the outside. The display panel DP has a function of displaying a picture on the basis of the image data.

FIG. 11 illustrates an example in which the display portion 20C includes the plurality of pixels DP arranged in a matrix of x rows and y columns (x and y are each an integer greater than or equal to 1). Display on the display panels DP can be controlled independently.

When the plurality of display panels DP are arranged in one or more directions (e.g., in one column or in matrix), the display portion 20C with a large display region can be manufactured.

In the case where the large display portion 20C is manufactured using the plurality of display panels DP, each of the display panels DP is not required to be large. Thus, an apparatus for manufacturing the display panel DP does not need to be increased in size, whereby space-saving can be achieved. In addition, since an apparatus for manufacturing small- and medium-size display panels can be used, there is no need to use a novel manufacturing apparatus for increasing the size of the display portion 20C, which leads to a reduction in manufacturing cost. In addition, a decrease in yield caused by an increase in the size of the display panel DP can be suppressed.

A display portion including the plurality of display panels DP has a larger display region than a display portion including one display panel DP when the display panels DP have the same size, and has an effect of displaying more information at a time, for example.

In addition to the configuration of the signal generation portion 30A illustrated in FIG. 1A, the signal generation portion 30C includes a dividing portion 45.

The dividing portion 45 has a function of dividing the second image data SD2 input from the second processing unit 40. The second image data SD2 is divided into pieces of data that are the same in number as the display panels DP provided in the display portion 20C. In FIG. 11, the second image data SD2 is divided into x×y pieces of data (second image data SD2[1, 1] to SD2[$x$, $y$]) and output to the display portion 20C. Second image data SD2[$p$, $q$] ($p$ is an integer greater than or equal to 1 and less than or equal to x, and q is an integer greater than or equal to 1 and less than or equal to y) is image data corresponding to an image displayed on a display panel DP[p, q]. A control signal is supplied from the control portion 36 to the dividing portion 45.

A video signal supplied from the signal generation portion 30C is input to the display panel DP.

Figure 12A:
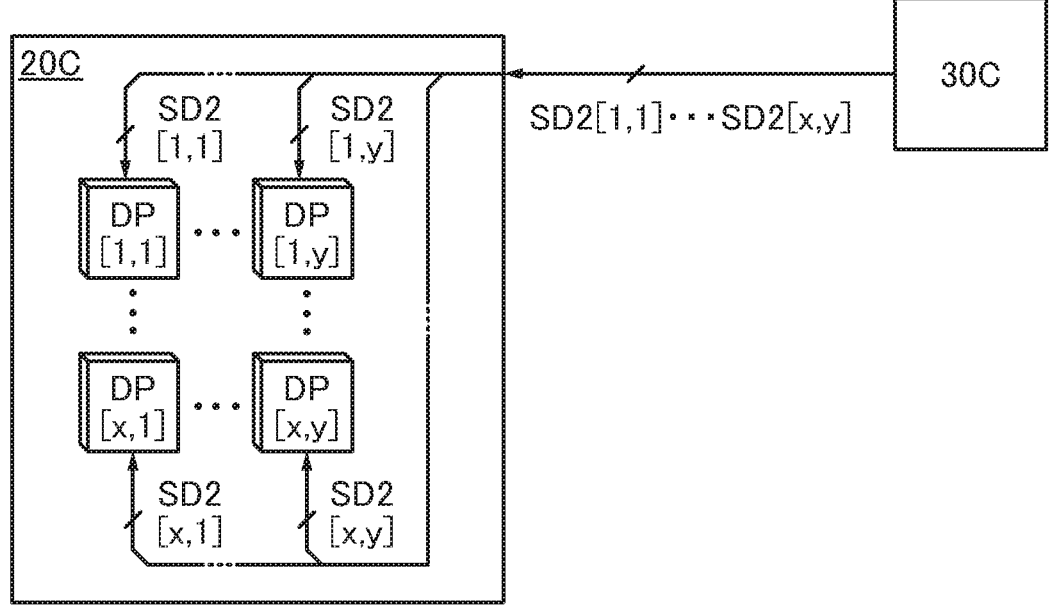
FIG. 12A illustrates an example of a display system.

FIG. 12A illustrates the state in which video signals are supplied from the signal generation portion 30C to display panels DP[1, 1] to DP[x, y]. The second image data SD2 divided into x×y pieces of data (the second image data SD2[1, 1] to SD2[$x$, $y$]) are input to the display portion 20C. The second image data SD2[$p$, $q$] is input to the display panel DP[p, q].

Figure 12B:
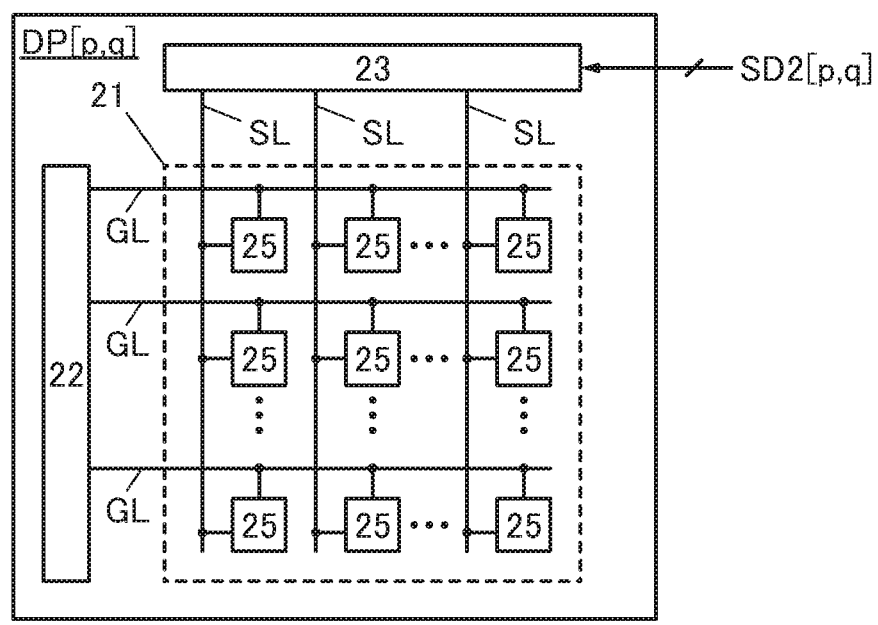
FIG. 12B illustrates an example of a display panel.

FIG. 12B illustrates a configuration example of the display panel DP[p, q].

The display panel DP[p, q] includes the pixel portion 21, the scan line driver circuit 22, and the signal line driver circuit 23. Description with reference to FIG. 1A can be referred to for functions of the pixel portion 21, the scan line driver circuit 22, and the signal line driver circuit 23.

The pixel portion 21 includes the plurality of pixels 25. The plurality of pixels 25 are each electrically connected to any one of the plurality of scan lines GL. The plurality of scan lines GL are each electrically connected to the scan line driver circuit 22. The plurality of pixels 25 are each electrically connected to any one of the plurality of signal lines SL. The plurality of signal lines SL are each electrically connected to the signal line driver circuit 23.

Here, the case where the display panel DP has a non-display region that surrounds the pixel portion 21 is considered. At this time, for example, if output images of the plurality of display panels DP are used to display one image, the image appears divided to a user of the display system 10C.

Making the non-display regions of the display panels DP small (using the display panels DP with narrow frames) can prevent an image displayed on the display panels DP from appearing divided; however, it is difficult to totally remove the non-display regions of the display panel DP.

A small non-display region of the display panel DP leads to a decrease in the distance between an edge of the display panel DP and an element in the display panel DP, in which case the element easily deteriorates by impurities entering from outside the display panel DP in some cases.

Thus, in one embodiment of the present invention, the plurality of display panels DP are arranged to partly overlap with one another. In two display panels DP overlapping with each other, at least the display panel DP positioned on the display surface side (upper side) includes a region transmitting visible light that is adjacent to the pixel portion 21. In one embodiment of the present invention, the pixel portion 21 of the display panel DP positioned on a lower side and the region that transmits visible light of the display panel DP on the upper side overlap with each other. Therefore, a non-display region between the pixel portions 21 of the overlapping two display panels DP reduced or even removed. As a result, the large-sized display portion 20C in which a joint portion of the display panels DP is hardly seen by the user can be obtained.

At least part of a non-display region of the display panel DP on the upper side transmits visible light, and can overlap with the pixel portion 21 of the display panel DP on the lower side. Furthermore, at least part of a non-display region of the display panel DP on the lower side can overlap with the pixel portion 21 of the display panel DP on the upper side or a region that blocks visible light thereof. It is not necessary to reduce the areas of the non-display regions because a reduction in the area of the frame of the display portion 20C (a reduction in area except a pixel portion) is not affected by these regions.

A large non-display region of the display panel DP leads to an increase in the distance between the edge of the display panel DP and an element in the display panel DP, in which case the deterioration of the element due to impurities entering from outside the display panel DP can be suppressed. For example, in the case where an organic EL element is used as a display element, impurities such as moisture or oxygen are less likely to enter (or less likely to reach) the organic EL element from outside the display panel DP as the distance between the end portion of the display panel DP and the organic EL element increases. Since a sufficient area of the non-display region of the display panel DP is secured in the display system of one embodiment of the present invention, the highly reliable large display portion 20C can be fabricated even when the display panel DP including an organic EL element or the like is used.

As described above, when the plurality of display panels DP are provided in the display portion 20C, the plurality of display panels DP are preferably arranged so that the pixel portions 21 are arranged continuously between the adjacent display panels DP.

Figure 13A:
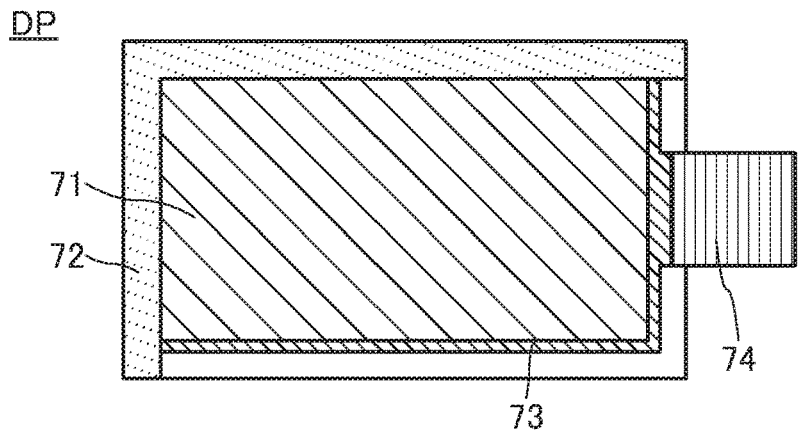
FIG. 13A illustrates an example of a display panel.
Figure 13B:
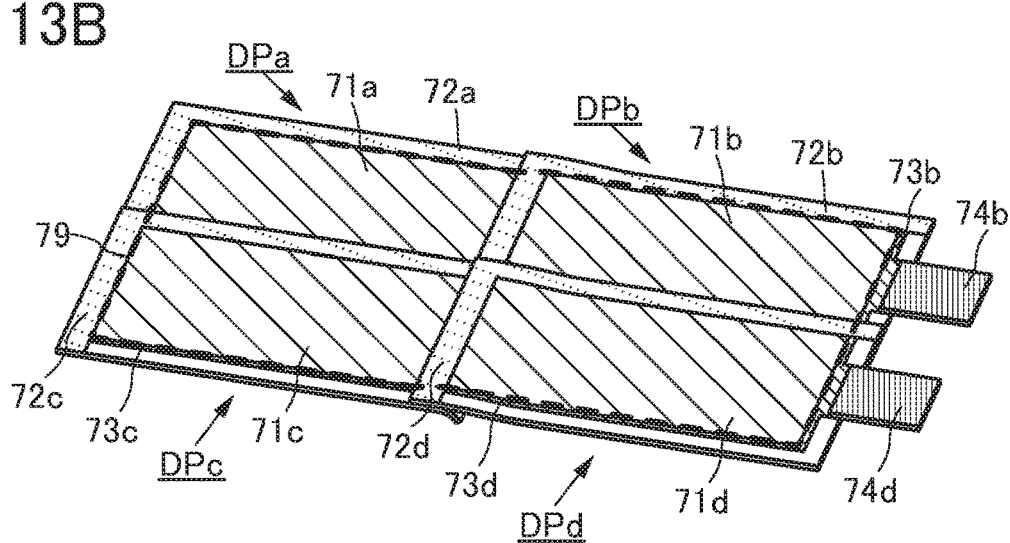
FIGS. 13B and 13C illustrate an arrangement example of display panels.
Figure 13C:
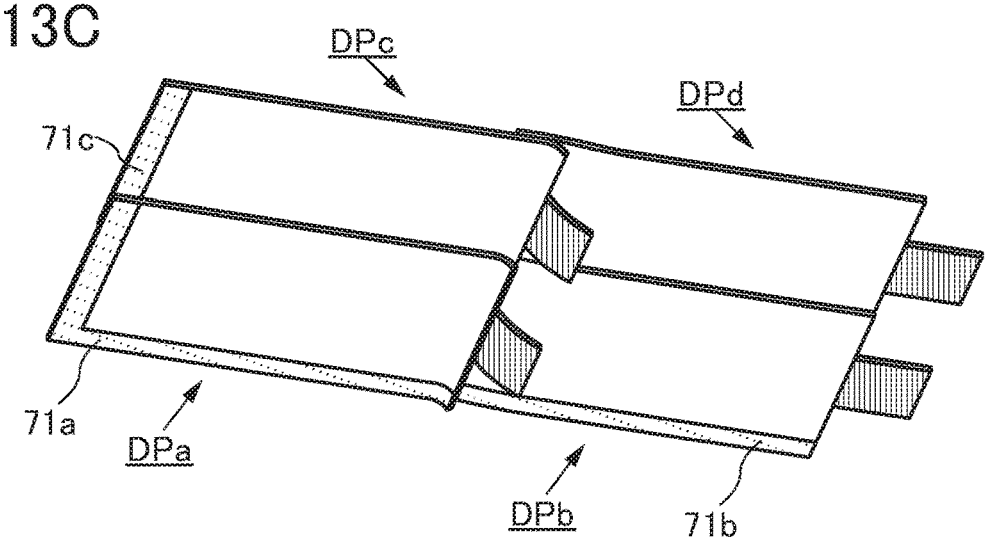

FIG. 13A illustrates a structure example of the display panel DP, and FIGS. 13B and 13C illustrate an arrangement example of the display panels DP.

The display panel DP illustrated in FIG. 13A includes a pixel portion 71, a visible light-transmitting region 72, and a visible light-blocking region 73. The visible light-transmitting region 72 and the visible light-blocking region 73 are each provided adjacent to the pixel portion 71. The display panel DP is provided with a flexible printed circuit (FPC) 74 in the example illustrated in FIG. 13A.

The pixel portion 71 includes a plurality of pixels. In the visible light-transmitting region 72, a pair of substrates included in the display panel DP, a sealant for sealing the display element sandwiched between the pair of substrates, and the like may be provided. Here, for members provided in the visible light-transmitting region 72, materials that transmit visible light are used. In the visible light-blocking region 73, for example, a wiring electrically connected to the pixel in the pixel portion 71 may be provided. Moreover, one or both of the scan line driver circuit 22 and the signal line driver circuit 23 may be provided for the visible light-blocking region 73. Furthermore, a terminal connected to the FPC 74, a wiring connected to the terminal, and the like may be provided for the visible light-blocking region 73.

FIGS. 13B and 13C illustrate an example in which the display panels DP illustrated in FIG. 13A are arranged in a 2×2 matrix (two display panels DP are arranged in the longitudinal direction and the lateral direction). FIG. 13B is a perspective view of the display panel DP on the display surface side, and FIG. 13C is a perspective view of the display panel DP on the side opposite to the display surface side.

Four display panels DP (display panels DPa, DPb, DPc, and DPd) are arranged so as to have regions overlapping with each other. Specifically, the display panels DPa, DPb, DPc, and DPd are arranged so that the visible light-transmitting region 72 of one display panel DP has a region overlapping with the top surface (the display surface side) of the pixel portion 71 of another display panel DP. In addition, the display panels DPa, DPb, DPc, and DPd are arranged so that the visible light-blocking region 73 of one display panel DP does not overlap with the top surface of the pixel portion 71 of another display panel DP. In a portion where the four display panels DP overlap with each other, the display panels DPb, DPc, and DPd overlap with the top surface of the display panel DPa, the top surface of the display panel DPb, and the top surface of the display panel DPc, respectively.

The short side of the display panel DPa and the short side of the display panel DPb overlap with each other, and part of a pixel portion 71a and part of a region 72b transmitting visible light overlap with each other. Furthermore, the long side of the display panel DPa and the long side of the display panel DPc overlap with each other, and part of the pixel portion 71a and part of a region 72c transmitting visible light overlap with each other.

Part of a pixel portion 71b overlap with part of the region 72c transmitting visible light and part of a region 72d transmitting visible light. In addition, part of a pixel portion 71c overlaps with part of the region 72d transmitting visible light.

Therefore, a region where the pixel portions 71a to 71d are placed almost seamlessly can be a display region 79 of the display portion 20C.

Here, it is preferable that the display panel DP have flexibility. For example, a pair of substrates included in the display panel DP preferably has flexibility.

Thus, as illustrated in FIGS. 13B and 13C, a region near an FPC 74a of the display panel DPa can be bent so that part of the display panel DPa and part of the FPC 74a can be placed under the pixel portion 71b of the display panel DPb adjacent to the FPC 74a. As a result, the FPC 74a can be placed without physical interference with the rear surface of the display panel DPb. Furthermore, when the display panel DPa and the display panel DPb overlap with each other and are fixed, it is not necessary to consider the thickness of the FPC 74a; thus, the top surface of the region 72b transmitting visible light and the top surface of the display panel DPa can be substantially leveled. This can make an end portion of the display panel DPb over the pixel portion 71a less noticeable.

Moreover, each display panel DP has flexibility, whereby the display panel DPb can be curved gently so that the top surface of the pixel portion 71b of the display panel DPb and the top surface of the pixel portion 71a of the display panel DPa are equal to each other in height. Thus, the heights of the display regions can be equal to each other except in the vicinity of the region where the display panel DPa and the display panel DPb overlap with each other, so that the display quality of a picture displayed on the display region 79 can be improved.

Although the relation between the display panel DPa and the display panel DPb is taken as an example in the above description, the same can apply to the relation between any other two adjacent display panels DP.

To reduce the step between two adjacent display panels DP, the thickness of the display panel DP is preferably small. For example, the thickness of the display panel DP is preferably less than or equal to 1 mm, further preferably less than or equal to 300 μm, still further preferably less than or equal to 100 μm.

Figure 14A:
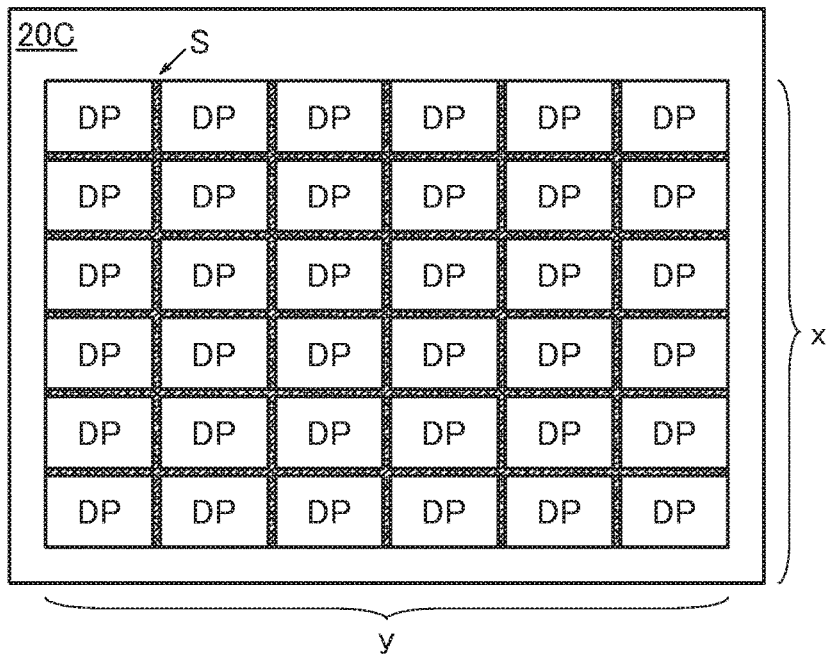
FIG. 14A illustrates an example of a display device.

Here, in the display portion 20C, there is a region where the display panels DP are adjacent to each other, that is, a junction between the display panels DP (a region S in the figure), as illustrated in FIG. 14A. When a picture is displayed using the plurality of display panels DP, picture continuity in the region S is preferably ensured.

Figures 1, 14B:
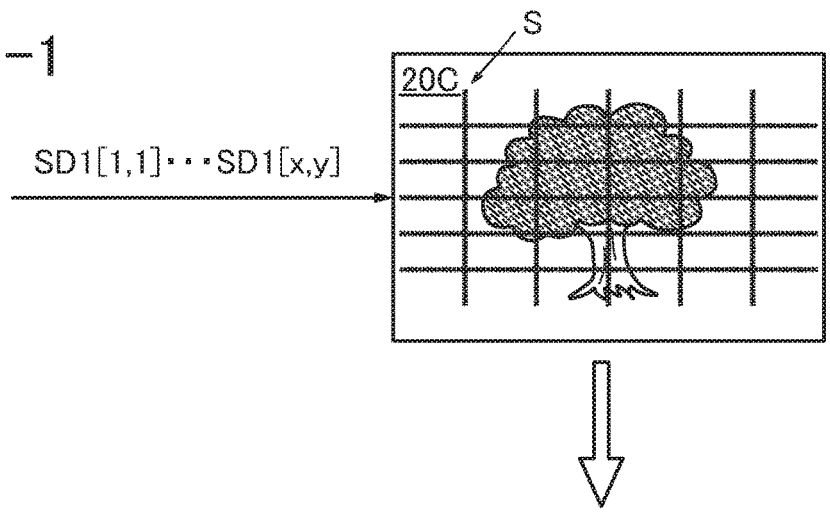
Figures 2, 14B:
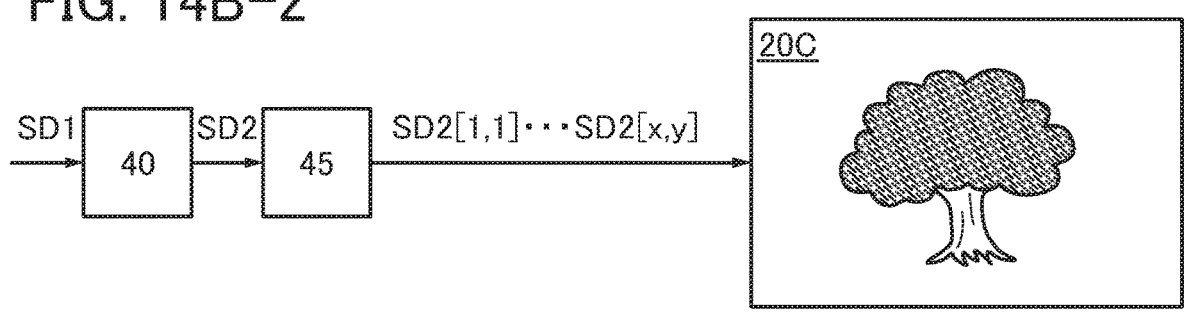

However, there can be variations in the transistor characteristics or capacitor size in the pixels 25, the parasitic resistance or parasitic capacitance of the signal lines SL, the drive capability of the signal line driver circuit 23, and the like among the display panels DP. This can make an error in a picture displayed on each display panel DP when the video signals are supplied to the display panels DP, which might result in picture discontinuity in the junction. Furthermore, in the case where the pixel portion 71 of one display panel DP has a region overlapping with the region 72 of another display panel DP, which transmits visible light, as illustrated in FIGS. 13B and 13C, in the junction, the picture displayed in the pixel portion 71 is viewed through the visible light-transmitting region 72 and a gray level error can be made. Thus, if the pieces of data (the first image data SD1[1, 1] to SD1[$x$, $y$]) obtained by directly dividing the first image data SD1 generated by the first processing unit 33 are supplied to the display panels DP, a picture that is discontinuous at the region S can be viewed as illustrated in FIG. 14B-1.

In view of the above, the display system of one embodiment of the present invention includes the second processing unit 40 having a function of correcting a video signal by utilizing AI. Specifically, the second processing unit 40 can correct the video signal so as to compensate for the picture discontinuity at a junction between display panels DP. In this manner, in the case where the display portion 20 is formed using the plurality of display panels DP, the picture distortion at the junction between the display panels DP can be inconspicuous, improving the quality of the picture.

The second processing unit 40 illustrated in FIG. 11 has a function of correcting the video signal input from the first processing unit 33. Specifically, the second processing unit 40 has a function of correcting the first image data SD1 so that a picture which is continuous at the boundary between two display panels DP is displayed, that is, the picture discontinuity at the junction is compensated for.

The correction of the first image data SD1 is performed by the second processing unit 40. In the second processing unit 40, learning is performed to appropriately correct the video signal so that discontinuity of the picture at the junction is relieved. Then, when the first image data SD1 is supplied to the second processing unit 40, the second processing unit 40 performs inference and outputs the second image data SD2. Then, when the second image data SD2 generated by the second processing unit 40 is divided by the dividing portion 45 and the resulting x×y pieces of second image data SD2[p, q] are supplied to the display panel DP[p, q], a picture with an inconspicuous junction as illustrated in FIG. 14B-2 is displayed.

Specifically, processing for making the junction brighter than other regions can be performed. As a result, one picture with an inconspicuous junction can be naturally displayed over the plurality of display panels DP. Furthermore, since display unevenness can be corrected at the same time, display quality of the display portion can be further improved.

The display system of one embodiment of the present invention may include the plurality of second processing units 40. For example, one second processing unit 40 may be provided for one display panel DP. The plurality of second processing units 40 can perform arithmetic operation in parallel; thus, high-speed processing can be achieved. Examples of the display system including the plurality of second processing units 40 will be described in below with reference to FIG. 15 and FIG. 16.

Figure 15:
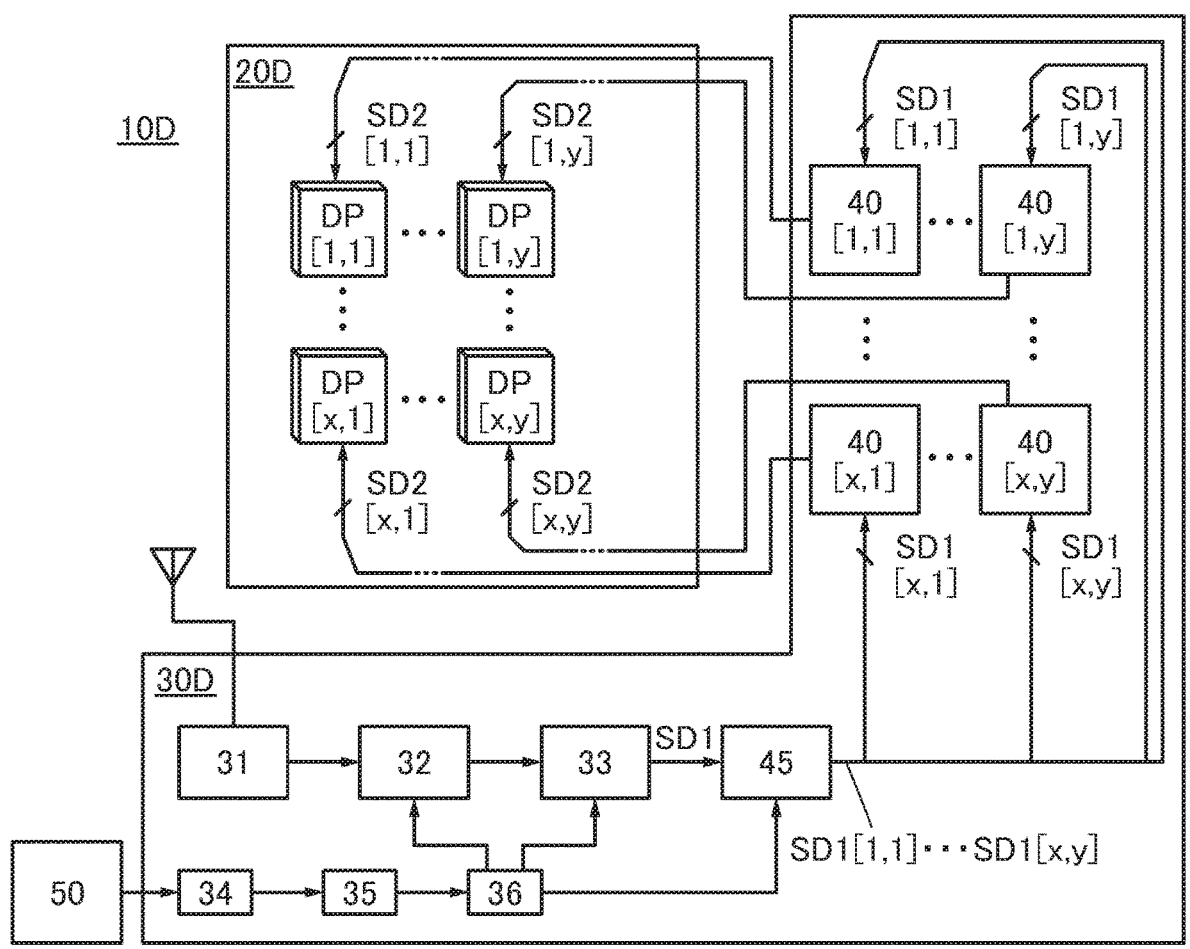
FIG. 15 illustrates an example of a display system.

FIG. 15 is a block diagram of a display system 10D. The display system 10D includes a display portion 20D and a signal generation portion 30D. The display portion 20D includes the plurality of display panels DP. The signal generation portion 30D includes the plurality of second processing units 40. FIG. 15 illustrates an example in which the number of the display panels DP and the number of the second processing units 40 are the same.

In the display system 10D, the first image data SD1 generated by the first processing unit 33 is divided into x×y pieces of data by the dividing portion 45. When first image data SD1[p, q] is supplied from the dividing portion 45 to a second processing unit 40[p, q], the second processing unit 40[p, q] corrects the first image data SD1[p, q] to generate the second image data SD2[p, q]. Subsequently, the second image data SD2[p, q] is supplied to the display panel DP[p, q].

Figure 16:
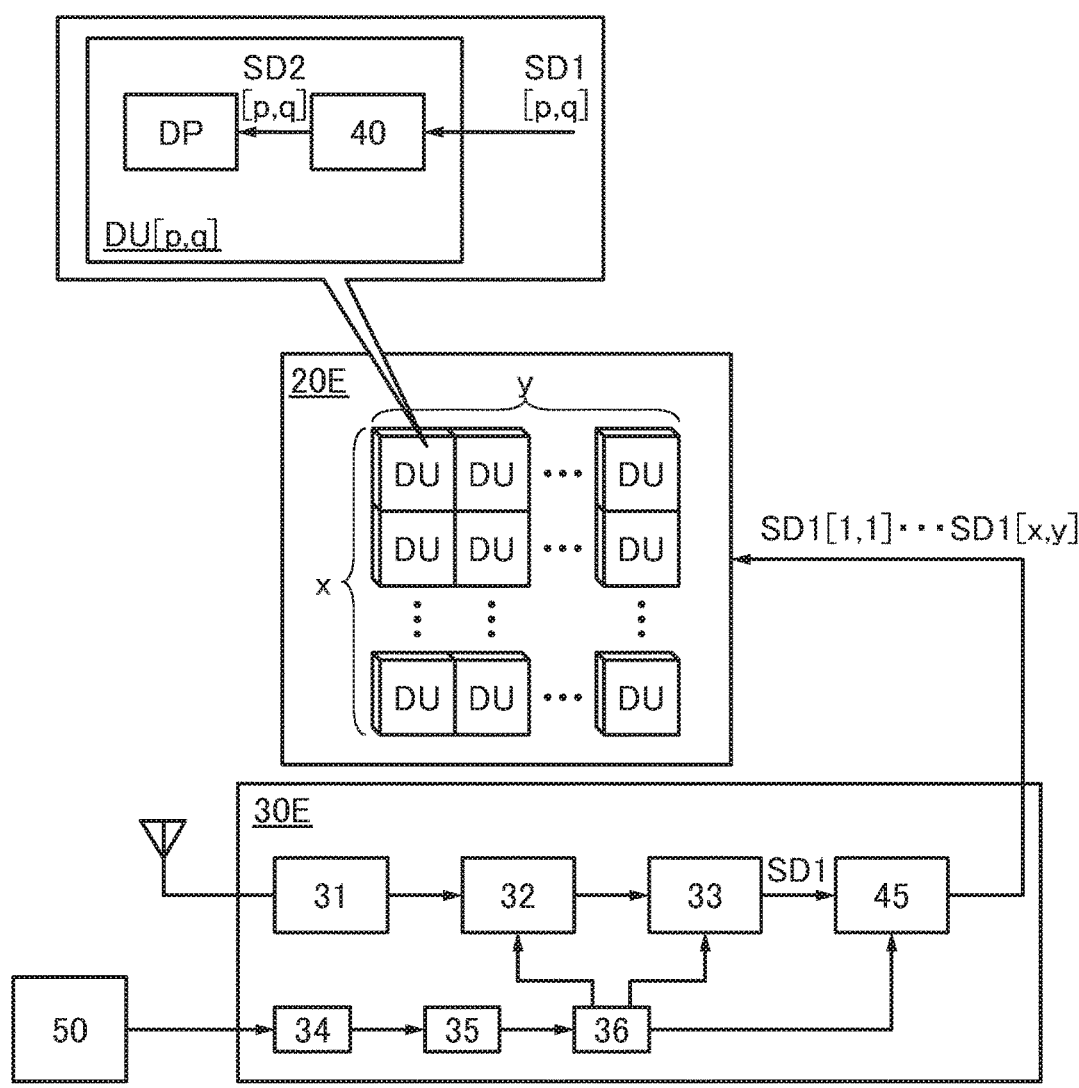
FIG. 16 illustrates an example of a display system.

FIG. 16 is a block diagram of a display system 10E. The display system 10E includes a display portion 20E and a signal generation portion 30E. The display portion 20E includes a plurality of display units DU. The display unit DU includes the display panel DP and the second processing unit 40. FIG. 16 illustrates an example in which the number of the display panels DP and the number of the second processing units 40 are the same.

In the display system 10E, the first image data SD1 generated by the first processing unit 33 is divided into x×y pieces of data by the dividing portion 45. First image data SD1[1, 1] to SD1[x, y] are supplied from the dividing portion 45 to the display portion 20E. When the first image data SD1[p, q] is supplied to the second processing unit 40[p, q] of a display unit DU[p, q], the second processing unit 40[p, q] corrects the first image data SD1[p, q] to generate the second image data SD2[p, q]. Subsequently, the second image data SD2[p, q] is supplied to the display panel DP[p, q].

<1-6. Learning and Inference Example in Second Processing Unit 40>

Learning and inference example in the second processing unit 40 will be described in below with reference to FIGS. 17A to 17C and FIGS. 18A to 18C.

FIGS. 5A to 5C show an example in which the image data DD1 for learning is obtained by using the first image data SD1 and learning by the second processing unit 40 is performed by using the image data DD1. In one embodiment of the present invention, image data for second learning may be obtained by using the second image data SD2 corrected by the second processing unit 40 which has finished the first learning. The second learning by the second processing unit 40 can be performed by using the image data for the second learning. Thus, the accuracy of correction of image data can be improved. Similarly, image data for third and subsequent learning may be obtained by using image data corrected by the second processing unit 40 which has performed learning at least twice. That is, learning may be performed three or more times.

The second processing unit 40 using AI is preferable because the number of learning can be reduced in some cases. Alternatively, learning is preferably performed for a sufficient number of times because complicated AI may be unnecessary.

The case where learning by the second processing unit 40 is performed twice will be described in below. Note that description with reference to FIGS. 5A to 5C can be referred to for learning and inference.

Figure 17A:
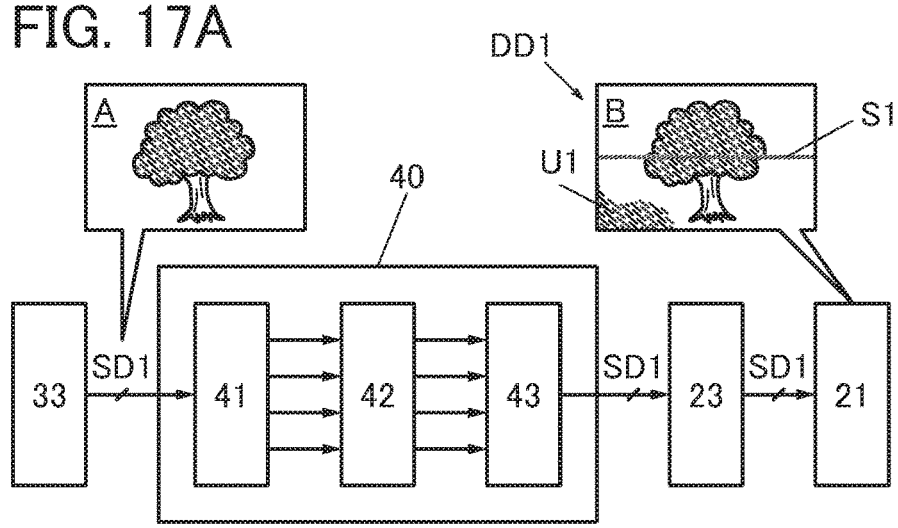
FIGS. 17A to 17C illustrate an example of processing performed in a display system.
Figure 17B:
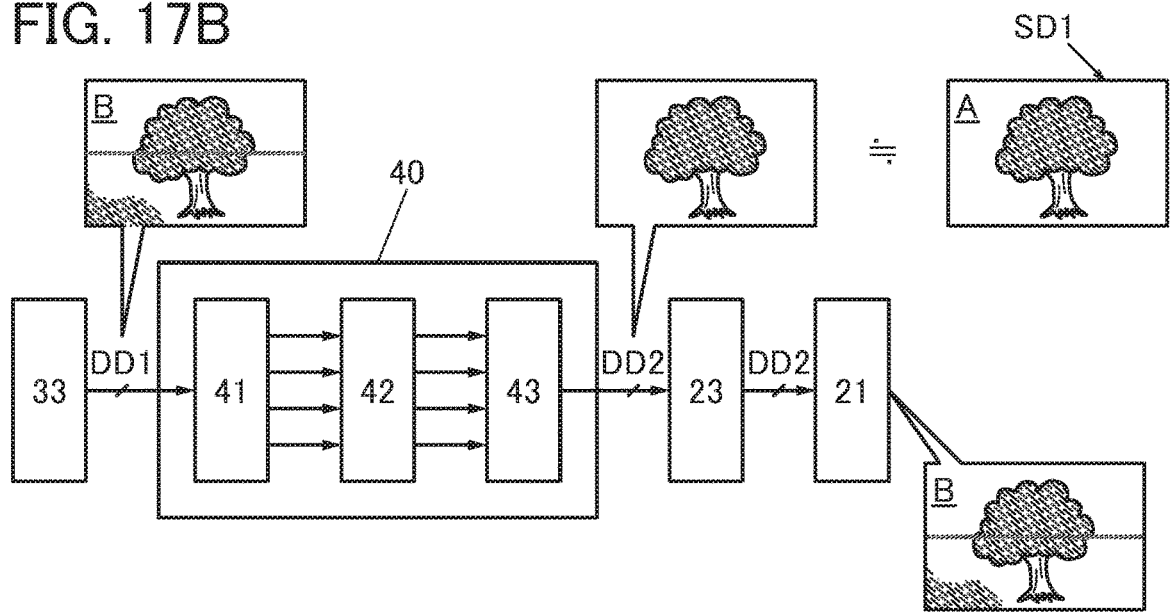
Figure 17C:
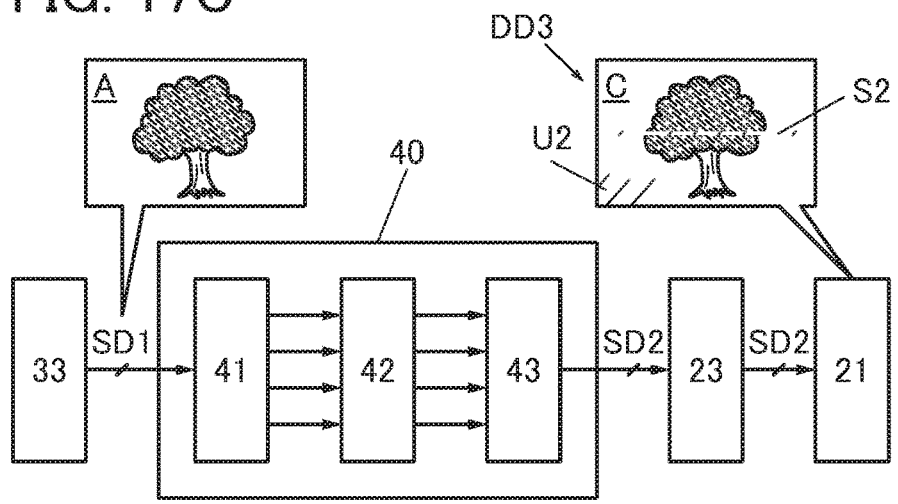
Figure 18A:
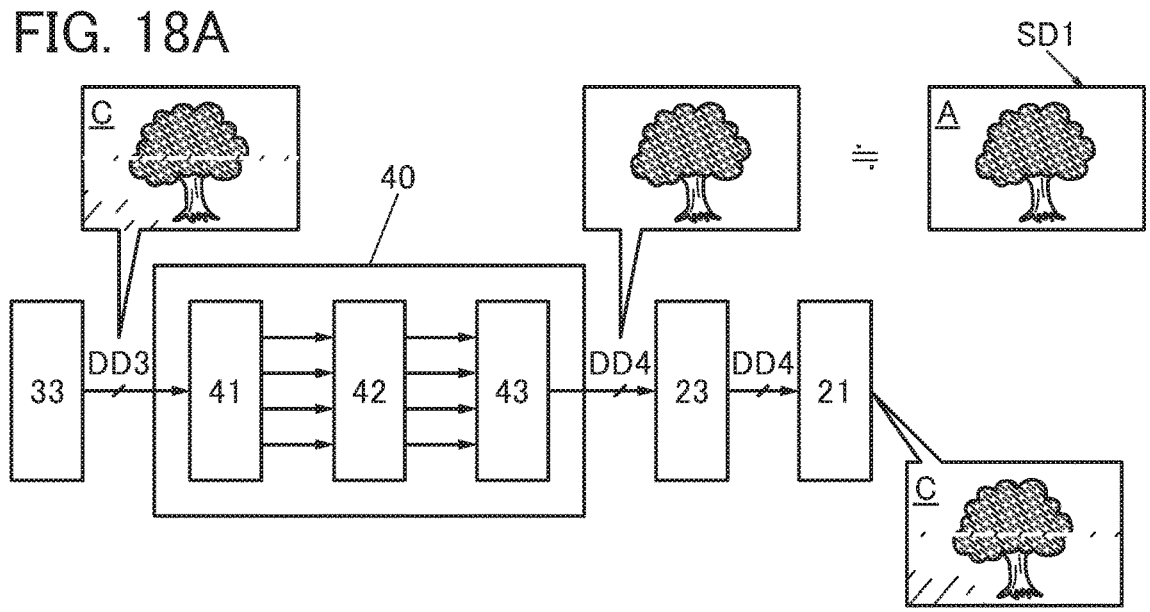
FIGS. 18A to 18C illustrate an example of processing performed in a display system.
Figure 18B:
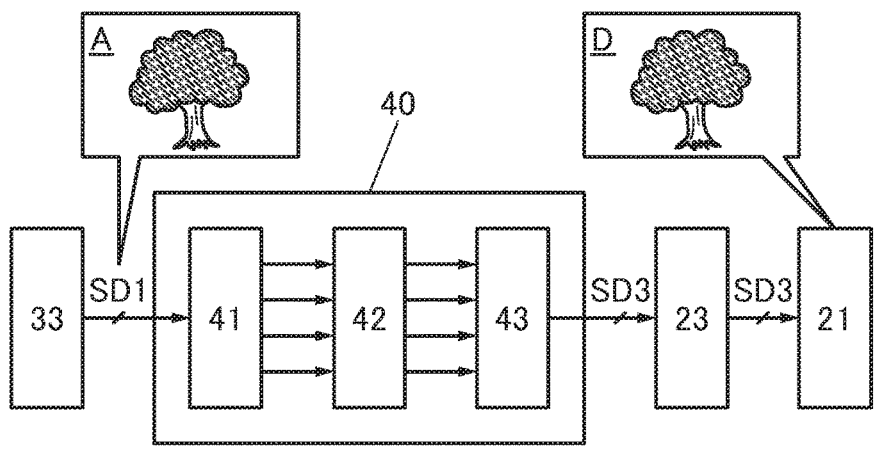

FIG. 17A illustrates a state before learning by the second processing unit 40. FIG. 17B illustrates a state at the time of first learning by the second processing unit 40. FIG. 17C illustrates a state at the time of inference by the second processing unit 40 after the first learning. FIG. 18A illustrates a state at the time of second learning by the second processing unit 40. FIG. 18B illustrates a state at the time of inference by the second processing unit 40 after the second learning.

First in FIG. 17A, the first image data SD1 is output from the first processing unit 33. The first image data SD1 is image data corresponding to the picture A. Before learning by the second processing unit 40, the first image data SD1 is not corrected and is output to the signal line driver circuit 23 through the second processing unit 40. The first image data SD1 is supplied to the pixel portion 21, and the pixel portion 21 displays a picture on the basis of the first image data SD1. The picture actually displayed on the pixel portion 21 at this time is referred to as the picture B. Note that the picture B may be displayed on the pixel portion 21 by supplying the first image data SD1 from the first processing unit 33 to the signal line driver circuit 23 directly, that is, without through the second processing unit 40.

FIG. 17A illustrates a state in which a junction (a region S1) and display unevenness (a region U1) are recognized in the picture B.

If a junction, display unevenness, or the like is recognized in the picture B, learning by the second processing unit 40 is performed.

For the learning by the second processing unit 40, image data corresponding to the picture B actually displayed on the pixel portion 21 (hereinafter denoted as image data DD1) is used as learning data.

As the image data DD1, for example, gray level data or luminance data can be used. The image data DD1 can be obtained with an image sensor, a camera, a two-dimensional luminance meter, an optical inspection system for displays, or the like.

Then, the image data DD1 is supplied to the second processing unit 40 as illustrated in FIG. 17B. In the second processing unit 40, a weight coefficient used in the second processing unit 40 is updated so that the difference between corrected image data DD2 and the first image data SD1 becomes equal to or lower than a certain level. A gradient descent method or the like can be used to update the weight coefficient, and a backpropagation method or the like can be used for calculation of a gradient. The update of the weight coefficient repeats until the difference between the image data DD2 and the first image data SD1 becomes equal to or lower than a certain level. Note that the allowable range of the difference can be determined arbitrarily.

When the difference between the image data DD2 and the first image data SD1 finally becomes equal to or lower than a certain level, the second processing unit 40 finishes the first learning. As illustrated in FIG. 17B, the image data DD1 is input to the second processing unit 40 which has finished the first learning, whereby the corrected image data DD2 is output to the signal line driver circuit 23. Then, the image data DD2 is supplied to the pixel portion 21, and the pixel portion 21 displays a picture on the basis of the image data DD2. The picture actually displayed on the pixel portion 21 at this time is similar to the picture B (difference between the picture actually displayed at this time and the picture B is lower than or equal to a certain level).

Next, the first image data SD1 is corrected by the inference of the second processing unit 40 which has performed the first learning. As illustrated in FIG. 17C, when the first image data SD1 is input to the second processing unit 40, the second processing unit 40 performs arithmetic operation by using the weight coefficient updated by the learning and corrects the first image data SD1. The result of the arithmetic operation is output from the second processing unit 40 as the second image data SD2 and supplied to the pixel portion 21 through the signal line driver circuit 23.

Here, the second image data SD2 is image data corrected by the second processing unit 40 which has performed the learning (FIG. 17B) so as to compensate for the junction in the picture B. Therefore, when the second image data SD2 is supplied to the pixel portion 21, the picture C whose junction is less likely to be recognized than that of the picture B is displayed.

However, a junction or display unevenness is not completely removed in some cases. FIG. 17C illustrates a state in which a junction (a region S2) and display unevenness (a region U2) are recognized in the picture C.

If a junction, display unevenness, or the like is recognized in the picture C, second learning by the second processing unit 40 is preferably performed.

For the second learning by the second processing unit 40, image data corresponding to the picture C actually displayed on the pixel portion 21 (hereinafter denoted as image data DD3) is used as learning data.

As the image data DD3, for example, gray level data or luminance data can be used. The image data DD3 can be obtained with an image sensor, a camera, a two-dimensional luminance meter, a two-dimensional color luminance meter, an inspection system for displays, or the like. The image data DD1 and the image data DD3 may be obtained by the same method or different methods.

Specifically, the image data DD3 is supplied to the second processing unit 40 as illustrated in FIG. 18A. In the second processing unit 40, a weight coefficient used in the second processing unit 40 is updated so that the difference between corrected image data DD4 and the first image data SD1 becomes equal to or lower than a certain level. The update of the weight coefficient repeats until the difference between the image data DD4 and the first image data SD1 becomes equal to or lower than a certain level.

When the difference between the image data DD4 and the first image data SD1 finally becomes equal to or lower than a certain level, the second processing unit 40 finishes the second learning. As illustrated in FIG. 18A, the image data DD3 is input to the second processing unit 40 which has finished the second learning, whereby the corrected image data DD4 is output to the signal line driver circuit 23. Then, the image data DD4 is supplied to the pixel portion 21, and the pixel portion 21 displays a picture on the basis of the image data DD4. The picture actually displayed on the pixel portion 21 at this time is similar to the picture C (difference between the picture actually displayed at this time and the picture C is lower than or equal to a certain level).

Next, the first image data SD1 is corrected by the inference of the second processing unit 40 which has performed the second learning. As illustrated in FIG. 18B, when the first image data SD1 is input to the second processing unit 40, the second processing unit 40 performs arithmetic operation by using the weight coefficient updated by the learning and corrects the first image data SD1. The result of the arithmetic operation is output from the second processing unit 40 as third image data SD3 and supplied to the pixel portion 21 through the signal line driver circuit 23.

Here, the third image data SD3 is image data corrected by the second processing unit 40 which has performed the second learning (FIG. 18A) so as to compensate for the junction in the picture B. Therefore, when the third image data SD3 is supplied to the pixel portion 21, a picture D whose junction is less likely to be recognized than that of the picture C is displayed. The picture D is similar to the picture A (difference between the picture D and the picture A is lower than or equal to a certain level).

Note that if a junction or display unevenness is recognized in the picture D, third learning may be performed. As described above, learning using image data obtained by correction is repeated, whereby image data can be corrected with higher accuracy.

By correcting the image data by using the second processing unit 40 in the above-described manner, the junction is not recognized in the displayed picture. Thus, the quality of a high-resolution picture can be improved.

Figure 18C:
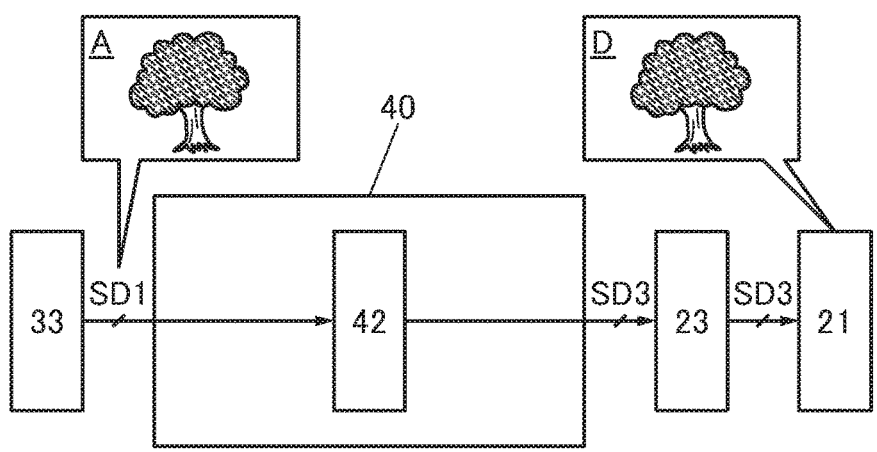

Note that the second processing unit 40 may include only the second layer 42 as illustrated in FIG. 18C. Filter processing can be performed in the second layer 42. In one embodiment of the present invention, the value of a correction filter can be determined by using not only image data before correction (the first image data SD1) but also image data after correction (the second image data SD2 or the like). Thus, the accuracy of correction of image data can be improved even without the first layer 41 and the third layer 43.

When arithmetic operation of the second processing unit 40 is performed by hardware, an arithmetic circuit including a transistor containing silicon or an oxide semiconductor in a channel formation region is favorable for the hardware. For example, an arithmetic circuit including a transistor containing silicon (amorphous silicon, low-temperature polysilicon, or single crystal silicon) or an oxide semiconductor in a channel formation region is preferable. When product-sum operation is performed in the second processing unit 40, an analog circuit is favorable for a product-sum operation circuit. This will be described in detail in Embodiment 2. In addition, a transistor containing an oxide semiconductor is favorably included in an analog memory.

The display system of one embodiment of the present invention can display a picture with inconspicuous display unevenness or an inconspicuous junction by correcting image data using a processing unit including three layers. In a first layer, arithmetic data is generated by using input image data. The arithmetic data contains a larger amount of data than the image data. In a second layer, the arithmetic data is multiplied by a weight coefficient. In a third layer, image data is generated by using the arithmetic data which has been multiplied by the weight coefficient. The image data contains a smaller amount of data than the arithmetic data. Since the arithmetic data containing a larger amount of data than the image data is generated in the first layer, the amount of data used for arithmetic operation in the second layer can be increased. Thus, the accuracy of correction of image data in the processing unit can be improved. Accordingly, display in which display unevenness, a junction between divided screens, a junction between a plurality of display panels, and the like are hardly recognized can be performed.

This embodiment can be combined with any of other embodiments as appropriate. In the case where a plurality of structure examples are described in one embodiment in this specification, some of the structure examples can be combined as appropriate.

Embodiment 2

In this embodiment, a structure example of a semiconductor device that can be used in a neural network is described.

The arithmetic operation of the second processing unit 40 described in Embodiment 1 includes the operation that sums the products of pixel data or arithmetic data and weight coefficients, that is, the product-sum operation. This product-sum operation may be performed using a program on software or using hardware. In the case where the product-sum operation is performed by hardware, a product-sum arithmetic circuit can be used. A digital circuit or an analog circuit may be used as this product-sum arithmetic circuit. In the case where an analog circuit is used as the product-sum arithmetic circuit, the circuit scale of the product-sum arithmetic circuit can be reduced, or higher processing speed and lower power consumption can be achieved by reduced frequency of access to a memory.

The product-sum arithmetic circuit may be formed of a transistor including silicon (such as single crystal silicon) in a channel formation region (hereinafter also referred to as a Si transistor) or a transistor containing an oxide semiconductor in a channel formation region (hereinafter also referred to as an OS transistor). An OS transistor is particularly favorably used as a transistor included in a memory of the product-sum arithmetic circuit because of its extremely low off-state current. Note that the product-sum arithmetic circuit may be formed of both a Si transistor and an OS transistor. A structure example of a semiconductor device having a function of the product-sum arithmetic circuit is described below.

<Structure Example of Semiconductor Device>

Figure 19:
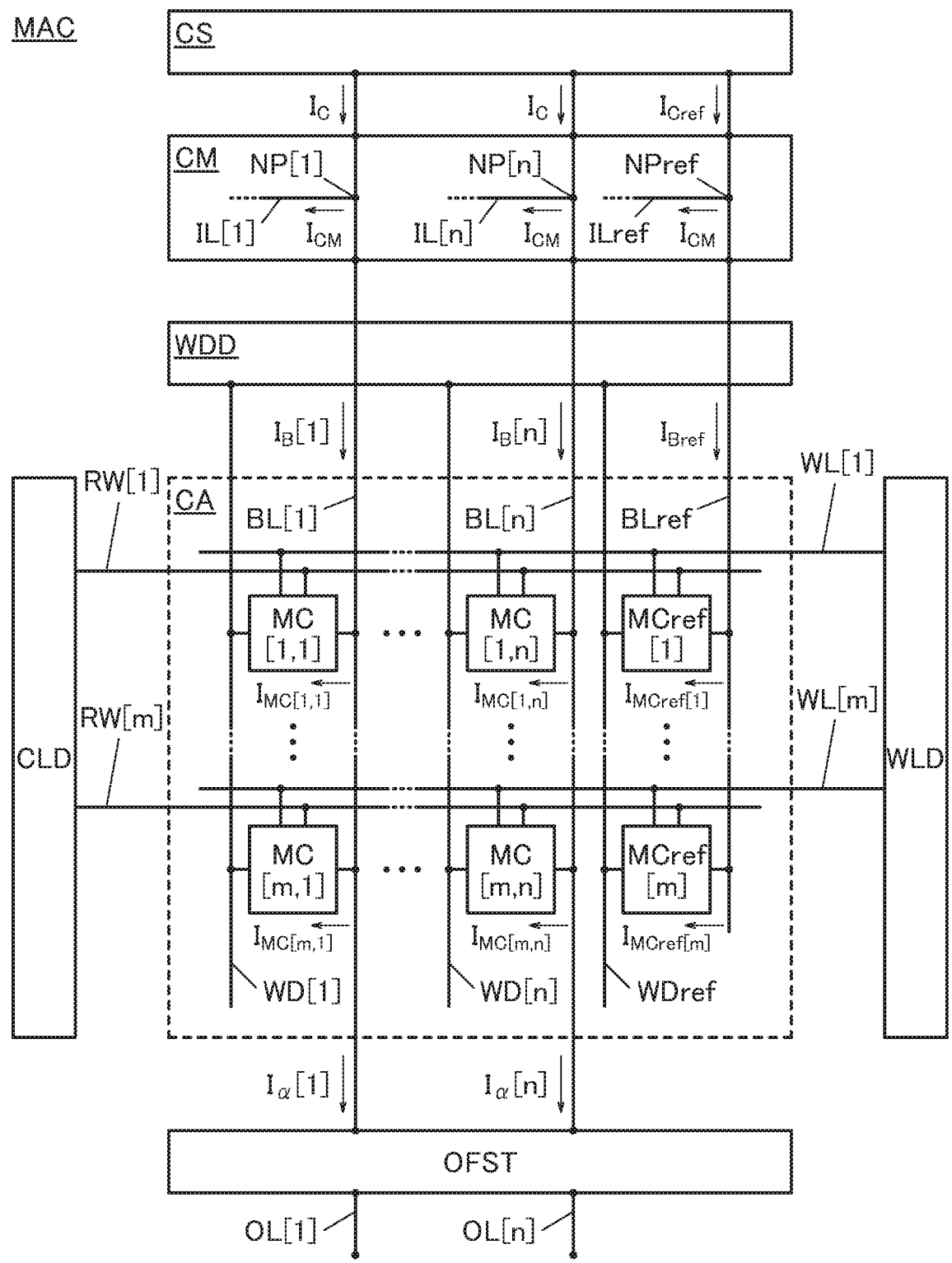
FIG. 19 illustrates a configuration example of a semiconductor device.

FIG. 19 illustrates a structure example of a semiconductor device MAC having a function of performing operation of the neural network. The semiconductor device MAC has a function of performing product-sum operation of first data corresponding to the strength (weight) of connection between the neurons and second data corresponding to input data. Note that the first data and the second data can each be analog data or multilevel digital data (discrete data).

The semiconductor device MAC also has a function of converting data obtained by the product-sum operation with the activation function.

The semiconductor device MAC includes a cell array CA, a current source circuit CS, a current mirror circuit CM, a circuit WDD, a circuit WLD, a circuit CLD, and an offset circuit OFST.

The cell array CA includes a plurality of memory cells MC and a plurality of memory cells MCref. In the structure example illustrated in FIG. 19, the cell array CA includes the memory cells MC in m rows and n columns (memory cells MC[1, 1] to MC[m, n]) and in memory cells MCref (memory cells MCref[1] to MCref[m]) (m and n are integers greater than or equal to 1). The memory cells MC have a function of storing the first data. In addition, the memory cells MCref have a function of storing reference data used for the product-sum operation. Note that the reference data can be analog data or multilevel digital data.

The memory cell MC[i, j] is connected to a wiring WL[i], a wiring RW[i], a wiring WD[j], and a wiring BL[j] (i is an integer greater than or equal to 1 and less than or equal to in, and j is an integer greater than or equal to 1 and less than or equal to n). In addition, the memory cell MCref[i] is connected to the wiring WL[i], the wiring RW[i], a wiring WDref, and a wiring BLref. Here, a current flowing between the memory cell MC[i, j] and the wiring BL[j] is denoted by $I_{MC[i,j]}$, and a current flowing between the memory cell MCref[i] and the wiring BLref is denoted by $I_{MCref[i]}$.

Figure 20:
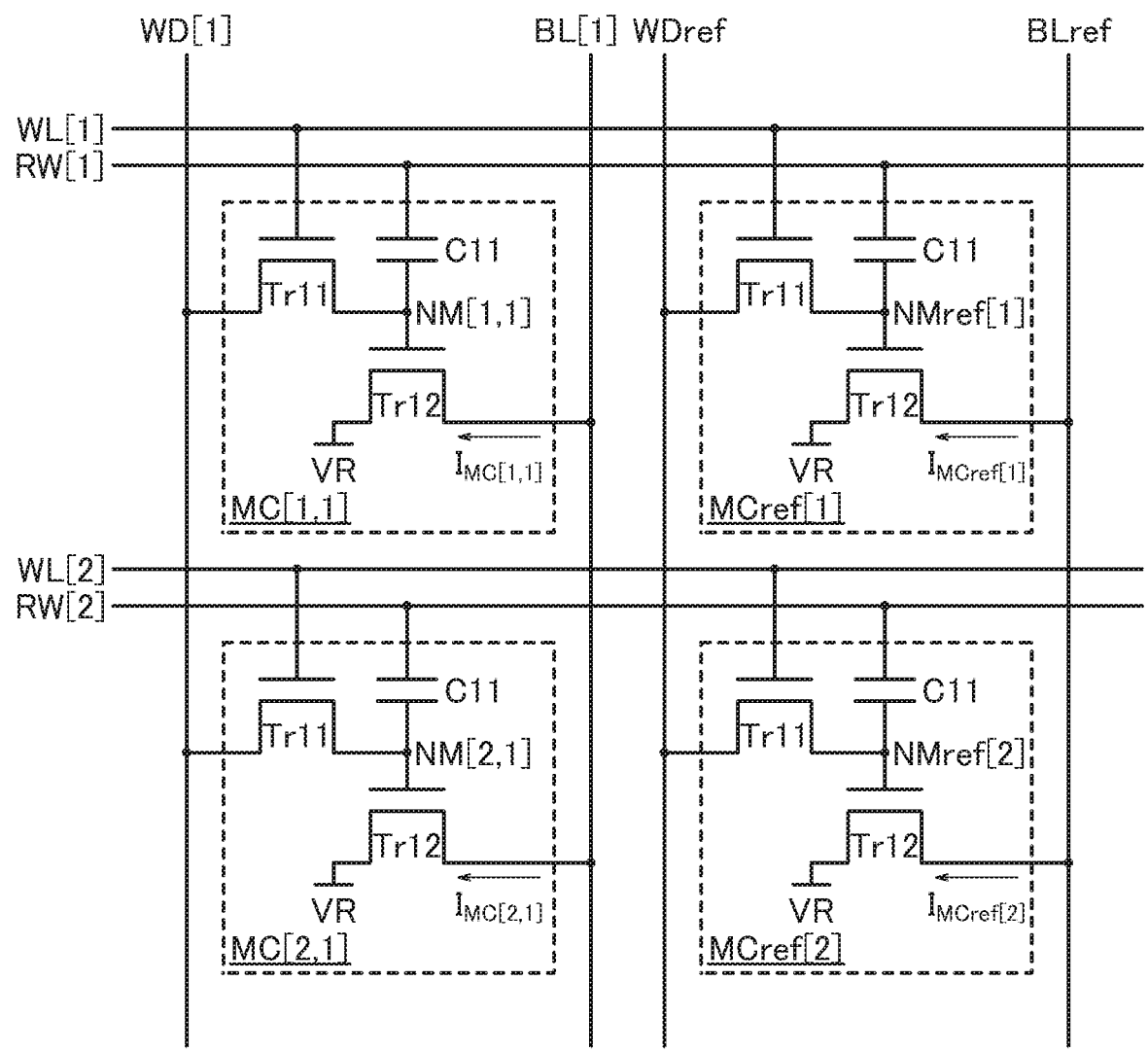
FIG. 20 illustrates a configuration example of a memory cell.

FIG. 20 illustrates a specific structure example of the memory cell MC and the memory cell MCref. Although the memory cells MC[1, 1] and MC[2, 1] and the memory cells MCref[1] and MCref[2] are given as typical examples in FIG. 20, similar structures can also be used for other memory cells MC and other memory cells MCref. The memory cells MC and the memory cells MCref each include a transistor Tr11, a transistor Tr12, and a capacitor C11. Here, the case where the transistors Tr11 and Tr12 are n-channel transistors is described.

In the memory cell MC, a gate of the transistor Tr11 is connected to the wiring WL, one of a source and a drain of the transistor Tr11 is connected to a gate of the transistor Tr12 and a first electrode of the capacitor C11, and the other of the source and the drain of the transistor Tr11 is connected to the wiring WD. One of a source and a drain of the transistor Tr12 is connected to the wiring BL, and the other of the source and the drain thereof is connected to a wiring VR. A second electrode of the capacitor C11 is connected to the wiring RW. The wiring VR has a function of supplying a predetermined potential. An example in which a low power source potential (e.g., a ground potential) is supplied from the wiring VR is described below.

A node connected to the one of the source and the drain of the transistor Tr11, the gate of the transistor Tr12, and the first electrode of the capacitor C11 is referred to as a node NM. The nodes NM included in the memory cells MC[1, 1] and MC[2, 1] are referred to as nodes NM[1, 1] and NM[2, 1], respectively.

The memory cells MCref have a structure similar to that of the memory cell MC. However, the memory cells MCref are connected to the wiring WDref instead of the wiring WD and connected to a wiring BLref instead of the wiring BL. Furthermore, a node NMref[1] in the memory cell MCref[1] and a node NMref[2] in the memory cell MCref[2] refer to nodes each of which is connected to the one of the source and the drain of the transistor Tr11, the gate of the transistor Tr12, and the first electrode of the capacitor C11.

The nodes NM and NMref function as holding nodes of the memory cells MC and MCref, respectively. The first data is held in the node NM and the reference data is held in the node NMref. Furthermore, currents $I_{MC[1, 1]}$ and $I_{MC[2, 1]}$ flow from the wiring BL[1] to the transistors Tr12 of the memory cells MC[1, 1] and MC[2, 1], respectively. Currents $I_{MCref[1, 1]}$ and $I_{MCref[2]}$ flow from the wiring BLref to the transistor Tr12 of the memory cells MCref[1] and MCref[2], respectively.

Since the transistor Tr11 has a function of holding a potential of the node NM or the node NMref, the off-state current of the transistor Tr11 is preferably low. Thus, it is preferable to use an OS transistor, which has extremely low off-state current, as the transistor Tr11. This suppresses a change in the potential of the node NM or the node NMref, so that the operation accuracy can be increased. Furthermore, operations of refreshing the potential of the node NM or the node NMref can be performed with less frequency, which leads to a reduction in power consumption.

There is no particular limitation on the transistor Tr12, and for example, a Si transistor, an OS transistor, or the like can be used. In the case where an OS transistor is used as the transistor Tr12, the transistor Tr12 can be manufactured with the same manufacturing apparatus as the transistor Tr11, and accordingly manufacturing cost can be reduced. Note that the transistor Tr12 may be an n-channel transistor or a p-channel transistor.

The current source circuit CS is connected to the wirings BL[1] to BL[n] and the wiring BLref. The current source circuit CS has a function of supplying currents to the wirings BL[1] to BL[n] and the wiring BLref. Note that the value of the current supplied to the wirings BL[1] to BL[n] may be different from that of the current supplied to the wiring BLref. Here, the current supplied from the current source circuit CS to the wirings BL[1] to BL[n] is denoted by $I_C$, and the current supplied from the current source circuit CS to the wiring BLref is denoted by $I_{Cref}$.

The current mirror circuit CM includes wirings IL[1] to IL[n] and a wiring ILref. The wirings IL[1] to IL[n] are connected to the wirings BL[1] to BL[n], respectively, and the wiring ILref is connected to the wiring BLref. Here, a connection portion between the wirings IL[1] and BL[1] to a connection portion between the wirings IL[n] and BL[n] are referred to as nodes NP[1] to NP[n], respectively. Furthermore, a connection portion between the wiring ILref and the wiring BLref is referred to as a node NPref.

The current mirror circuit CM has a function of flowing a current $I_{CM}$ corresponding to the potential of the node NPref to the wiring ILref and a function of flowing this current $I_{CM}$ also to the wirings IL[1] to IL[n]. In the example illustrated in FIG. 19, the current $I_{CM}$ is discharged from the wiring BLref to the wiring ILref, and the current $I_{CM}$ is discharged from the wirings BL[1] to BL[n] to the wirings IL[1] to IL[n]. Furthermore, currents flowing from the current mirror circuits CM to the cell array CA through the wirings BL[1] to BL[n] are denoted by $I_B[1]$ to $I_B[n]$, respectively. Furthermore, a current flowing from the current mirror circuit CM to the cell array CA through the wiring BLref is denoted by $I_{Bref}$.

The circuit WDD is connected to wirings WD[1] to WD[n] and the wiring WDref. The circuit WDD has a function of supplying a potential corresponding to the first data stored in the memory cells MC to the wirings WD[1] to WD[n]. The circuit WDD also has a function of supplying a potential corresponding to the reference data stored in the memory cell MCref to the wiring WDref. The circuit WLD is connected to wirings WL[1] to WL[m]. The circuit WLD has a function of supplying a signal for selecting the memory cell MC or MCref to which data is to be written to any of the wirings WL[1] to WL[m]. The circuit CLD is connected to wirings RW[1] to RW[m]. The circuit CLD has a function of supplying a potential corresponding to the second data to the wirings RW[1] to RW[m].

The offset circuit OFST is connected to the wirings BL[1] to BL[n] and wirings OL[1] to OL[n]. The offset circuit OFST has a function of detecting the amount of currents flowing from the wirings BL[1] to BL[n] to the offset circuit OFST and/or the amount of a change in the currents flowing from the wirings BL[1] to BL[n] to the offset circuit OFST. The offset circuit OFST also has a function of outputting a detection result to the wirings OL[1] to OL[n]. Note that the offset circuit OFST may output a current corresponding to the detection result to the wiring OL, or may convert the current corresponding to the detection result into a voltage to output the voltage to the wiring OL. The currents flowing between the cell array CA and the offset circuit OFST are denoted by $I_\alpha[1]$ to $I_\alpha[n]$.

Figure 21:
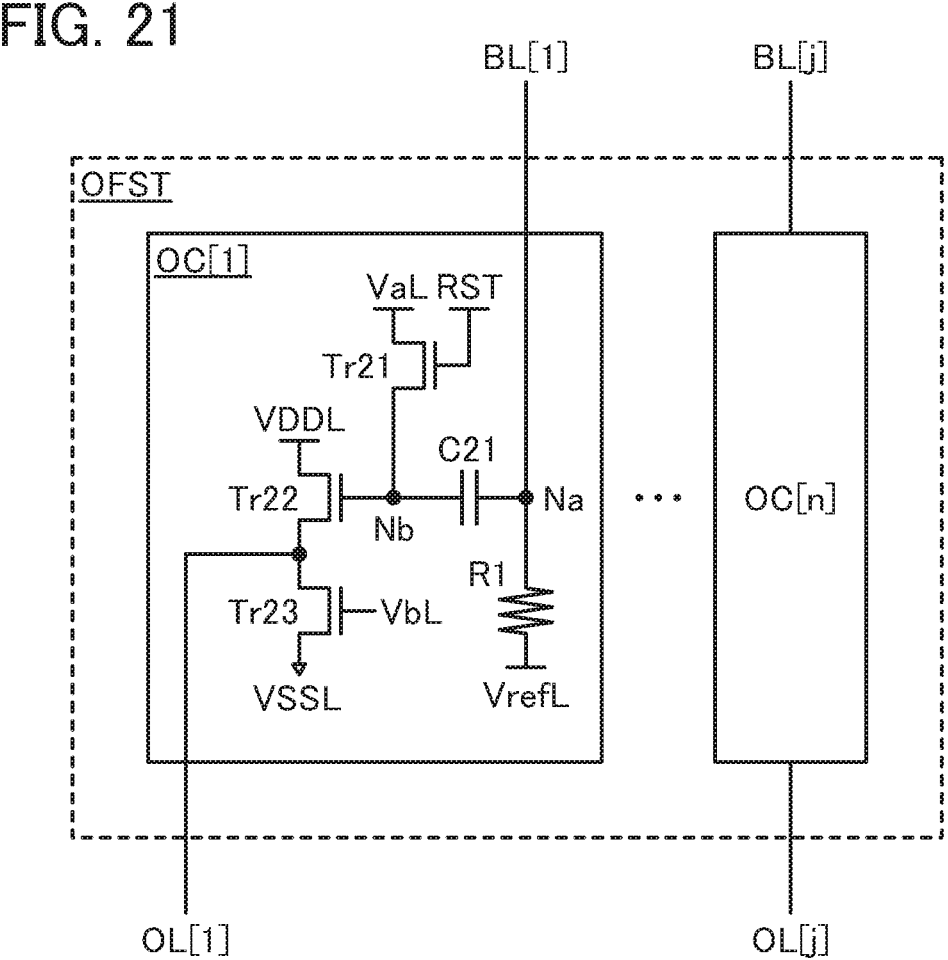
FIG. 21 illustrates a configuration example of an offset circuit.

FIG. 21 illustrates a structure example of the offset circuit OFST. The offset circuit OFST illustrated in FIG. 21 includes circuits OC[1] to OC[n]. Furthermore, the circuits OC[1] to OC[n] each include a transistor Tr21, a transistor Tr22, a transistor Tr23, a capacitor C21, and a resistor R1. Connection relations of the elements are as illustrated in FIG. 21. Note that a node connected to a first electrode of the capacitor C21 and a first terminal of the resistor R1 is referred to as a node Na. In addition, a node connected to a second electrode of the capacitor C21, one of a source and a drain of a transistor Tr21, and a gate of the transistor Tr22 is referred to as a node Nb.

A wiring VrefL has a function of supplying a potential Vref, a wiring VaL has a function of supplying a potential Va, and a wiring VbL has a function of supplying a potential Vb. Furthermore, a wiring VDDL has a function of supplying a potential VDD, and a wiring VSSL has a function of supplying a potential VSS. Here, the case where the potential VDD is a high power supply potential and the potential VSS is a low power supply potential is described. Furthermore, a wiring RST has a function of supplying a potential for controlling the conduction state of the transistor Tr21. The transistor Tr22, the transistor Tr23, the wiring VDDL, the wiring VSSL, and the wiring VbL form a source follower circuit.

Next, an operation example of the circuits OC[1] to OC[n] is described. Note that although an operation example of the circuit OC[1] is described here as a typical example, the circuits OC[2] to OC[n] can be operated in a manner similar to that of the circuit OC[1]. First, when a first current flows to the wiring BL[1], the potential of the node Na becomes a potential corresponding to the first current and the resistance value of the resistor R1. At this time, the transistor Tr21 is turned on, and thus the potential Va is supplied to the node Nb. Then, the transistor Tr21 is turned off.

Next, when a second current flows to the wiring BL[1], the potential of the node Na becomes a potential corresponding to the second current and the resistance value of the resistor R1. At this time, since the transistor Tr21 is in an off state and the node Nb is in a floating state, the potential of the node Nb is changed owing to capacitive coupling, following the change in the potential of the node Na. Here, when the amount of change in the potential of the node Na is $\Delta V_{Na}$ and the capacitive coupling coefficient is 1, the potential of the node Nb is Va+$\Delta V_{Na}$. In addition, when the threshold voltage of the transistor Tr22 is $V_{th}$, a potential of Va+$\Delta V_{Na}$−$V_{th}$ is output from the wiring OL[1]. Here, when Va=$V_{th}$, the potential $\Delta V_{Na}$ can be output from the wiring OL[1].

The potential $\Delta V_{Na}$ is determined by the amount of change from the first current to the second current, the resistor R1, and the potential Vref. Here, since the resistor R1 and the potential Vref are known, the amount of change in the current flowing to the wiring BL can be found from the potential $\Delta V_{Na}$.

A signal corresponding to the amount of current and/or the amount of change in the current detected by the offset circuit OFST as described above is output to the wirings OL[1] to OL[n] as output data.

<Operation Example of Semiconductor Device>

With the above semiconductor device MAC, the product-sum operation of the first data and the second data can be performed. An operation example of the semiconductor device MAC at the time of performing the product-sum operation is described below.

Figure 22:
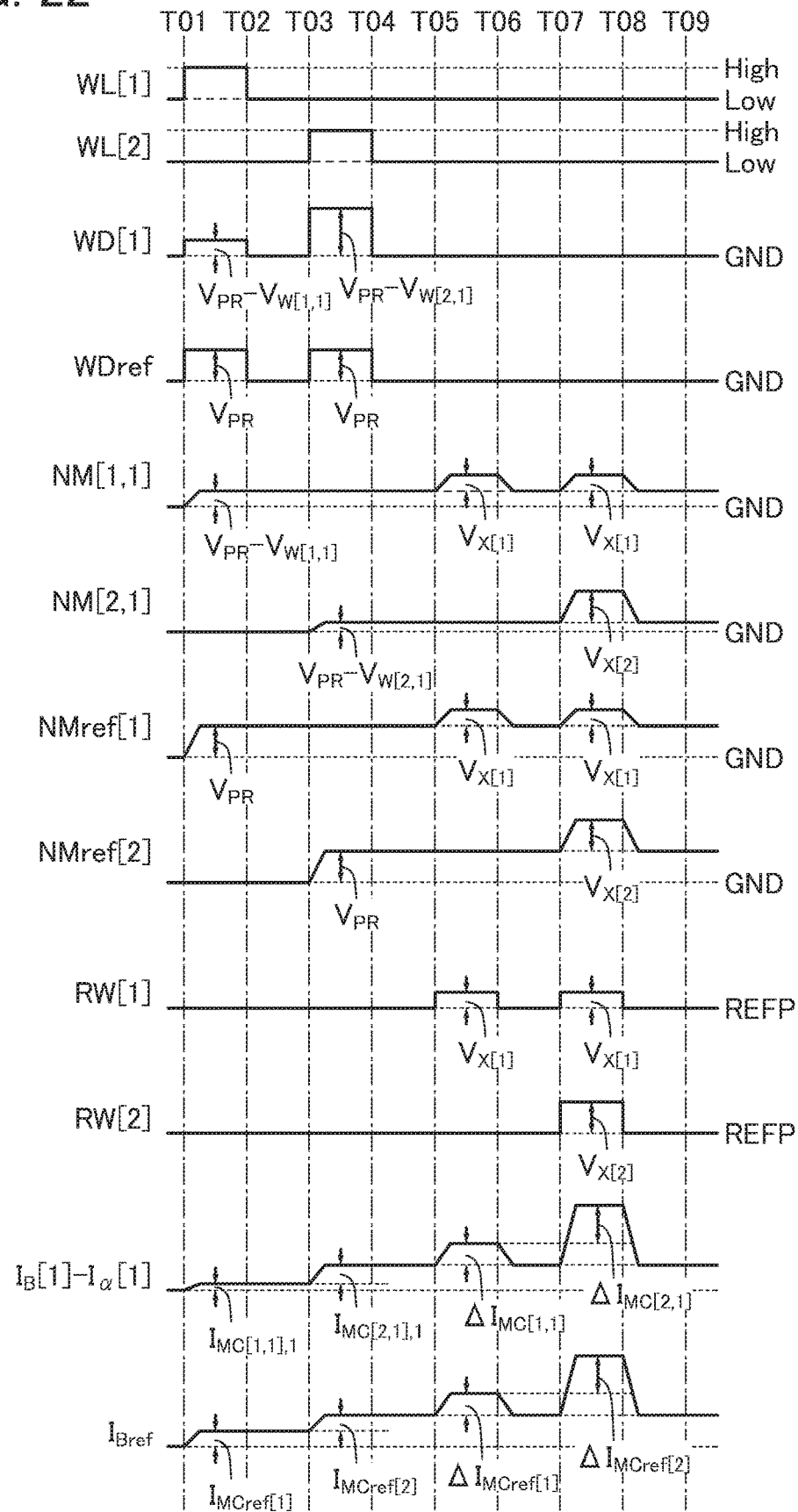
FIG. 22 is a timing chart.

FIG. 22 is a timing chart showing the operation example of the semiconductor device MAC. FIG. 22 shows changes in the potentials of the wirings WL[1], WL[2], WD[1], and WDref, the nodes NM[1, 1], NM[2, 1], NMref[1], and NMref[2], and the wirings RW[1] and RW[2] in FIG. 20 and changes in the values of the currents $I_B[1]$ to $I_\alpha[1]$ and $I_{Bref}$. The currents $I_B[1]$ to $I_\alpha[1]$ correspond to a total of the currents flowing from the wiring BL[1] to the memory cells MC[1, 1] and MC[2, 1].

Although operation is described with a focus on the memory cells MC[1, 1], MC[2, 1], MCref[1], and MCref[2] illustrated in FIG. 20 as typical examples, the other memory cells MC and MCref can also be operated in a similar manner.

[Storage of First Data]

First, during a period from Time T01 to Time T02, the potential of the wiring WL[1] becomes a high level, the potential of the wiring WD[1] becomes a potential greater than a ground potential (GND) by $V_{PR}-V_{W[1, 1]}$, and the potential of the wiring WDref becomes a potential greater than the ground potential by $V_{PR}$. Furthermore, the potentials of the wirings RW[1] and RW[2] are reference potentials (REFP). Note that the potential $V_{W[1, 1]}$ is the potential corresponding to the first data stored in the memory cell MC[1, 1]. In addition, the potential $V_{PR}$ is the potential corresponding to the reference data. Thus, the transistors Tr11 included in the memory cells MC[1, 1] and MCref[1] are turned on, and the potentials of the nodes NM[1, 1] and NMref[1] become $V_{PR}-V_{W[1, 1]}$ and $V_{PR}$, respectively.

In this case, a current $I_{MC[1,1], 0}$ flowing from the wiring BL[1] to the transistor Tr12 in the memory cell MC[1, 1] can be expressed by a formula shown below. Here, k is a constant determined by the channel length, the channel width, the mobility, the capacitance of a gate insulating film, and the like of the transistor Tr12. Furthermore, $V_{th}$ is a threshold voltage of the transistor Tr12.

$$I_{MC[1,1],0}=k(V_{PR}-V_{W[1,1]}-V_{th})^2 \quad (E1)$$

Furthermore, a current $I_{MCref[1], 0}$ flowing from the wiring BLref to the transistor Tr12 in the memory cell MCref[1] can be expressed by a formula shown below.

$$I_{MCref[1],0}=k(V_{PR}-V_{th})^2 \quad (E2)$$

Next, during a period from Time T02 to Time T03, the potential of the wiring WL[1] becomes a low level. Consequently, the transistors Tr11 included in the memory cells MC[1, 1] and MCref[1] are turned off, and the potentials of the nodes NM[1, 1] and NMref[1] are held.

As described above, an OS transistor is preferably used as the transistor Tr11. This can suppress the leakage current of the transistor Tr11, so that the potentials of the nodes NM[1, 1] and NMref[1] can be accurately held.

Next, during a period from Time T03 to Time T04, the potential of the wiring WL[2] becomes the high level, the potential of the wiring WD[1] becomes a potential greater than the ground potential by $V_{PR}-V_{W[2, 1]}$, and the potential of the wiring WDref becomes a potential greater than the ground potential by $V_{PR}$. Note that the potential $V_{W[2, 1]}$ is a potential corresponding to the first data stored in the memory cell MC[2, 1]. Thus, the transistors Tr11 included in the memory cells MC[2, 1] and MCref[2] are turned on, and the potentials of the nodes NM[2, 1] and NMref[2] become $V_{PR}-V_{W[2, 1]}$ and $V_{PR}$, respectively.

Here, a current $I_{MC[2, 1], 0}$ flowing from the wiring BL[1] to the transistor Tr12 in the memory cell MC[2, 1] can be expressed by a formula shown below.

$$I_{MC[2,1],0}=k(V_{PR}-V_{W[2,1]}-V_{th})^2 \quad (E3)$$

Furthermore, a current $I_{MCref[2], 0}$ flowing from the wiring BLref to the transistor Tr12 in the memory cell MCref[2] can be expressed by a formula shown below.

$$I_{MCref[2],0}=k(V_{PR}-V_{th})^2 \quad (E4)$$

Next, during a period from Time T04 to Time T05, the potential of the wiring WL[2] becomes the low level. Consequently, the transistors Tr11 included in the memory cells MC[2, 1] and MCref[2] are turned off, and the potentials of the nodes NM[2, 1] and NMref[2] are held.

Through the above operation, the first data is stored in the memory cells MC[1, 1] and MC[2, 1], and the reference data is stored in the memory cells MCref[1] and MCref[2].

Here, currents flowing to the wirings BL[1] and BLref during the period from Time T04 to Time T05 are considered. The current is supplied from the current source circuit CS to the wiring BLref. The current flowing through the wiring BLref is also discharged to the current mirror circuit CM and the memory cells MCref[1] and MCref[2]. A formula shown below holds where $I_{Cref}$ is the current supplied from the current source circuit CS to the wiring BLref and $I_{CM, 0}$ is the current discharged from the wiring BLref to the current mirror circuit CM.

$$I_{Cref}-I_{CM,0}=I_{MCref[1],0}+I_{MCref[2],0} \quad (E5)$$

The current from the current source circuit CS is supplied to the wiring BL[1]. The current flowing through the wiring BL[1] is also discharged to the current mirror circuit CM and the memory cells MC[1, 1] and MC[2, 1]. Furthermore, the current flows from the wiring BL[1] to the offset circuit OFST. A formula shown below holds where $I_{C, 0}$ is the current supplied from the current source circuit CS to the wiring BL[1] and $I_{\alpha, 0}$ is the current discharged from the wiring BL[1] to the offset circuit OF ST.

$$I_C-I_{CM,0}=I_{MC[1,1],0}+I_{MC[2,1],0}+I_{\alpha,0} \quad (E6)$$

[Product-Sum Operation of First Data and Second Data]

Next, during a period from Time T05 to Time T06, the potential of the wiring RW[1] becomes a potential greater than the reference potential by $V_{X[1]}$. At this time, the potential $V_{X[1]}$ is supplied to the capacitors C11 in the memory cells MC[1, 1] and MCref[1], so that the potentials of the gates of the transistors Tr12 increase owing to capacitive coupling. Note that the potential $V_{X[1]}$ is the potential corresponding to the second data supplied to the memory cells MC[1, 1] and MCref[1].

The amount of change in the potential of the gate of the transistor Tr12 corresponds to the value obtained by multiplying the amount of change in the potential of the wiring RW by a capacitive coupling coefficient determined by the memory cell structure. The capacitive coupling coefficient is calculated on the basis of the capacitance of the capacitor C11, the gate capacitance of the transistor Tr12, the parasitic capacitance, and the like. In the following description, for convenience, the amount of change in the potential of the wiring RW is equal to the amount of change in the potential of the gate of the transistor Tr12, that is, the capacitive coupling coefficient is set to 1. In practice, the potential $V_X$ can be determined in consideration of the capacitive coupling coefficient.

When the potential $V_{X[1]}$ is supplied to the capacitors C11 in the memory cell MC[1, 1] and the memory cell MCref[1], the potentials of the node NM[1, 1] and the node NMref[1] each increase by $V_{X[1]}$.

Here, a current $I_{MC[1, 1], 1}$ flowing from the wiring BL[1] to the transistor Tr12 in the memory cell MC[1, 1] during the period from Time T05 to Time T06 can be expressed by a formula shown below.

$$I_{MC[1,1],1} = k(V_{PR} - V_{W[1,1]} + V_{X[1]} - V_{th})^2 \quad (E7)$$

Thus, when the potential $V_{X[1]}$ is supplied to the wiring RW[1], the current flowing from the wiring BL[1] to the transistor Tr12 in the memory cell MC[1, 1] increases by $\Delta I_{MC[1, 1]} = I_{MC[1, 1], 1} - I_{MC[1,1], 0}$.

Here, a current $I_{MCref[1], 1}$ flowing from the wiring BLref to the transistor Tr12 in the memory cell MCref[1] during the period from Time T05 to Time T06 can be expressed by a formula shown below.

$$I_{MCref[1],1} = k(V_{PR} + V_{X[1]} - V_{th})^2 \quad (E8)$$

Thus, when the potential $V_{X[1]}$ is supplied to the wiring RW[1], the current flowing from the wiring BLref to the transistor Tr12 in the memory cell MCref[1] increases by $\Delta I_{MCref[1]} = I_{MCref[1], 1} - I_{MCref[1], 0}$.

Furthermore, currents flowing to the wirings BL[1] and BLref are considered. A current $I_{Cref}$ is supplied from the current source circuit CS to the wiring BLref. The current flowing through the wiring BLref is also discharged to the current mirror circuit CM and the memory cells MCref[1] and MCref[2]. A formula shown below holds where $I_{CM, 1}$ is the current discharged from the wiring BLref to the current mirror circuit CM.

$$I_{Cref} - I_{CM,1} = I_{MCref[1],1} + I_{MCref[2],0} \quad (E9)$$

The current $I_C$ from the current source circuit CS is supplied to the wiring BL[1]. The current flowing through the wiring BL[1] is also discharged to the current mirror circuit CM and the memory cells MC[1, 1] and MC[2, 1]. Furthermore, the current flows from the wiring BL[1] to the offset circuit OFST. A formula shown below holds where $I_{\alpha, 1}$ is the current flowing from the wiring BL[1] to the offset circuit OFST.

$$I_C - I_{CM,1} = I_{MC[1,1],1} + I_{MC[2,1],1} + I_{\alpha,1} \quad (E10)$$

In addition, from Formulae (E1) to (E10), a difference between the current $I_{\alpha, 0}$ and the current $I_{\alpha,1}$ (differential current $\Delta I_\alpha$) can be expressed by a formula shown below.

$$\Delta I_\alpha = I_{\alpha,1} - I_{\alpha,0} = 2kV_{W[1,1]}V_{X[1]} \quad (E11)$$

Thus, the differential current $\Delta I_\alpha$ is a value corresponding to the product of the potentials $V_{W[1, 1]}$ and $V_{X[1]}$.

After that, during a period from Time T06 to Time T07, the potential of the wiring RW[1] becomes the ground potential, and the potentials of the nodes NM[1, 1] and NMref[1] become similar to the potentials thereof during the period from Time T04 to Time T05.

Next, during a period from Time T07 to Time T08, the potential of the wiring RW[1] becomes the potential greater than the reference potential by $V_{X[1]}$, and the potential of the wiring RW[2] becomes a potential greater than the reference potential by $V_{X[2]}$. Accordingly, the potential $V_{X[1]}$ is supplied to the capacitors C11 in the memory cell MC[1, 1] and the memory cell MCref[1], and the potentials of the node NM[1, 1] and the node NMref[1] each increase by $V_{X[1]}$ due to capacitive coupling. Furthermore, the potential $V_{X[2]}$ is supplied to the capacitors C11 in the memory cell MC[2, 1] and the memory cell MCref[2], and the potentials of the node NM[2, 1] and the node NMref[2] each increase by $V_{X[2]}$ due to capacitive coupling.

Here, the current $I_{MC[2, 1],1}$ flowing from the wiring BL[1] to the transistor Tr12 in the memory cell MC[2, 1] during the period from Time T07 to Time T08 can be expressed by a formula shown below.

$$I_{MC[2,1],1} = k(V_{PR} - V_{W[2,1]} + V_{X[2]} - V_{th})^2 \quad (E12)$$

Thus, when the potential $V_{X[2]}$ is supplied to the wiring RW[2], the current flowing from the wiring BL[1] to the transistor Tr12 in the memory cell MC[2, 1] increases by $\Delta I_{MC[2,1]} = I_{MC[2, 1], 1} - I_{MC[2, 1], 0}$.

Here, a current $I_{MCref[2], 1}$ flowing from the wiring BLref to the transistor Tr12 in the memory cell MCref[2] during the period from Time T05 to Time T06 can be expressed by a formula shown below.

$$I_{MCref[2],1} = k(V_{PR} + V_{X[2]} - V_{th})^2 \quad (E13)$$

Thus, by when the potential $V_{X[2]}$ is supplied to the wiring RW[2], the current flowing from the wiring BLref to the transistor Tr12 in the memory cell MCref[2] increases by $\Delta I_{MCref[2]} = I_{MCref[2], 1} - I_{MCref[2], 0}$.

Furthermore, currents flowing to the wirings BL[1] and BLref are considered. The current $I_{Cref}$ is supplied from the current source circuit CS to the wiring BLref. The current flowing through the wiring BLref is also discharged to the current mirror circuit CM and the memory cells MCref[1] and MCref[2]. A formula shown below holds where $I_{CM, 2}$ is the current discharged from the wiring BLref to the current mirror circuit CM.

$$I_{Cref} - I_{CM,2} = I_{MCref[1],1} + I_{MCref[2],1} \quad (E14)$$

The current $I_C$ from the current source circuit CS is supplied to the wiring BL[1]. The current flowing through the wiring BL[1] is also discharged to the current mirror circuit CM and the memory cells MC[1, 1] and MC[2, 1]. Furthermore, the current flows from the wiring BL[1] to the offset circuit OFST. A formula shown below holds where $I_{\alpha, 2}$ is the current flowing from the wiring BL[1] to the offset circuit OFST.

$$I_C - I_{CM,2} = I_{MC[1,1],1} + I_{MC[2,1],1} + I_{\alpha,2} \quad (E15)$$

In addition, from Formulae (E1) to (E8) and (E12) to (E15), a difference between the current $I_{\alpha, 0}$ and the current $I_{\alpha, 2}$ (differential current $\Delta I_\alpha$) can be expressed by a formula shown below.

$$\Delta I_\alpha = I_{\alpha,2} - I_{\alpha,0} = 2k(V_{W[1,1]}V_{X[1]} + V_{W[2,1]}V_{X[2]}) \quad (E16)$$

Thus, the differential current $\Delta I_\alpha$ is a value corresponding to a result of the sum of the product of the potentials $V_{W[1, 1]}$ and $V_{X[1]}$ and the product of the potentials $V_{W[2, 1]}$ and $V_{X[2]}$.

After that, during a period from Time T08 to Time T09, the potentials of the wirings RW[1] and RW[2] become the ground potential, and the potentials of the nodes NM[1, 1], NM[2, 1], NMref[1], and NMref[2]] become similar to the potentials thereof during the period from Time T04 to Time T05.

As represented by Formulae (E9) and (E16), the differential current $\Delta I_\alpha$ input to the offset circuit OFST is a value corresponding to a result of the sum of the products of the potentials $V_X$ corresponding to the first data (weight) and the potentials $V_W$ corresponding to the second data (input data). Thus, measurement of the differential current $\Delta I_\alpha$ with the offset circuit OFST gives the result of the product-sum operation of the first data and the second data.

Note that although the memory cells MC[1, 1], MC[2, 1], MCref[1], and MCref[2] are focused in the above description, the number of the memory cells MC and MCref can be any number. The differential current $\Delta I_\alpha$ can be expressed by a formula shown below where the number m of rows of the memory cells MC and MCref is any number.

$$\Delta I_\alpha = 2k\Sigma_i V_{W[i,1]} V_{X[i]} \quad (E17)$$

Furthermore, when the number n of columns of the memory cells MC and MCref is increased, the number of product-sum operations executed in parallel can be increased.

The product-sum operation of the first data and the second data can be performed using the semiconductor device MAC as described above. Note that the use of the structure of the memory cells MC and MCref in FIG. 20 allows the product-sum arithmetic circuit to be formed of fewer transistors. Accordingly, the circuit scale of the semiconductor device MAC can be reduced.

In the case where the semiconductor device MAC is used for the operation in the neural network, the number m of rows of the memory cells MC can correspond to the number of input data supplied to one neuron and the number n of columns of the memory cells MC can correspond to the number of neurons.

Note that there is no particular limitation on the structure of the neural network for which the semiconductor device MAC is used. For example, the semiconductor device MAC can also be used for a convolutional neural network (CNN), a recurrent neural network (RNN), an autoencoder, a Boltzmann machine (including a restricted Boltzmann machine), or the like.

The product-sum operation of the neural network can be performed using the semiconductor device MAC as described above. Furthermore, the memory cells MC and MCref illustrated in FIG. 20 are used for the cell array CA, which can provide an integrated circuit with improved operation accuracy, lower power consumption, or a reduced circuit scale.

This embodiment can be combined with any of the other embodiments as appropriate.

Embodiment 3

In this embodiment, a display panel that can be used for the display system of one embodiment of the present invention will be described with reference to FIGS. 23A to 23E, FIGS. 24A and 24B, FIG. 25, FIG. 26, FIG. 27, FIG. 28, FIGS. 29A to 29C, FIGS. 30A to 30D, FIGS. 31A to 31F, FIGS. 32A and 32B, FIGS. 33A and 33B, FIGS. 34A and 34B, and FIG. 35.

<3-1. Structure Example of Pixel>

Structure examples of a pixel 120 are described with reference to FIGS. 23A to 23E.

The pixel 120 includes the pixels 115. The pixels 115 each function as a subpixel. The pixel 120 is formed of the pixels 115 exhibiting different colors, and thus full-color display can be achieved in a display portion.

Figure 23A:
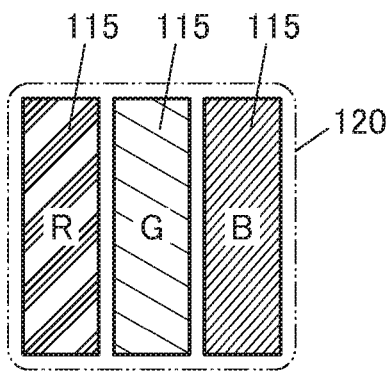
FIGS. 23A to 23E illustrate structure examples of a pixel.
Figure 23B:
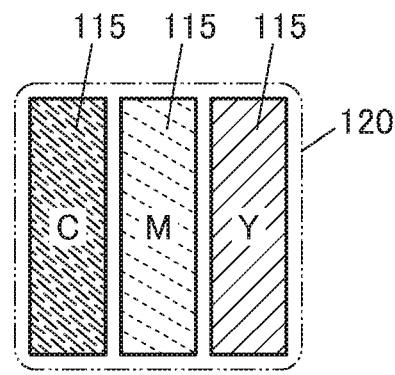

The pixels 120 illustrated in FIGS. 23A and 23B each include three subpixels. The combination of colors exhibited by the pixels 115 of the pixel 120 illustrated in FIG. 23A is red (R), green (G), and blue (B). The combination of colors exhibited by the pixels 115 of the pixel 120 illustrated in FIG. 23B is cyan (C), magenta (M), and yellow (Y).

Figure 23C:
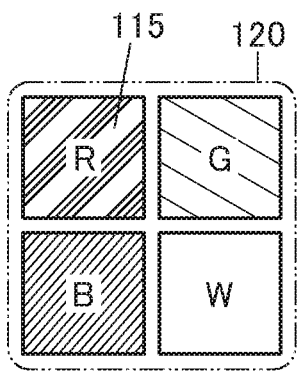
Figure 23D:
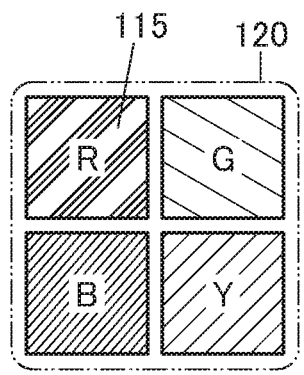
Figure 23E:
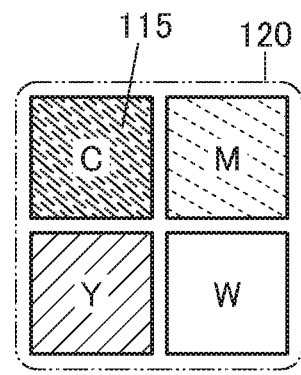

The pixels 120 illustrated in FIGS. 23C to 23E each include four subpixels. The combination of colors exhibited by the pixels 115 of the pixel 120 illustrated in FIG. 23C is red (R), green (G), blue (B), and white (W). The use of the subpixel that exhibits, white can increase the luminance of the display region. The combination of colors exhibited by the pixels 115 of the pixel 120 illustrated in FIG. 23D is red (R), green (G), blue (B), and yellow (Y). The combination of colors exhibited by the pixels 115 of the pixel 120 illustrated in FIG. 23E is cyan (C), magenta (M), yellow (Y), and white (W).

When subpixels that exhibit red, green, blue, cyan, magenta, yellow, and the like are combined as appropriate with more subpixels functioning as one pixel, the reproducibility of halftones can be increased. Thus, the display quality can be improved.

The display device of one embodiment of the present invention can reproduce the color gamut of various standards. For example, the display device of one embodiment of the present invention can reproduce the color gamut of the following standards: the Phase Alternating Line (PAL) or National Television System Committee (NTSC) standard used for TV broadcasting; the standard RGB (sRGB) or Adobe RGB standard used widely for display devices in electronic devices such as personal computers, digital cameras, and printers; the International Telecommunication Union Radiocommunication Sector Broadcasting Service (Television) 709 (ITU-R BT.709) standard used for high-definition televisions (HDTV, also referred to Hi-Vision); the Digital Cinema Initiatives P3 (DCI-P3) standard used for digital cinema projection; and the ITU-R BT.2020 Recommendation 2020 (REC.2020) standard used for ultra-high-definition televisions (UHDTV, also referred to as Super Hi-Vision televisions); and the like.

Using the pixels 120 arranged in a 1920×1080 matrix, the display device can display a full-color image with "full high definition" (also referred to as "2K resolution," "2K1K," "2K," and the like). Moreover, for example, using the pixels 120 arranged in a 3840×2160 matrix, the display device can display a full-color image with "ultra high definition" (also referred to as "4K resolution," "4K2K," "4K," and the like). Furthermore, for example, using the pixels 120 arranged in a 7680×4320 matrix, the display device can display a full-color image with "super high definition" (also referred to as "8K resolution," "8K4K," "8K," and the like). Using a larger number of the pixels 120, the display device can display a full-color image with 16K or 32K resolution.

<3-2. Configuration Example of Pixel Circuit>

Examples of a display element included in the display device of one embodiment of the present invention include a light-emitting element such as an inorganic EL element, an organic EL element, or an LED, a liquid crystal element, an electrophoretic element, and a display element using micro electro mechanical systems (MEMS).

A configuration example of a pixel circuit including a light-emitting element is described below with reference to FIG. 24A. In addition, a configuration example of a pixel circuit including a liquid crystal element is described with reference to FIG. 24B.

Figure 24A:
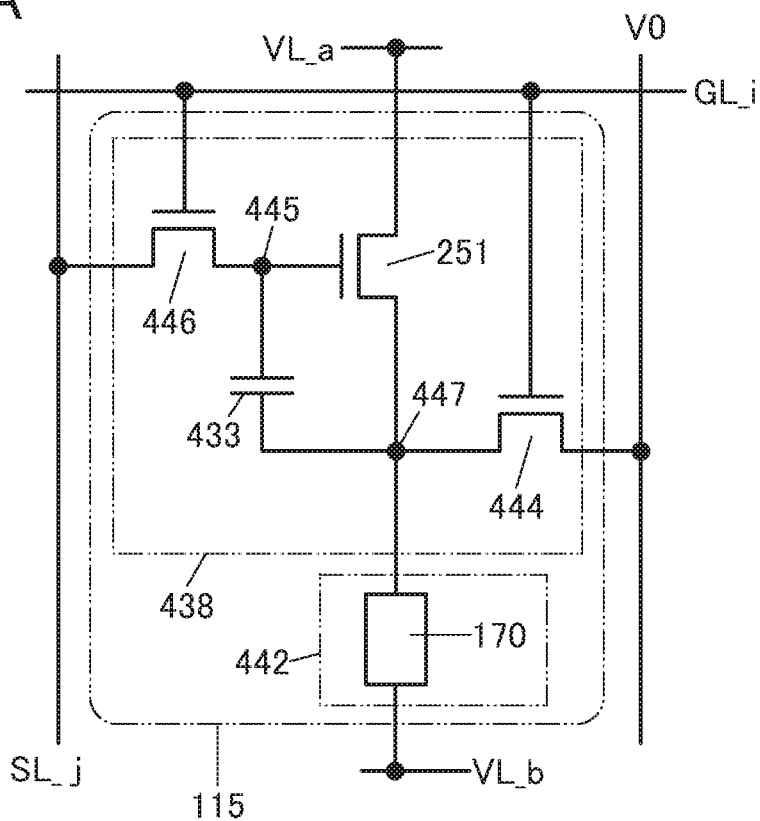
FIGS. 24A and 24B illustrate configuration examples of a pixel circuit.

A pixel circuit 438 illustrated in FIG. 24A includes a transistor 446, a capacitor 433, a transistor 251, and a transistor 444. The pixel circuit 438 is electrically connected to a light-emitting element 170 that can function as a display element 442.

One of a source electrode and a drain electrode of the transistor 446 is electrically connected to the signal line SL_j to which a video signal is supplied. A gate electrode of the transistor 446 is electrically connected to the scan line GL_i to which a selection signal is supplied.

The transistor 446 has a function of controlling whether to write a video signal to a node 445.

One of a pair of electrodes of the capacitor 433 is electrically connected to the node 445, and the other of the pair of electrodes of the capacitor 433 is electrically connected to a node 447. The other of the source electrode and the drain electrode of the transistor 446 is electrically connected to the node 445.

The capacitor 433 functions as a storage capacitor for storing data written to the node 445.

One of a source electrode and a drain electrode of the transistor 251 is electrically connected to a potential supply line VL_a, and the other of the source electrode and the drain electrode of the transistor 251 is electrically connected to the node 447. A gate electrode of the transistor 251 is electrically connected to the node 445.

One of a source electrode and a drain electrode of the transistor 444 is electrically connected to a potential supply line V0, and the other of the source electrode and the drain electrode of the transistor 444 is electrically connected to the node 447. A gate electrode of the transistor 444 is electrically connected to the scan line GL_i.

One of an anode and a cathode of the light-emitting element 170 is electrically connected to a potential supply line VL_b, and the other is electrically connected to the node 447.

As a power supply potential, a potential on the relatively high potential side or a potential on the relatively low potential side can be used, for example. A power supply potential on the high potential side is referred to as a high power supply potential (also referred to as VDD), and a power supply potential on the low potential side is referred to as a low power supply potential (also referred to as VSS). A ground potential can be used as the high power supply potential or the low power supply potential. For example, in the case where a ground potential is used as the high power supply potential, the low power supply potential is a potential lower than the ground potential, and in the case where a ground potential is used as the low power supply potential, the high power supply potential is a potential higher than the ground potential.

A high power supply potential VDD is supplied to one of the potential supply line VL_a and the potential supply line VL_b, and a low power supply potential VSS is supplied to the other, for example.

In the display device including the pixel circuit 438 in FIG. 24A, the pixel circuits 438 are sequentially selected row by row by the scan line driver circuit, whereby the transistors 446 and the transistors 444 are turned on and a video signal is written to the nodes 445.

When the transistors 446 and the transistors 444 are turned off, the pixel circuits 438 in which the data has been written to the nodes 445 are brought into a holding state. Furthermore, the amount of current flowing between the source electrode and the drain electrode of the transistor 251 is controlled in accordance with the potential of the data written to the node 445. The light-emitting element 170 emits light with a luminance corresponding to the amount of current flow. This operation is sequentially performed row by row; thus, an image can be displayed.

Figure 24B:
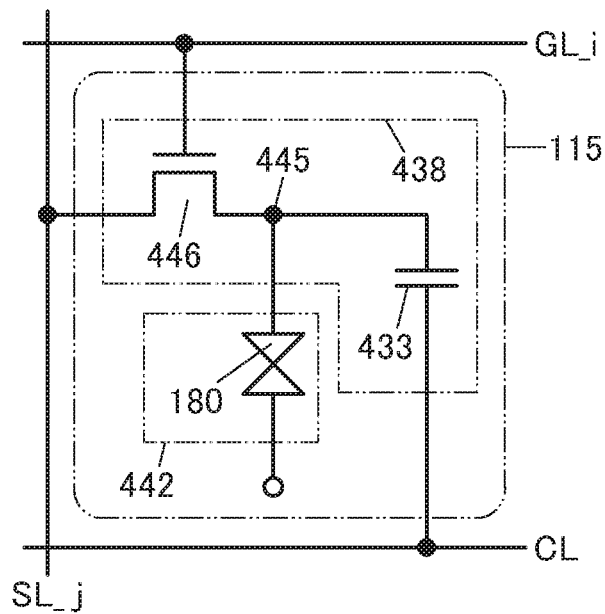

The pixel circuit 438 in FIG. 24B includes the transistor 446 and the capacitor 433. The pixel circuit 438 is electrically connected to a liquid crystal element 180 functioning as the display element 442.

The potential of one of a pair of electrodes of the liquid crystal element 180 is set in accordance with the specifications of the pixel circuit 438 as appropriate. The alignment state of the liquid crystal element 180 depends on data written to the node 445. A common potential may be applied to one of the pair of electrodes of the liquid crystal element 180 included in each of the pixel circuits 438. The potential applied to one of the pair of electrodes of the liquid crystal element 180 in the pixel circuit 438 may differ between rows.

In the pixel circuit 438 in the i-th row and the j-th column, one of the source electrode and the drain electrode of the transistor 446 is electrically connected to the signal line SL_j, and the other of the source electrode and the drain electrode of the transistor 446 is electrically connected to the node 445. The gate electrode of the transistor 446 is electrically connected to the scan line GL_i. The transistor 446 has a function of controlling whether to write a video signal to the node 445.

One of the pair of electrodes of the capacitor 433 is electrically connected to a wiring to which a specific potential is supplied (hereinafter, referred to as a capacitor line CL), and the other of the pair of electrodes of the capacitor 433 is electrically connected to the node 445. The other of the pair of electrodes of the liquid crystal element 180 is electrically connected to the node 445. The potential of the capacitor line CL is set in accordance with the specifications of the pixel circuit 438 as appropriate. The capacitor 433 functions as a storage capacitor for storing data written to the node 445.

In the display device including the pixel circuit 438 in FIG. 24B, the pixel circuits 438 are sequentially selected row by row by the scan line driver circuit 102 and/or the scan line driver circuit 103, whereby the transistors 446 are turned on and a video signal is written to the nodes 445.

When the transistors 446 are turned off, the pixel circuits 438 in which the video signal has been written to the nodes 445 are brought into a holding state. This operation is sequentially performed row by row; thus, an image can be displayed on the display portion.

<3-3. Structure Example 1 of Display Device>

Next, structure examples of the display device are described with reference to FIG. 25, FIG. 26, FIG. 27, and FIG. 28.

Figure 25:
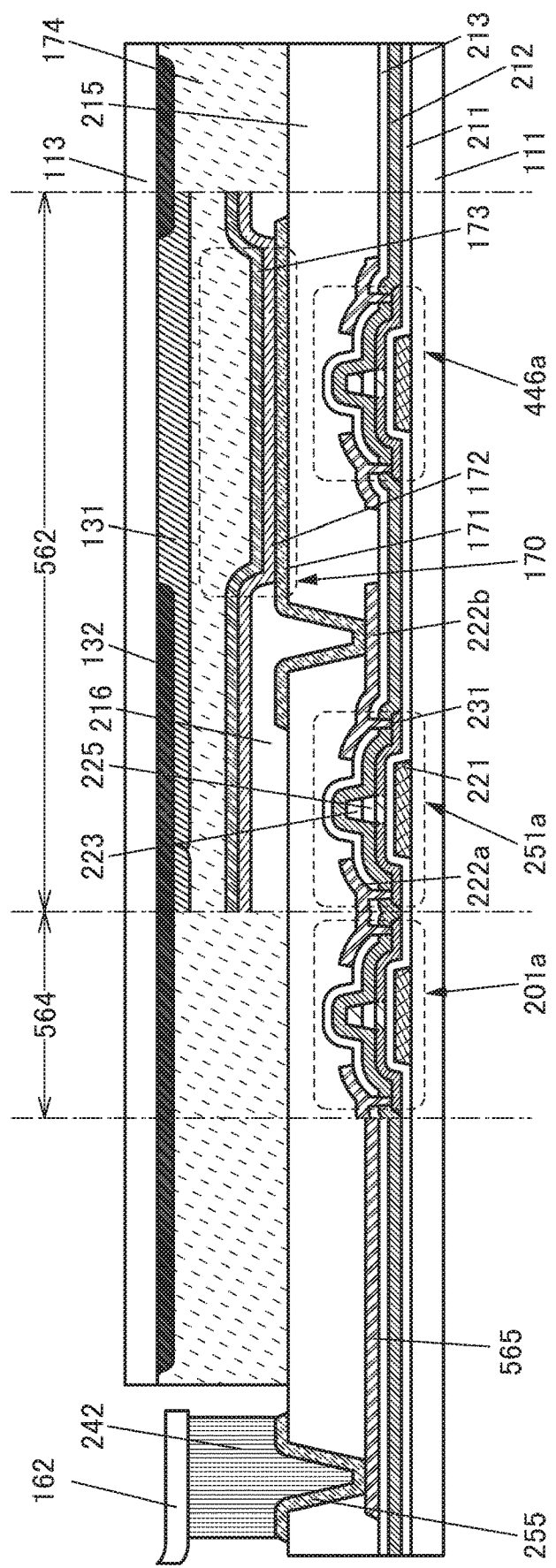
FIG. 25 illustrates a structure example of a display device.

FIG. 25 is a cross-sectional view of a light-emitting display device employing a color filter method and having a top-emission structure.

The display device illustrated in FIG. 25 includes a display portion 562 and a scan line driver circuit 564.

A transistor 251a, a transistor 446a, the light-emitting element 170, and the like are provided over the substrate 111 in the display portion 562. A transistor 201a and the like are provided over the substrate 111 in the scan line driver circuit 564.

The transistor 251a includes a conductive layer 221 functioning as a first gate electrode, an insulating layer 211 functioning as a first gate insulating layer, a semiconductor layer 231, a conductive layer 222a and a conductive layer 222b functioning as a source electrode and a drain electrode, a conductive layer 223 functioning as a second gate electrode, and an insulating layer 225 functioning as a second gate insulating layer. The semiconductor layer 231 includes a channel formation region and a low-resistance region. The channel formation region overlaps with the conductive layer 223 with the insulating layer 225 positioned therebetween. The low-resistance region includes a region connected to the conductive layer 222a and a region connected to the conductive layer 222b.

The transistor 251a includes the gate electrodes above and below the channel. It is preferable that the two gate electrodes be electrically connected to each other. A transistor with two gate electrodes that are electrically connected to each other can have a higher field-effect mobility and thus have higher on-state current than other transistors. Consequently, a circuit capable of high-speed operation can be obtained. Furthermore, the area occupied by a circuit portion can be reduced. The use of the transistor having a high on-state current can reduce signal delay in wirings and can suppress display unevenness even in a display device in which the number of wirings is increased because of an increase in size or resolution. In addition, the area occupied by a circuit portion can be reduced, whereby the bezel of the display device can be narrowed. Moreover, with such a structure, a highly reliable transistor can be formed.

An insulating layer 212 and an insulating layer 213 are provided over the conductive layer 223, and the conductive layer 222a and the conductive layer 222b are provided thereover. In the transistor 251a, the conductive layer 221 can be physically distanced from the conductive layer 222a or 222b easily; thus, the parasitic capacitance between the conductive layer 221 and the conductive layer 222a or 222b can be reduced.

There is no particular limitation on the structure of the transistor in the display device. For example, a planar transistor, a staggered transistor, or an inverted staggered transistor may be used. A top-gate transistor or a bottom-gate transistor may be used. Gate electrodes may be provided above and below a channel.

The transistor 251a includes a metal oxide in the semiconductor layer 231. The metal oxide can serve as an oxide semiconductor.

The transistors 446a and 201a each have the same structure as the transistor 251a. Structures of the transistors may be different in one embodiment of the present invention. A transistor included in a driver circuit portion and a transistor included in the display portion 562 may have the same structure or different structures. The transistors included in the driver circuit portion may have the same structure or the combination of two or more kinds of structures. Similarly, the transistors included in the display portion 562 may have the same structure or the combination of two or more kinds of structures.

The transistor 446a and the light-emitting element 170 overlap with each other with an insulating layer 215 positioned therebetween. A transistor, a capacitor, a wiring, and the like are provided to overlap with a light-emitting region of the light-emitting element 170, whereby an aperture ratio of the display portion 562 can be increased.

The light-emitting element 170 includes a pixel electrode 171, an EL layer 172, and a common electrode 173. The light-emitting element 170 emits light to the coloring layer 131 side.

One of the pixel electrode 171 and the common electrode 173 functions as an anode and the other functions as a cathode. When a voltage higher than the threshold voltage of the light-emitting element 170 is applied between the pixel electrode 171 and the common electrode 173, holes are injected to the EL layer 172 from the anode side and electrons are injected to the EL layer 172 from the cathode side. The injected electrons and holes are recombined in the EL layer 172 and a light-emitting substance contained in the EL layer 172 emits light.

The pixel electrode 171 is electrically connected to the conductive layer 222b of the transistor 251a. They may be directly connected to each other or may be connected via another conductive layer. The pixel electrode 171 functioning as a pixel electrode is provided for each light-emitting element 170. Two adjacent pixel electrodes 171 are electrically insulated from each other by an insulating layer 216.

The EL layer 172 contains a light-emitting substance.

The common electrode 173 functioning as a common electrode is shared by the light-emitting elements 170. A fixed potential is supplied to the common electrode 173.

The light-emitting element 170 and the coloring layer 131 overlap with each other with a bonding layer 174 positioned therebetween. The insulating layer 216 and a light-blocking layer 132 overlap with each other with the bonding layer 174 positioned therebetween.

The light-emitting element 170 may have a microcavity structure. Owing to the combination of a color filter (the coloring layer 131) and the microcavity structure, light with high color purity can be extracted from the display device.

The coloring layer 131 is a colored layer that transmits light in a specific wavelength range. For example, a color filter for transmitting light in a red, green, blue, or yellow wavelength range can be used. Examples of a material that can be used for the coloring layer 131 include a metal material, a resin material, and a resin material containing pigment or dye.

Note that one embodiment of the present invention is not limited to a color filter method, and a separate coloring method, a color conversion method, a quantum dot method, or the like may be employed.

The light-blocking layer 132 is provided between adjacent coloring layers 131. The light-blocking layer 132 blocks light emitted from an adjacent light-emitting element 170 to prevent color mixture between adjacent light-emitting elements 170. Here, the coloring layer 131 is provided such that its end portion overlaps with the light-blocking layer 132, whereby light leakage can be suppressed. For the light-blocking layer 132, a material that blocks light from the light-emitting element 170 can be used; for example, a black matrix can be formed using a metal material or a resin material containing pigment or dye. Note that it is preferable to provide the light-blocking layer 132 in a region other than the display portion 562, such as the scan line driver circuit 564, in which case undesired leakage of guided light or the like can be inhibited.

The substrate 111 and the substrate 113 are attached to each other with the bonding layer 174.

The conductive layer 565 is electrically connected to the FPC 162 through a conductive layer 255 and a connector 242. The conductive layer 565 is preferably formed using the same material and the same fabrication step as the conductive layers included in the transistor. In an example described in this embodiment, the conductive layer 565 is formed using the same material and the same fabrication step as the conductive layers functioning as a source electrode and a drain electrode.

As the connector 242, any of various anisotropic conductive films (ACF), anisotropic conductive pastes (ACP), and the like can be used.

Figure 26:
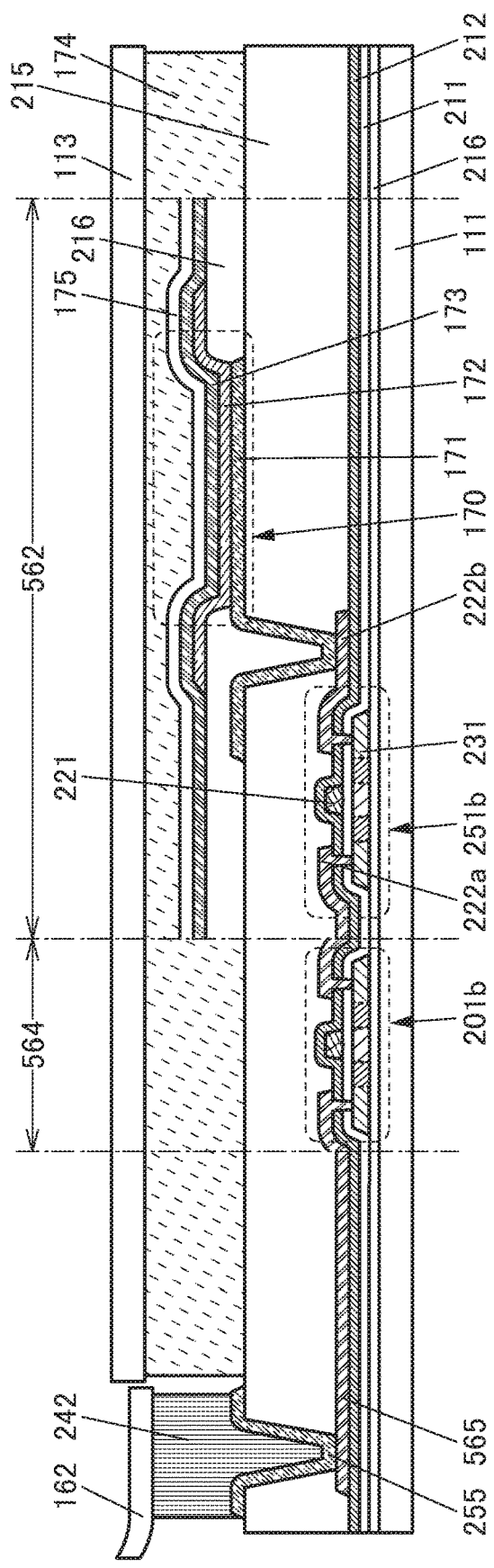
FIG. 26 illustrates a structure example of a display device.

FIG. 26 is a cross-sectional view of a light-emitting display device employing a separate coloring method and having a bottom-emission structure.

The display device illustrated in FIG. 26 includes the display portion 562 and the scan line driver circuit 564.

A transistor 251b, the light-emitting element 170, and the like are provided over the substrate 111 in the display portion 562. A transistor 201b and the like are provided over the substrate 111 in the scan line driver circuit 564.

The transistor 251b includes the conductive layer 221 functioning as a gate electrode, the insulating layer 211 functioning as a gate insulating layer, the semiconductor layer 231, and the conductive layer 222a and the conductive layer 222b functioning as a source electrode and a drain electrode. The insulating layer 216 functions as a base film.

The transistor 251b includes low-temperature polysilicon (LTPS) in the semiconductor layer 231.

The light-emitting element 170 includes the pixel electrode 171, the EL layer 172, and the common electrode 173. The light-emitting element 170 emits light to the substrate 111 side. The pixel electrode 171 is electrically connected to the conductive layer 222b of the transistor 251b through an opening formed in the insulating layer 215. The EL layer 172 is separated between the light-emitting elements 170. The common electrode 173 is shared by the light-emitting elements 170.

The light-emitting element 170 is sealed with an insulating layer 175. The insulating layer 175 functions as a protective layer that prevents diffusion of impurities such as water into the light-emitting element 170.

The substrate 111 and the substrate 113 are attached to each other with the bonding layer 174.

The conductive layer 565 is electrically connected to the FPC 162 through the conductive layer 255 and the connector 242.

Figure 27:
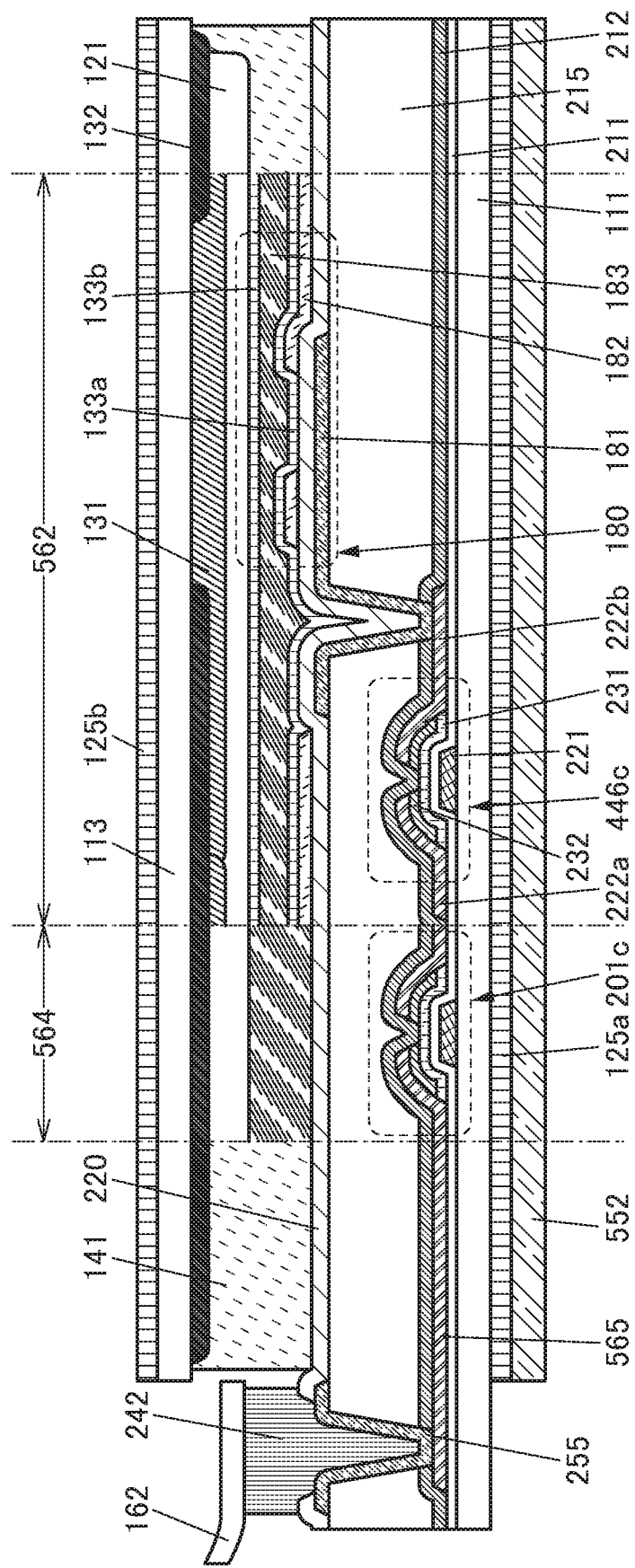
FIG. 27 illustrates a structure example of a display device.

FIG. 27 is a cross-sectional view of a transmissive liquid crystal display device having a horizontal electric field mode.

The display device illustrated in FIG. 27 includes the display portion 562 and the scan line driver circuit 564.

A transistor 446c, the liquid crystal element 180, and the like are provided over the substrate 111 in the display portion 562. A transistor 201c and the like are provided over the substrate 111 in the scan line driver circuit 564.

The transistor 446c includes the conductive layer 221 functioning as a gate electrode, the insulating layer 211 functioning as a gate insulating layer, the semiconductor layer 231, an impurity semiconductor layer 232, and the conductive layer 222a and the conductive layer 222b functioning as a source electrode and a drain electrode. The transistor 446c is covered with the insulating layer 212.

The transistor 446c includes amorphous silicon in the semiconductor layer 231.

The liquid crystal element 180 is a liquid crystal element having a fringe field switching (FFS) mode. The liquid crystal element 180 includes a pixel electrode 181, a common electrode 182, and a liquid crystal layer 183. The alignment of the liquid crystal layer 183 can be controlled with the electrical field generated between the pixel electrode 181 and the common electrode 182. The liquid crystal layer 183 is positioned between alignment films 133a and 133b. The pixel electrode 181 is electrically connected to the conductive layer 222b of the transistor 446c through an opening formed in the insulating layer 215. The common electrode 182 may have a top-surface shape (also referred to as a planar shape) that has a comb-like shape or a top-surface shape that is provided with a slit. One or more openings can be provided in the common electrode 182.

An insulating layer 220 is provided between the pixel electrode 181 and the common electrode 182. The pixel electrode 181 includes a portion that overlaps with the common electrode 182 with the insulating layer 220 positioned therebetween. Furthermore, the common electrode 182 is not placed above the pixel electrode 181 in some areas of a region where the pixel electrode 181 and the coloring layer 131 overlap with each other.

An alignment film is preferably provided in contact with the liquid crystal layer 183. The alignment film can control the alignment of the liquid crystal layer 183.

Light from a backlight unit 552 is emitted to the outside of the display device through the substrate 111, the pixel electrode 181, the common electrode 182, the liquid crystal layer 183, the coloring layer 131, and the substrate 113. As materials of these layers that transmit the light from the backlight unit 552, visible-light-transmitting materials are used.

An overcoat 121 is preferably provided between the coloring layer 131 or the light-blocking layer 132, and the liquid crystal layer 183. The overcoat 121 can reduce the diffusion of impurities contained in the coloring layer 131 and the light-blocking layer 132 and the like into the liquid crystal layer 183.

The substrate 111 and the substrate 113 are attached to each other with a bonding layer 141. The liquid crystal layer 183 is encapsulated in a region that is surrounded by the substrate 111, the substrate 113, and the bonding layer 141.

A polarizing plate 125a and a polarizing plate 125b are provided with the display portion 562 of the display device positioned therebetween. Light from the backlight unit 552 provided outside the polarizing plate 125a enters the display device through the polarizing plate 125a. In this case, the optical modulation of the light can be controlled by controlling the alignment of the liquid crystal layer 183 with a voltage supplied between the pixel electrode 181 and the common electrode 182. In other words, the intensity of light emitted through the polarizing plate 125b can be controlled. Furthermore, the coloring layer 131 absorbs light of wavelengths other than a specific wavelength range from the incident light. As a result, the ejected light is light that exhibits red, blue, or green colors, for example.

The conductive layer 565 is electrically connected to the FPC 162 through the conductive layer 255 and the connector 242.

Figure 28:
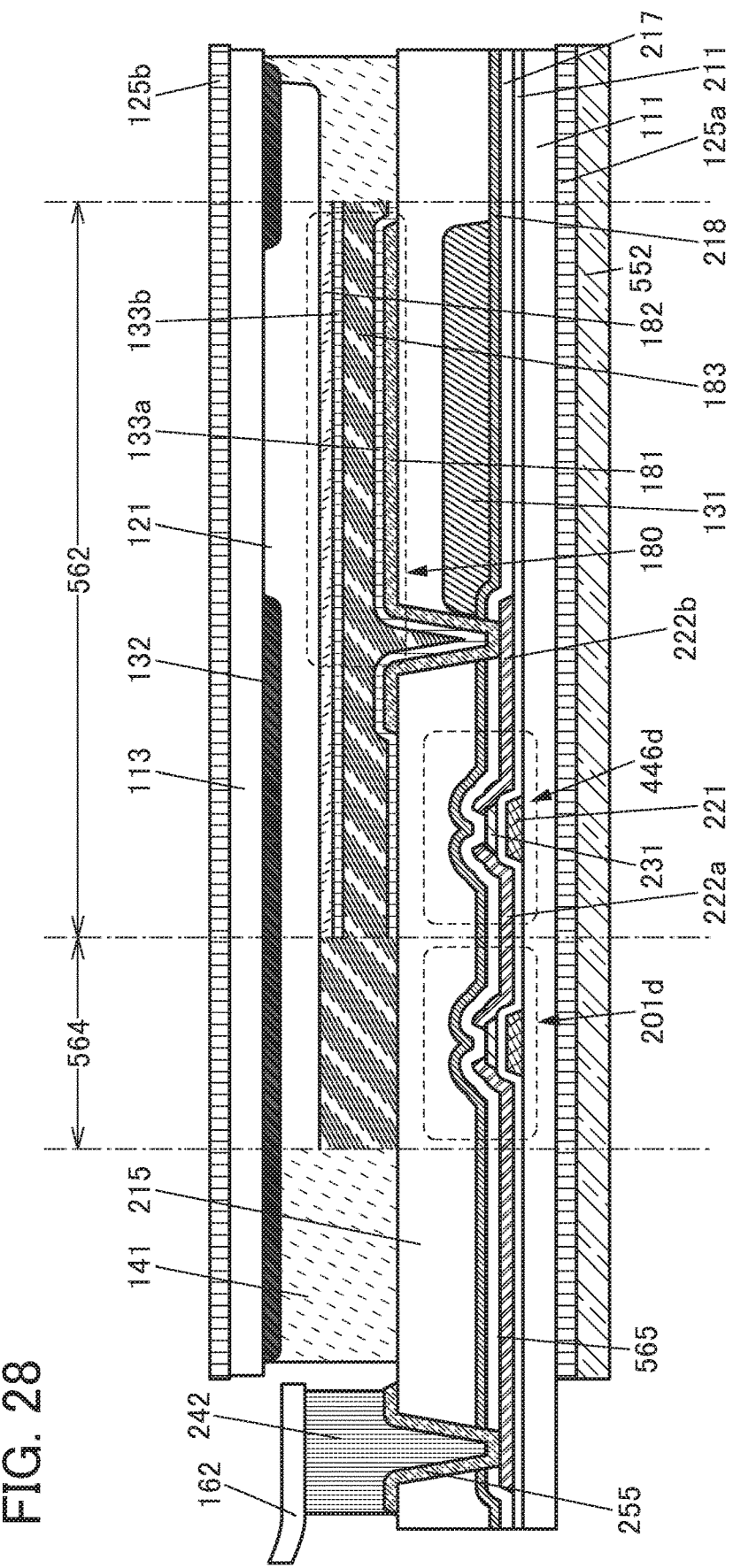
FIG. 28 illustrates a structure example of a display device.

FIG. 28 is a cross-sectional view of a transmissive liquid crystal display device having a vertical electric field mode.

The display device illustrated in FIG. 28 includes the display portion 562 and the scan line driver circuit 564.

A transistor 446d, the liquid crystal element 180, and the like are provided over the substrate 111 in the display portion 562. A transistor 201d and the like are provided over the substrate 111 in the scan line driver circuit 564. The coloring layer 131 is provided on the substrate 111 side in the display device illustrated in FIG. 28. In this manner, the structure on the substrate 113 side can be simplified.

The transistor 446d includes the conductive layer 221 functioning as a gate electrode, the insulating layer 211 functioning as a gate insulating layer, the semiconductor layer 231, the impurity semiconductor layer 232, and the conductive layer 222a and the conductive layer 222b functioning as a source electrode and a drain electrode. The transistor 446d is covered with insulating layers 217 and 218.

The transistor 446d includes a metal oxide in the semiconductor layer 231.

The liquid crystal element 180 includes the pixel electrode 181, the common electrode 182, and the liquid crystal layer 183. The liquid crystal layer 183 is positioned between the pixel electrode 181 and the common electrode 182. The alignment film 133*a* and the alignment film 133*b* are respectively in contact with the pixel electrode 181 and the common electrode 182. The pixel electrode 181 is electrically connected to the conductive layer 222*b* of the transistor 446*d* through an opening formed in the insulating layer 215.

Light from the backlight unit 552 is emitted to the outside of the display device through the substrate 111, the coloring layer 131, the pixel electrode 181, the liquid crystal layer 183, the common electrode 182, and the substrate 113. As materials of these layers that transmit the light from the backlight unit 552, visible-light-transmitting materials are used.

The overcoat 121 is provided between the light-blocking layer 132 and the common electrode 182.

The substrate 111 and the substrate 113 are attached to each other with the bonding layer 141. The liquid crystal layer 183 is encapsulated in a region that is surrounded by the substrate 111, the substrate 113, and the bonding layer 141.

The polarizing plate 125*a* and the polarizing plate 125*b* are provided with the display portion 562 of the display device positioned therebetween.

The conductive layer 565 is electrically connected to the FPC 162 through the conductive layer 255 and the connector 242.

<3-4. Structure Example of Transistor>

Structure examples of transistors having different structures from those illustrated in FIGS. 25 to 28 are described with reference to FIGS. 29A to 29C, FIGS. 30A to 30D, and FIGS. 31A to 31F.

FIGS. 29A to 29C and FIGS. 30A to 30D illustrate transistors each including a metal oxide in a semiconductor layer 432. Since the semiconductor layer 432 includes a metal oxide, the frequency of updating a video signal can be extremely low when there is no change in a video, or when the change is below a certain level, leading to reduced power consumption.

The transistors are each provided over an insulating surface 411. The transistors each include a conductive layer 431 functioning as a gate electrode, an insulating layer 434 functioning as a gate insulating layer, the semiconductor layer 432, and a pair of conductive layers 433*a* and 433*b* functioning as a source electrode and a drain electrode. A region of the semiconductor layer 432 overlapping with the conductive layer 431 functions as a channel formation region. The conductive layers 433*a* and 433*b* are each in contact with the semiconductor layer 432.

Figure 29A:
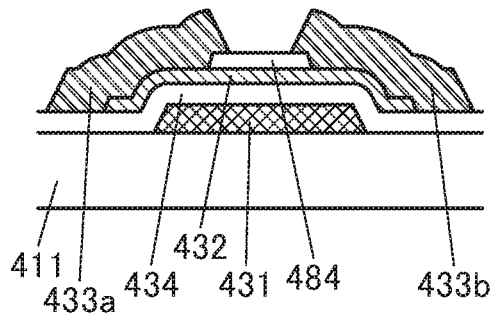
FIGS. 29A to 29C illustrate structure examples of a transistor.

The transistor illustrated in FIG. 29A includes an insulating layer 484 over a channel formation region of the semiconductor layer 432. The insulating layer 484 serves as an etching stopper in the etching of the conductive layers 433*a* and 433*b*.

Figure 29B:
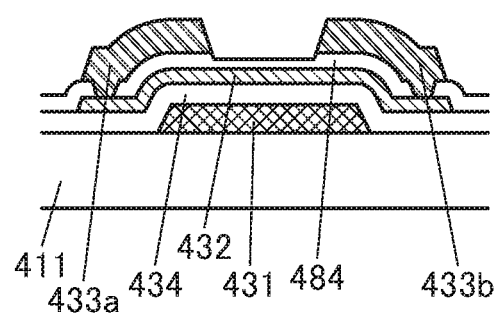

The transistor illustrated in FIG. 29B has a structure in which the insulating layer 484 extends over the insulating layer 434 to cover the semiconductor layer 432. In this structure, the conductive layers 433*a* and 433*b* are connected to the semiconductor layer 432 through openings formed in the insulating layer 484.

Figure 29C:
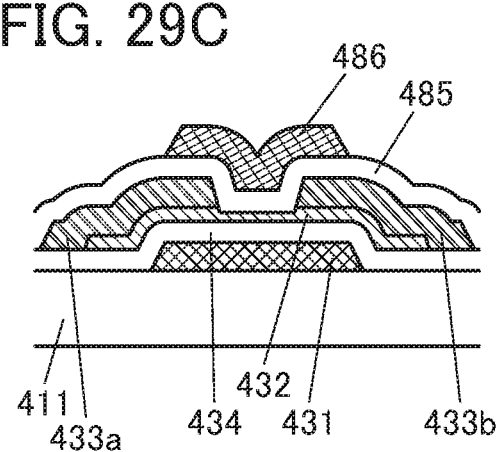

The transistor illustrated in FIG. 29C includes an insulating layer 485 and a conductive layer 486. The insulating layer 485 is provided to cover the semiconductor layer 432, the conductive layer 433*a*, and the conductive layer 433*b*. The conductive layer 486 is provided over the insulating layer 485 and overlaps with the semiconductor layer 432.

The conductive layer 486 is positioned to face the conductive layer 431 with the semiconductor layer 432 positioned therebetween. In the case where the conductive layer 431 is used as a first gate electrode, the conductive layer 486 can serve as a second gate electrode. By supplying the same potential to the conductive layer 431 and the conductive layer 486, the on-state current of the transistor can be increased. When a potential for controlling the threshold voltage is supplied to one of the conductive layers 431 and 486 and a potential for driving is supplied to the other, the threshold voltage of the transistor can be controlled.

Figure 30A:
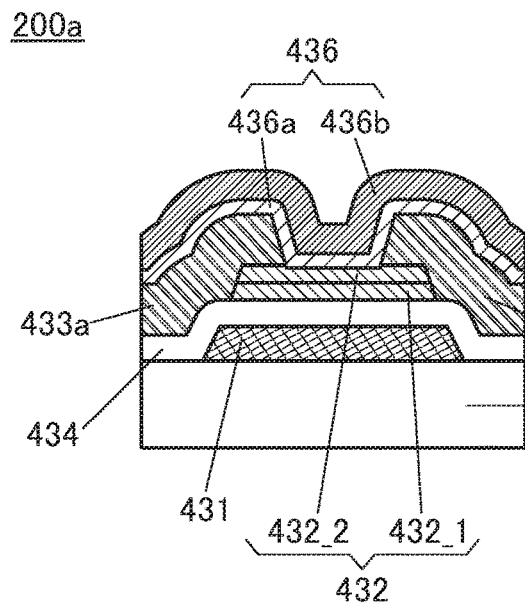
FIGS. 30A to 30D illustrate structure examples of a transistor.
Figure 30B:
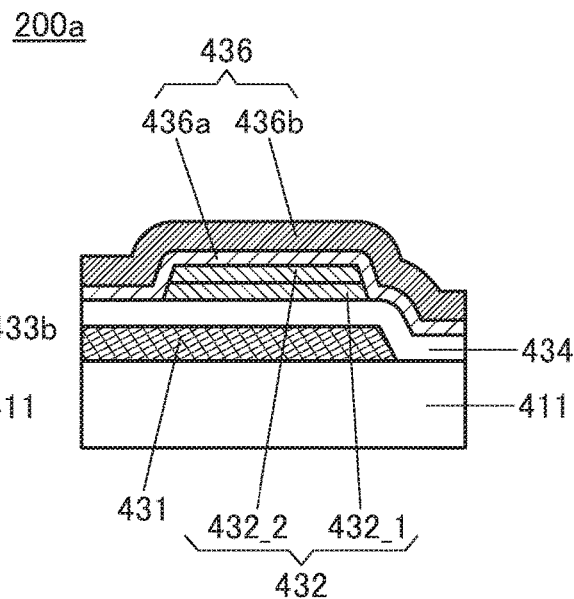

FIG. 30A is a cross-sectional view of a transistor 200*a* in the channel length direction, and FIG. 30B is a cross-sectional view of the transistor 200*a* in the channel width direction.

The transistor 200*a* is a modification example of the transistor 201*d* illustrated in FIG. 28.

The transistor 200*a* is different from the transistor 201*d* in the structure of the semiconductor layer 432.

The semiconductor layer 432 of the transistor 200*a* includes a semiconductor layer 432_1 over the insulating layer 434 and a semiconductor layer 432_2 over the semiconductor layer 432_1.

The semiconductor layer 432_1 and the semiconductor layer 432_2 preferably include the same element. The semiconductor layer 432_1 and the semiconductor layer 432_2 each preferably include In, M (M is Ga, Al, Y, or Sn), and Zn.

The semiconductor layer 432_1 and the semiconductor layer 432_2 each preferably include a region where the atomic proportion of In is larger than the atomic proportion of M. For example, the atomic ratio of In to M and Zn in each of the semiconductor layer 432_1 and the semiconductor layer 432_2 is preferably In:M:Zn=4:2:3 or in the neighborhood thereof. The term "neighborhood" includes the following: when In is 4, M is greater than or equal to 1.5 and less than or equal to 2.5, and Zn is greater than or equal to 2 and less than or equal to 4. Alternatively, the atomic ratio of In to M and Zn in each of the semiconductor layer 432_1 and the semiconductor layer 432_2 is preferably In:M:Zn=5:1:6 or in the neighborhood thereof. When the compositions of the semiconductor layer 432_1 and the semiconductor layer 432_2 are substantially the same, they can be formed using the same sputtering target and the manufacturing cost can thus be reduced. Since the same sputtering target is used, the semiconductor layer 432_1 and the semiconductor layer 432_2 can be formed successively in the same vacuum chamber. This can suppress entry of impurities into the interface between the semiconductor layer 432_1 and the semiconductor layer 432_2.

The semiconductor layer 432_1 may have a region having lower crystallinity than the semiconductor layer 432_2. Note that the crystallinity of each of the semiconductor layer 432_1 and the semiconductor layer 432_2 can be determined by analysis by X-ray diffraction (XRD) or with a transmission electron microscope (TEM).

The region having low crystallinity in the semiconductor layer 432_1 serves as a diffusion path of excess oxygen, through which excess oxygen can be diffused into the semiconductor layer 432_2 having higher crystallinity than the semiconductor layer 432_1. When a multi-layer structure including the semiconductor layers having different crystal structures is employed and the region having low crystallinity is used as a diffusion path of excess oxygen as described above, the transistor can be highly reliable.

The semiconductor layer 432_2 having a region having higher crystallinity than the semiconductor layer 432_1 can prevent impurities from entering the semiconductor layer 432. In particular, the increased crystallinity of the semiconductor layer 432_2 can reduce damage at the time of processing into the conductive layers 433*a* and 433*b*. The surface of the semiconductor layer 432, i.e., the surface of the semiconductor layer 432_2 is exposed to an etchant or an etching gas at the time of processing into the conductive layers 433*a* and 433*b*. However, when the semiconductor layer 432_2 has a region having high crystallinity, the semiconductor layer 432_2 has higher etching resistance than the semiconductor layer 432_1. Therefore, the semiconductor layer 432_2 serves as an etching stopper.

When the semiconductor layer 432_1 has a region having lower crystallinity than the semiconductor layer 432_2, in some cases, the semiconductor layer 432_1 has a high carrier density.

When the semiconductor layer 432_1 has a high carrier density, the Fermi level is sometimes high relative to the conduction band of the semiconductor layer 432_1. This lowers the conduction band minimum of the semiconductor layer 432_1, so that the energy difference between the conduction band minimum of the semiconductor layer 432_1 and the trap level, which might be formed in a gate insulating layer (here, the insulating layer 434), is increased in some cases. The increase of the energy difference can reduce trap of charges in the gate insulating layer and reduce variation in the threshold voltage of the transistor, in some cases. In addition, when the semiconductor layer 432_1 has a high carrier density, the semiconductor layer 432 can have high field-effect mobility.

Although the semiconductor layer 432 in the transistor 200*a* has a multi-layer structure including two layers in this example, the structure is not limited thereto, and the semiconductor layer 432 may have a multi-layer structure including three or more layers.

A structure of an insulating layer 436 provided over the conductive layer 433*a* and the conductive layer 433*b* is described.

The insulating layer 436 of the transistor 200*a* includes an insulating layer 436*a* and an insulating layer 436*b* over the insulating layer 436*a*. The insulating layer 436*a* has a function of supplying oxygen to the semiconductor layer 432 and function of preventing impurities (typically, water, hydrogen, and the like) from entering the semiconductor layer 432. As the insulating layer 436*a*, an aluminum oxide film, an aluminum oxynitride film, or an aluminum nitride oxide film can be used. In particular, the insulating layer 436*a* is preferably an aluminum oxide film formed by a reactive sputtering method. As an example of a method for forming an aluminum oxide by a reactive sputtering method, the following method can be given.

First, a mixed gas of an inert gas (typically, an Ar gas) and an oxygen gas is introduced into a sputtering chamber. Subsequently, a voltage is applied to an aluminum target provided in the sputtering chamber, whereby the aluminum oxide film can be deposited. Electric power used for applying a voltage to the aluminum target is supplied from a DC power source, an AC power source, or an RF power source. The DC power source is particularly preferably used to improve the productivity.

The insulating layer 436*b* has a function of preventing the entry of impurities (typically, water, hydrogen, and the like). As the insulating layer 436*b*, a silicon nitride film, a silicon nitride oxide film, or a silicon oxynitride film can be used. In particular, a silicon nitride film formed by a PECVD method is preferably used as the insulating layer 436*b*. The silicon nitride film formed by a PECVD method is preferable because the film is likely to have a high film density.

Note that the hydrogen concentration in the silicon nitride film formed by a PECVD method is high in some cases.

Since the insulating layer 436*a* is provided below the insulating layer 436*b* in the transistor 200*a*, hydrogen in the insulating layer 436*b* does not or is less likely to diffuse into the semiconductor layer 432 side.

The transistor 200*a* is a single-gate transistor. The use of a single-gate transistor can reduce the number of masks, leading to increased productivity.

Figure 30C:
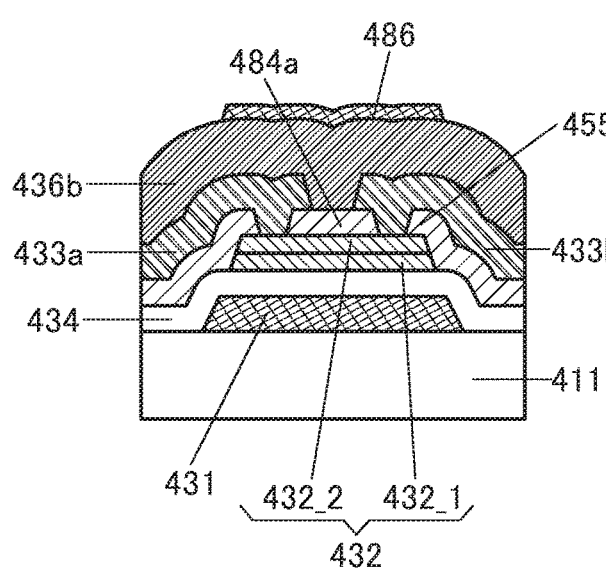
Figure 30D:
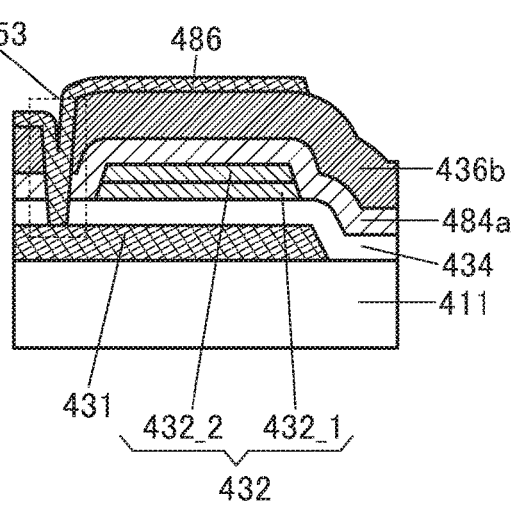

FIG. 30C is a cross-sectional view of a transistor 200*b* in the channel length direction, and FIG. 30D is a cross-sectional view of the transistor 200*b* in the channel width direction.

The transistor 200*b* is a modification example of the transistor illustrated in FIG. 29B.

The transistor 200*b* is different from the transistor illustrated in FIG. 29B in the structures of the semiconductor layer 432 and the insulating layer 484. Specifically, the transistor 200*b* includes the semiconductor layer 432 having a two-layer structure, and the transistor 200*b* includes an insulating layer 484*a* instead of the insulating layer 484. The transistor 200*b* further includes the insulating layer 436*b* and the conductive layer 486.

The insulating layer 484*a* has a function similar to that of the insulating layer 436*a*.

An opening 453 is provided through the insulating layers 434, 484*a*, and 436*b*. The conductive layer 486 is electrically connected to the conductive layer 431 in the opening 453.

The structure of the transistor 200*a* or 200*b* can be formed using the existing production line without high capital investment. For example, a manufacturing plant for an oxide semiconductor can be simply substituted for a manufacturing plant for hydrogenated amorphous silicon.

FIGS. 31A to 31F illustrate transistors each including silicon in the semiconductor layer 432.

The transistors are each provided over the insulating surface 411. The transistors each include the conductive layer 431 functioning as a gate electrode, the insulating layer 434 functioning as a gate insulating layer, one or both of the semiconductor layer 432 and a semiconductor layer 432*p*, a pair of conductive layers 433*a* and 433*b* functioning as a source electrode and a drain electrode, and an impurity semiconductor layer 435. A region of the semiconductor layer overlapping with the conductive layer 431 functions as a channel formation region. The semiconductor layer is in contact with the conductive layer 433*a* or 433*b*.

Figure 31A:
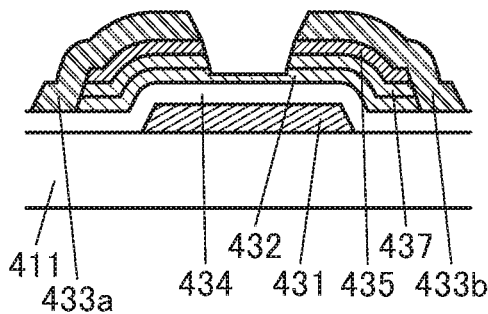
FIGS. 31A to 31F illustrate structure examples of a transistor.

The transistor illustrated in FIG. 31A is a channel-etched bottom-gate transistor. The impurity semiconductor layer 435 is provided between the conductive layer 433*a* or the conductive layer 433*b*, and the semiconductor layer 432.

The transistor illustrated in FIG. 31A includes a semiconductor layer 437 between the semiconductor layer 432 and the impurity semiconductor layer 435.

The semiconductor layer 437 may be formed using a semiconductor film similar to the semiconductor layer 432. The semiconductor layer 437 can serve as an etching stopper that prevents the removal of the semiconductor layer 432 in the etching of the impurity semiconductor layer 435. Although FIG. 31A illustrates an example in which the semiconductor layer 437 is divided into a right part and a left part, the semiconductor layer 437 may partly cover the channel formation region of the semiconductor layer 432.

The semiconductor layer 437 may include an impurity at a concentration lower than the impurity semiconductor layer 435. In that case, the semiconductor layer 437 can serve as a lightly doped drain (LDD) regions, so that hot-carrier degradation that is caused when a transistor is driven can be suppressed.

Figure 31B:
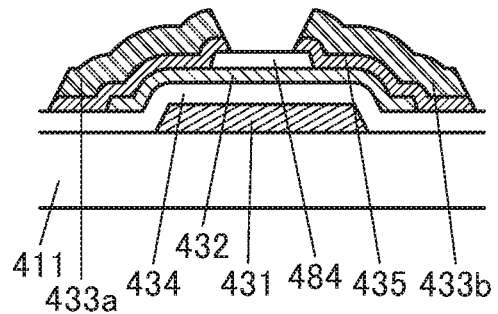

The transistor illustrated in FIG. 31B includes the insulating layer 484 over the channel formation region of the semiconductor layer 432. The insulating layer 484 serves as an etching stopper in the etching of the impurity semiconductor layer 435.

Figure 31C:
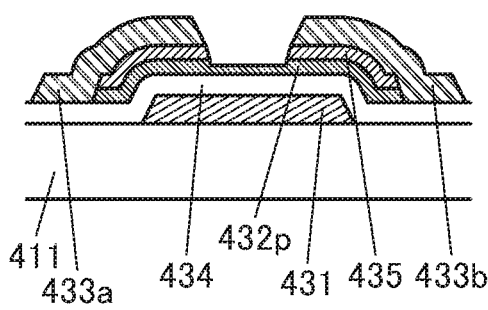

The transistor illustrated in FIG. 31C includes the semiconductor layer 432p instead of the semiconductor layer 432. The semiconductor layer 432p includes a semiconductor film having high crystallinity. The semiconductor layer 432p includes a polycrystalline semiconductor or a single crystal semiconductor, for example. With such a structure, a transistor with high field-effect mobility can be formed.

Figure 31D:
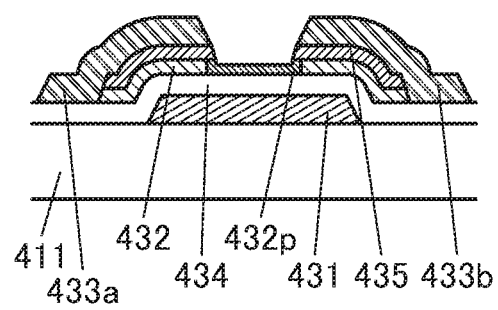

The transistor illustrated in FIG. 31D includes the semiconductor layer 432p in the channel formation region of the semiconductor layer 432. The transistor illustrated in FIG. 31D can be formed by, for example, irradiation of a semiconductor film to be the semiconductor layer 432 with laser light or the like to locally crystallize the semiconductor film. In this way, a transistor having high field-effect mobility can be obtained.

Figure 31E:
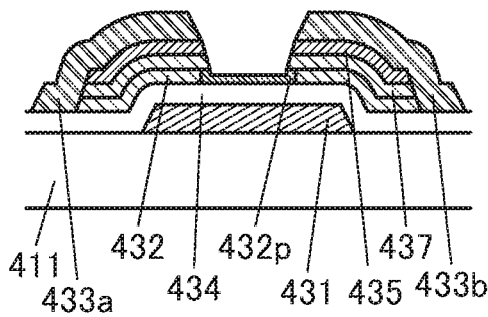

The transistor illustrated in FIG. 31E includes the semiconductor layer 432p having crystallinity in the channel formation region of the semiconductor layer 432 illustrated in FIG. 31A.

Figure 31F:
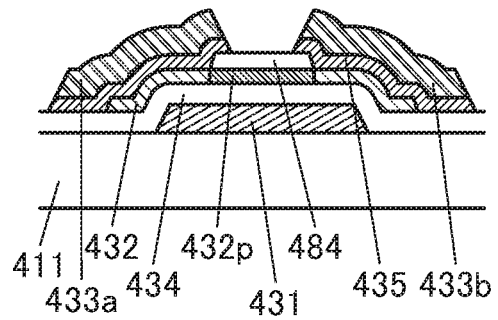

The transistor illustrated in FIG. 31F includes the semiconductor layer 432p having crystallinity in the channel formation region of the semiconductor layer 432 illustrated in FIG. 31B.

[Semiconductor Layer]

There is no particular limitation on the crystallinity of a semiconductor material used for the transistors disclosed in one embodiment of the present invention, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

As a semiconductor material used for the transistors, a metal oxide whose energy gap is greater than or equal to 2 eV, preferably greater than or equal to 2.5 eV, further preferably greater than or equal to 3 eV can be used. A typical example thereof is a metal oxide containing indium, and for example, a CAC-OS described later or the like can be used.

A transistor with a metal oxide having a larger band gap and a lower carrier density than silicon has a low off-state current; therefore, charges stored in a capacitor that is series-connected to the transistor can be held for a long time.

The semiconductor layer can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium).

In the case where the metal oxide contained in the semiconductor layer contains an In-M-Zn-based oxide, it is preferable that the atomic ratio of metal elements of a sputtering target used for forming a film of the In-M-Zn oxide satisfy In M and Zn M. The atomic ratio of metal elements of such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio of metal elements in the formed oxide semiconductor layer varies from the above atomic ratios of metal elements of the sputtering targets in a range of ±40%.

Refer to Embodiment 4 for details of the metal oxide favorably used for a semiconductor layer.

As a semiconductor material used for the transistor, for example, silicon can be used. In particular, amorphous silicon is preferably used. By using amorphous silicon, the transistor can be formed over a large-area substrate with high yield, so that mass productivity can be improved.

Alternatively, silicon having crystallinity such as microcrystalline silicon, polycrystalline silicon, or single crystal silicon can be used. In particular, polycrystalline silicon can be formed at a lower temperature than single-crystal silicon and has higher field-effect mobility and higher reliability than amorphous silicon.

<3-5. Structure Example 2 of Display Device>

Figure 35:
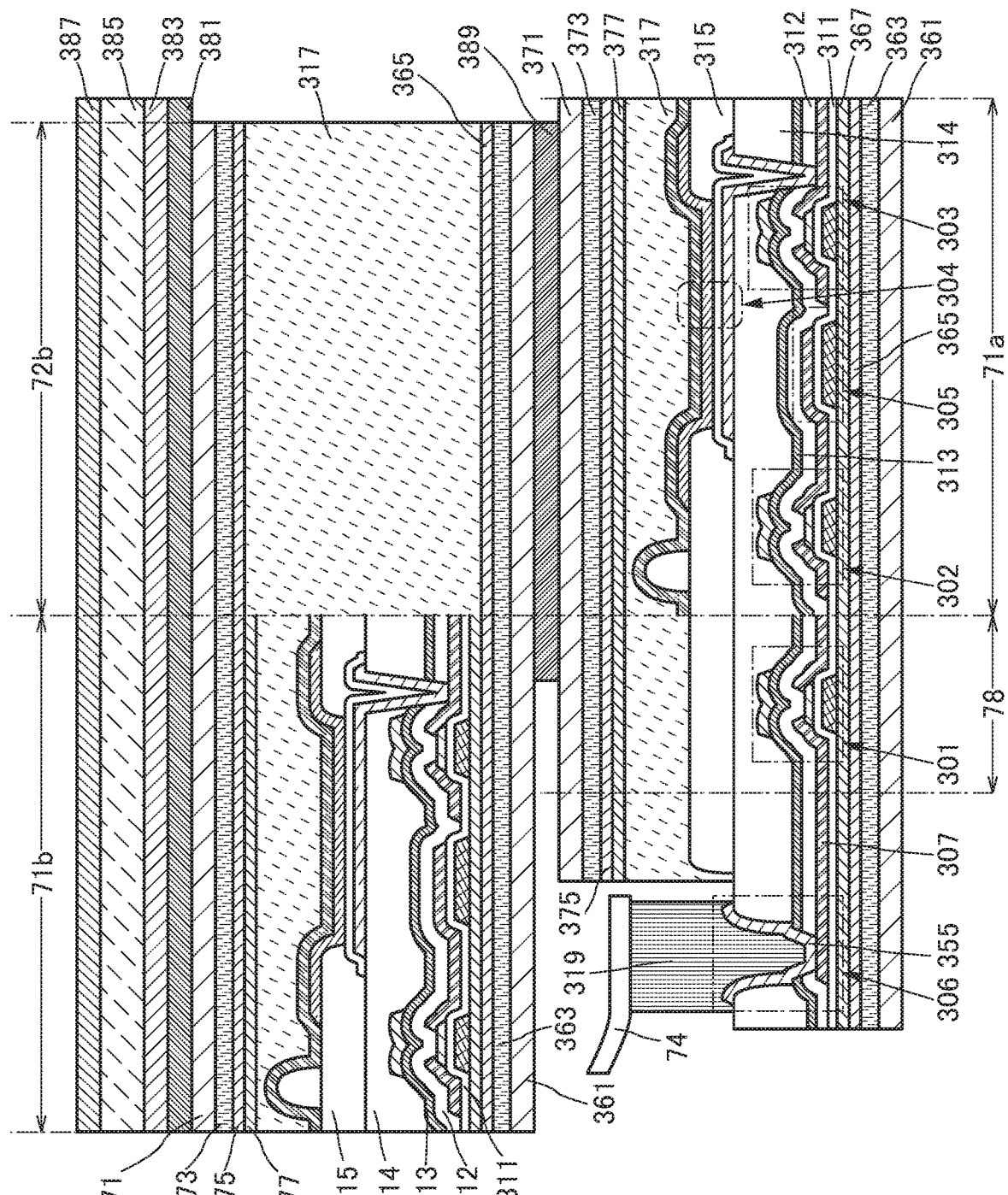
FIG. 35 illustrates a structure example of a display device.

Next, the structure example of the display panel DP illustrated in FIG. 13A will be described with reference to FIGS. 32A and 32B, FIGS. 33A and 33B, and FIGS. 34A and 34B. FIG. 35 is a cross-sectional view of a display device including two overlapping display panels.

FIG. 32A is a top view of a display panel 370.

The display panel 370 illustrated in FIG. 32A includes the pixel portion 71, the visible light-transmitting region 72, and a driver circuit portion 78. In the example illustrated in FIG. 32A, the visible light-transmitting region 72 is adjacent to the pixel portion 71 and provided along two sides of the pixel portion 71.

FIG. 32B is a cross-sectional view of a display panel 370A employing a separate coloring method and having a top-emission structure. FIG. 32B corresponds to cross-sectional views along dashed-dotted lines A1-A2 and A3-A4 in FIG. 32A.

The display panel 370A includes a substrate 361, a bonding layer 363, an insulating layer 365, an insulating layer 367, a plurality of transistors, a capacitor 305, a conductive layer 307, an insulating layer 312, an insulating layer 313, an insulating layer 314, an insulating layer 315, a light-emitting element 304, a conductive layer 355, a spacer 316, a bonding layer 317, a substrate 371, a bonding layer 373, an insulating layer 375, and an insulating layer 377.

The layers included in the visible light-transmitting region 72 transmit visible light. FIG. 32B illustrates an example in which the visible light-transmitting region 72 includes the substrate 361, the bonding layer 363, the insulating layer 365, the insulating layer 367, a gate insulating layer 311, the insulating layer 312, the insulating layer 313, the insulating layer 314, the bonding layer 317, the insulating layer 377, the insulating layer 375, the bonding layer 373, and the substrate 371. In this stacked-layer structure, the materials for the layers are preferably selected such that a difference in refractive index at each interface is minimized. A difference in refractive index between two layers that are in contact with each other is reduced, so that a junction between the two display panels cannot be easily noticed by a user.

As in each of a display panel 370B illustrated in FIG. 33A and a display panel 370C illustrated in FIG. 33B, the number of insulating layers included in the visible light-transmitting region 72 is preferably smaller than that of insulating layers included in the pixel portion 71.

The display panel 370B is different from the display panel 370A in that the visible light-transmitting region 72 does not include the insulating layer 313 and the insulating layer 314.

The display panel 370C is different from the display panel 370A in that the visible light-transmitting region 72 does not include the insulating layer 367, the gate insulating layer 311, the insulating layer 312, the insulating layer 313, the insulating layer 314, and the insulating layer 377.

The number of insulating layers included in the visible light-transmitting region 72 is reduced, and thus the number of interfaces at which a difference in refractive index is large can be reduced. Thus, the reflection of external light in the visible light-transmitting region 72 can be suppressed. In this case, the visible light transmittance in the visible light-transmitting region 72 can be increased. Thus, the difference in the luminance (brightness) of display on the display panel on the lower side between a portion seen through the visible light-transmitting region 72 and a portion seen not through the region can be small. Accordingly, the display unevenness or luminance unevenness of the display device can be suppressed.

The structures of the display panels 370A, 370B, and 370C are the same except for the visible light-transmitting region 72.

The driver circuit portion 78 includes a transistor 301. The pixel portion 71 includes a transistor 302 and a transistor 303.

Each transistor includes a gate, the gate insulating layer 311, a semiconductor layer, a back gate, a source, and a drain. The gate (the lower gate) and the semiconductor layer overlap with each other with the gate insulating layer 311 positioned therebetween. Part of the gate insulating layer 311 functions as a dielectric of the capacitor 305. The conductive layer functioning as the source or the drain of the transistor 302 serves as one electrode of the capacitor 305. The back gate (the upper gate) and the semiconductor layer overlap with each other with the insulating layer 312 and the insulating layer 313 positioned therebetween.

The structure of the transistor may be different between the driver circuit portion 78 and the pixel portion 71. The driver circuit portion 78 and the pixel portion 71 may each include a plurality of kinds of transistors.

The transistors 301, 302, and 303 each include two gates, the gate insulating layer 311, a semiconductor layer, a source, and a drain. It is preferable that the two gates be electrically connected to each other.

The capacitor 305 includes a pair of electrodes and the dielectric therebetween. The capacitor 305 includes a conductive layer that is formed using the same material and the same step as the gate (the lower gate) of the transistor and a conductive layer that is formed using the same material and the same step as the source and the drain of the transistor.

A material through which impurities such as water and hydrogen do not easily diffuse is preferably used for at least one of the insulating layers 312, 313, and 314. Diffusion of impurities from the outside into the transistors can be effectively inhibited, leading to improved reliability of the display panel. The insulating layer 314 functions as a planarization layer. In the example illustrated in FIG. 32B, the insulating layer 314 is formed using an organic material and extends over the entire area of the display panel. Such a structure is preferable because the yield of the peeling process can be increased. Alternatively, as illustrated in FIGS. 33A and 33B, a structure can be employed in which the insulating layer formed using an organic material is not placed in an end portion of the display panel. This structure can inhibit entry of impurities into the light-emitting element 304.

The insulating layer 365 and the substrate 361 are attached to each other with the bonding layer 363. The insulating layer 375 and the substrate 371 are attached to each other with the bonding layer 373.

In the pixel portion 71, the light-emitting element 304 is positioned between the insulating layer 367 and the insulating layer 377. Entry of impurities into the light-emitting element 304 from the thickness direction of the display panel 370 is suppressed. Similarly, a plurality of insulating layers covering the transistors are provided in the pixel portion 71, and thus entry of impurities into the transistors is suppressed.

The light-emitting element 304, the transistors, and the like are preferably provided between a pair of insulating films that are highly resistant to moisture, in which case entry of impurities such as water into these elements can be suppressed, leading to higher reliability of the display panel.

Examples of the insulating film highly resistant to moisture include a film containing nitrogen and silicon (e.g., a silicon nitride film and a silicon nitride oxide film) and a film containing nitrogen and aluminum (e.g., an aluminum nitride film). Alternatively, a silicon oxide film, a silicon oxynitride film, an aluminum oxide film, or the like may be used.

For example, the moisture vapor transmission rate of the insulating film highly resistant to moisture is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], still further preferably lower than or equal to $1\times0^{-8}$ [g/(m$^2$·day)].

The light-emitting element 304 includes an electrode 321, an EL layer 322, and an electrode 323. The light-emitting element 304 may include an optical adjustment layer 324. The light-emitting element 304 emits light to the substrate 371 side.

The transistor, the capacitor, the wiring, and the like are provided to overlap with a light-emitting region of the light-emitting element 304, whereby an aperture ratio of the pixel portion 71 can be increased.

The electrode 321 is electrically connected to the source or the drain of the transistor 303, directly or through another conductive layer. The electrode 321 functions as a pixel electrode and is provided for each light-emitting element 304. Two adjacent electrodes 321 are electrically insulated from each other by the insulating layer 315.

The EL layer 322 is a layer containing a light-emitting material. As the light-emitting element 304, an organic EL element including an organic compound as a light-emitting material can be favorably used.

The EL layer 322 includes at least one light-emitting layer.

The electrode 323 functions as a common electrode and is provided for a plurality of light-emitting elements 304. A fixed potential is supplied to the electrode 323.

The connection portion 306 includes the conductive layer 307 and the conductive layer 355. The conductive layer 307 and the conductive layer 355 are electrically connected to each other. The conductive layer 307 can be formed using the same material and the same step as those of the source and the drain of the transistor. The conductive layer 355 is electrically connected to an external input terminal through which a signal or a potential from the outside is transmitted to the driver circuit portion 78. Here, an example in which the FPC 74 is provided as an external input terminal is shown. The FPC 74 and the conductive layer 355 are electrically connected to each other through a connector 319.

A flexible substrate is preferably used as each of the substrates 361 and 371. For example, glass, quartz, a resin, a metal, an alloy, or a semiconductor that is thin enough to have flexibility can be used. The substrate through which light is extracted from the light-emitting element is formed using a material that transmits the light.

For the bonding layer, various curable adhesives such as a photocurable adhesive (e.g., an ultraviolet curable adhesive), a reactive curable adhesive, a thermosetting adhesive, and an anaerobic adhesive can be used. Alternatively, an adhesive sheet or the like may be used.

As in a display panel 370D illustrated in FIG. 34A and a display panel 370E illustrated in FIG. 34B, the insulating layer 375 may be provided in contact with the light-emitting element 304. In FIGS. 34A and 34B, the substrate 371 is bonded with not the bonding layer 373 but the bonding layer 317.

In manufacturing the display panels 370B and 370C, the insulating layer 375 formed over a formation substrate is transferred to the substrate 361. In contrast, in manufacturing the display panels 370D and 370E, the insulating layer 375 is directly formed on the light-emitting element 304. This structure eliminates the need for the peeling process, which simplifies the manufacturing process of the display panel.

FIG. 35 is an example of a cross-sectional view of a display device including two overlapping display panels 370C illustrated in FIG. 33B.

FIG. 35 illustrates the pixel portion 71a and the region blocking visible light (the driver circuit portion 78 and the like) of a lower display panel, and the pixel portion 71b and the region 72b transmitting visible light of an upper display panel.

In the display device illustrated in FIG. 35, the display panel positioned on the display surface side (upper side) includes the region 72b transmitting visible light adjacent to the pixel portion 71b. The pixel portion 71a of the lower display panel and the region 72b transmitting visible light of the upper display panel overlap with each other. Thus, a non-display region between the display regions of the two display panels overlapping with each other can be reduced or even removed. Accordingly, a large display device in which a junction between display panels is less likely to be noticed by a user can be obtained.

The display device illustrated in FIG. 35 includes a light-transmitting layer 389 having a refractive index higher than that of air and transmitting visible light between the pixel portion 71a and the region 72b transmitting visible light. In that case, air can be prevented from entering between the pixel portion 71a and the region 72b transmitting visible light, so that the interface reflection due to a difference in refractive index can be reduced. In addition, display unevenness or luminance unevenness of the display device can be suppressed.

The light-transmitting layer 389 may overlap with the entire surface of the substrate 371 of the lower display panel or that of the substrate 361 of the upper display panel, or may overlap with only the pixel portion 71a and the region 72b transmitting visible light. In addition, the light-transmitting layer 389 may overlap with the driver circuit portion 78.

Note that the transmittance with respect to visible light in the light-transmitting layer 389 is preferably higher because the light extraction efficiency of the display device can be increased. The light-transmitting layer 389 preferably has a transmittance of higher than or equal to 80% and further preferably higher than or equal to 90% on average with respect to light with a wavelength greater than or equal to 400 nm and less than or equal to 700 nm.

The difference in refractive index between the light-transmitting layer 389 and a layer in contact with the light-transmitting layer 389 is preferably smaller because the reflection of light can be suppressed. For example, the refractive index of the light-transmitting layer 389 is higher than that of air, and preferably higher than or equal to 1.3 and lower than or equal to 1.8. The difference in the refractive index between the light-transmitting layer 389 and the layer in contact with the light-transmitting layer 389 (e.g., a substrate included in the display panel) is preferably lower than or equal to 0.30, further preferably lower than or equal to 0.20, and still further preferably lower than or equal to 0.15.

The light-transmitting layer 389 may be detachably in contact with at least one of the lower display panel and the upper display panel. In the case where the display panels included in the display device are individually detachable, when malfunction occurs in one of the display panels, for example, only the defective display panel can be easily replaced with a new display panel. The continuous use of the other display panel enables the display device to be used longer and at lower cost. As the light-transmitting layer 389, a film serving as an adsorbent for the display panel (an adsorption film or the like) can be used, for example.

An adhesive may be used for the light-transmitting layer 389 to fix the display panels to each other.

It is preferable that the light-transmitting layer have no adhesiveness or low adhesiveness. In that case, attachment and separation of the light-transmitting layer to and from an object can be repeated without damaging or contaminating a surface of the object.

The display device preferably includes an optical member on the display surface side. FIG. 35 illustrates an example in which circularly polarizing plates (a ¼ λ plate 381 and a linear polarizing plate 383), a support member 385, and an anti-reflection member 387 are provided from the display panel side. The ¼ λ plate 381 is provided to overlap with the linear polarizing plate 383 to have an axis that intersected an axis of the linear polarizing plate 383 at 45°. The optical member is preferably fixed on a housing or the like with the optical member and the display panel being in intimate contact with each other.

Note that the display device of one embodiment of the present invention may include a power supply unit and a source driver for each display panel.

Alternatively, the display device of one embodiment of the present invention may have a structure in which only some displays are directly connected to the power supply unit and the source driver and other display panels are connected to the power supply unit and the source driver through another display panel. Consequently, the structure on the back side of the display device can be simplified, whereby reduction in size and weight of the display device can be achieved. Such a structure will be described with reference to FIGS. 36A to 36C.

Figure 36A:
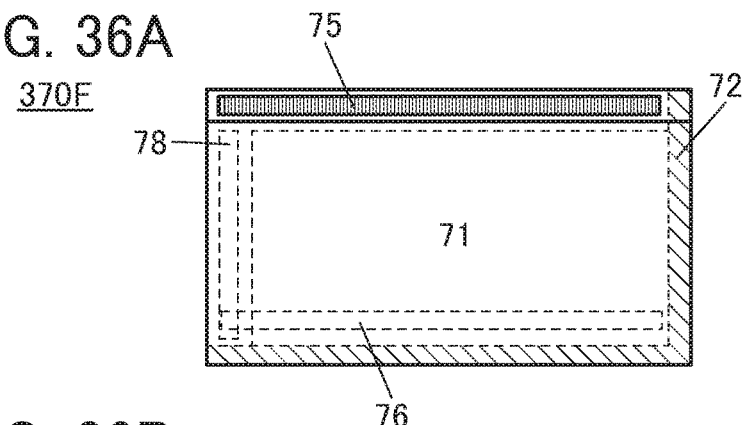
FIGS. 36A and 36B illustrate a structure example of a display panel.
Figure 36B:
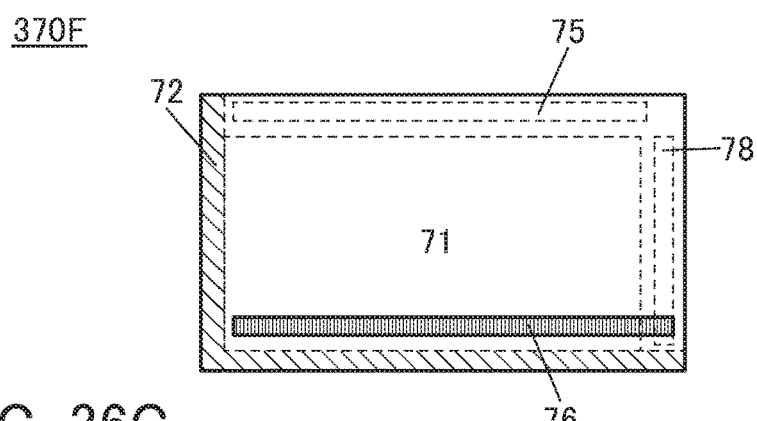

FIG. 36A illustrates the display surface side (front surface side) of a display panel 370F and FIG. 36B illustrates the side (rear surface side) opposite to the display surface of the display panel 370F.

The display panel 370F includes the pixel portion 71, the visible light-transmitting region 72, the driver circuit portion 78, a terminal 75, and a terminal 76. The terminal 75 is exposed to the display surface side of the display panel 370F and the terminal 76 is exposed to the rear surface side of the display panel 370F.

Figure 36C:
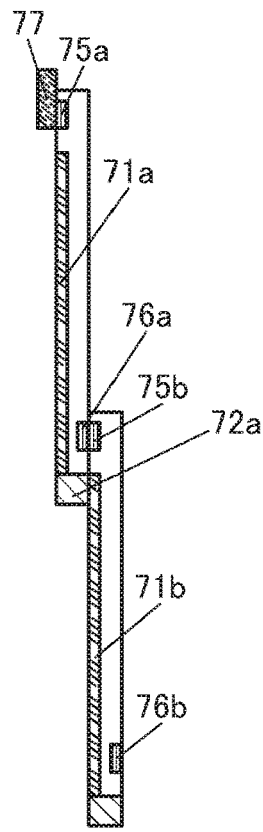
FIG. 36C illustrates a structure example of a display device.

FIG. 36C is a cross-sectional view of a display device including two overlapping display panels 370F.

A terminal 75a of the upper display panel is electrically connected to a power supply unit 77. The terminal 75a may be electrically connected to not only the power supply unit but also a source driver or the like. A terminal 76a of the upper display panel is electrically connected to a terminal 75b of the lower display panel. With this structure, the lower display panel can also be electrically connected to the power supply unit 77 through the upper display panel.

This embodiment can be combined with any of the other embodiments as appropriate.

Embodiment 4

Described in this embodiment is a metal oxide that can be used in a semiconductor layer of a transistor disclosed in one embodiment of the present invention. Note that in the case where a metal oxide is used in a semiconductor layer of a transistor, the metal oxide can be rephrased as an oxide semiconductor.

An oxide semiconductor is classified into a single crystal oxide semiconductor and a non-single-crystal oxide semiconductor. Examples of the non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

A cloud-aligned composite OS (CAC-OS) may be used in a semiconductor layer of a transistor disclosed in one embodiment of the present invention.

The aforementioned non-single-crystal oxide semiconductor or CAC-OS can be favorably used in a semiconductor layer of a transistor disclosed in one embodiment of the present invention. As the non-single-crystal oxide semiconductor, an nc-OS or a CAAC-OS can be favorably used.

In one embodiment of the present invention, a CAC-OS is preferably used in a semiconductor layer of a transistor. The use of the CAC-OS allows the transistor to have high electrical characteristics or high reliability.

The CAC-OS will be described in detail below.

A CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a channel formation region of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or the CAC metal oxide, separation of the functions can maximize each function.

The CAC-OS or the CAC metal oxide includes conductive regions and insulating regions. The conductive regions have the aforementioned conducting function and the insulating regions have the aforementioned insulating function. In some cases, the conductive regions and the insulating regions in the material are separated at the nanoparticle level. In some cases, the conductive regions and the insulating regions are unevenly distributed in the material. The conductive regions are sometimes observed to be coupled in a cloud-like manner with their boundaries blurred.

In the CAC-OS or the CAC metal oxide, the conductive regions and the insulating regions each have a size greater than or equal to 0.5 nm and less than or equal to 10 nm, preferably greater than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or CAC metal oxide is used in a channel formation region of a transistor, high current drive capability in the on state of the transistor, that is, high on-state current and high field-effect mobility, can be obtained.

In other words, the CAC-OS or the CAC-metal oxide can be referred to as a matrix composite or a metal matrix composite.

The CAC-OS has, for example, a composition in which elements included in a metal oxide are unevenly distributed. The unevenly distributed elements each have a size greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The regions each have a size greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, one or more elements selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite metal oxide with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystalline (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not heated intentionally, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor element including a CAC-OS has high reliability. Thus, the CAC-OS is suitably used in a variety of semiconductor devices.

This embodiment can be combined with any of the other embodiments as appropriate.

Embodiment 5

In this embodiment, an electronic device of one embodiment of the present invention will be described with reference to FIGS. 37A to 37D and FIGS. 38A and 38B.

Electronic devices of this embodiment are provided with a display system of one embodiment of the present invention. Therefore, a display portion of the electronic devices can display a high-quality picture.

The display portion of the electronic device of this embodiment can display, for example, an image with a resolution of full high definition, 2K, 4K, 8K, 16K, or more. As a screen size of the display portion, the diagonal size can be greater than or equal to 20 inches, greater than or equal to 30 inches, greater than or equal to 50 inches, greater than or equal to 60 inches, or greater than or equal to 70 inches.

Examples of electronic devices include electronic devices with a relatively large screen, such as a television device, a desktop or laptop personal computer, a monitor of a computer or the like, digital signage, and a large game machine (e.g., a pachinko machine); a camera such as a digital camera or a digital video camera; a digital photo frame; a mobile phone; a portable game console; a portable information terminal; and an audio reproducing device.

The electronic device of one embodiment of the present invention may include an antenna. When a signal is received by the antenna, the electronic device can display an image, data, or the like on a display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays).

The electronic device of one embodiment of the present invention can have a variety of functions such as a function of displaying a variety of information (e.g., a still image, a moving image, and a text image) on the display portion, a touch panel function, a function of displaying a calendar, date, time, and the like, a function of executing a variety of software (programs), a wireless communication function, and a function of reading out a program or data stored in a recording medium.

Figure 37A:
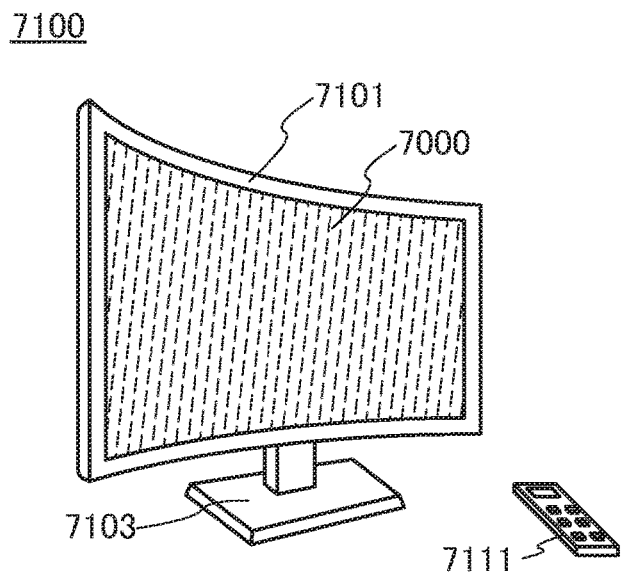
FIGS. 37A to 37D illustrate examples of electronic devices.

FIG. 37A illustrates an example of a television device. In a television device 7100, a display portion 7000 is incorporated in a housing 7101. In addition, here, the housing 7101 is supported by a stand 7103.

The display device of one embodiment of the present invention can be used in the display portion 7000.

The television device 7100 illustrated in FIG. 37A can be operated with an operation switch provided in the housing 7101 or a separate remote controller 7111. Furthermore, the display portion 7000 may include a touch sensor. The television device 7100 can be operated by touching the display portion 7000 with a finger or the like. Furthermore, the remote controller 7111 may be provided with a display portion for displaying data output from the remote controller 7111. With operation keys or a touch panel of the remote controller 7111, channels and volume can be controlled and images displayed on the display portion 7000 can be controlled.

Note that the television device 7100 is provided with a receiver, a modem, and the like. With use of the receiver, general television broadcasting can be received. When the television device is connected to a communication network with or without wires via the modem, one-way (from a transmitter to a receiver) or two-way (between a transmitter and a receiver or between receivers) data communication can be performed.

Figure 37B:
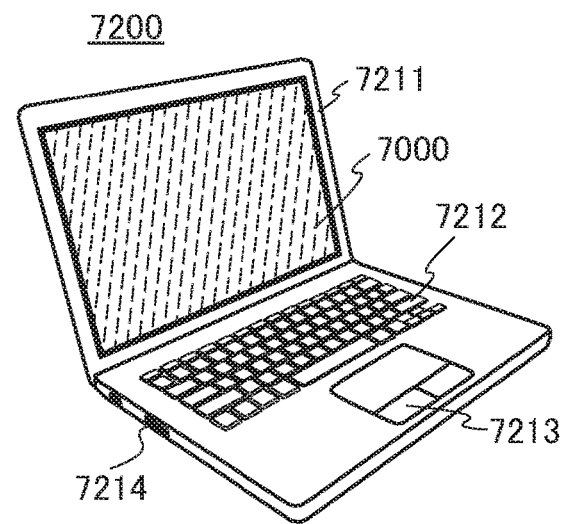

FIG. 37B illustrates an example of a laptop personal computer. A laptop personal computer 7200 includes a housing 7211, a keyboard 7212, a pointing device 7213, an external connection port 7214, and the like. In the housing 7211, the display portion 7000 is incorporated.

The display device of one embodiment of the present invention can be used in the display portion 7000.

Figure 37C:
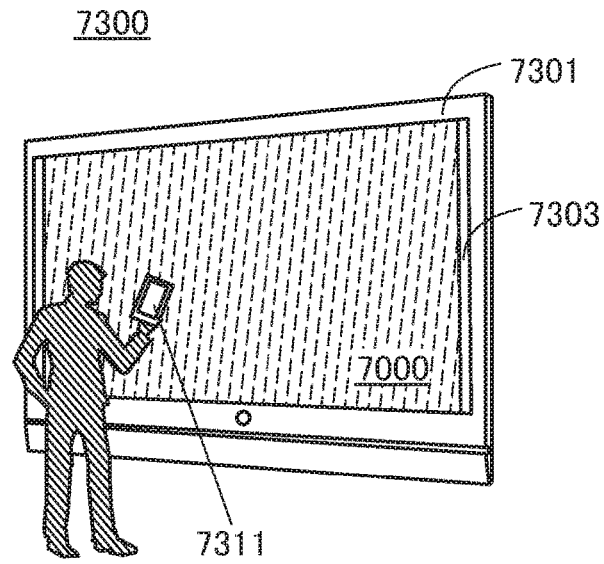
Figure 37D:
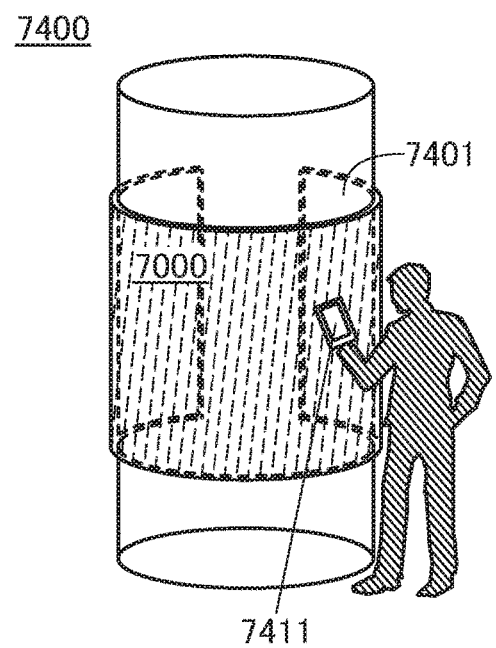

FIGS. 37C and 37D illustrate examples of digital signage.

A digital signage 7300 illustrated in FIG. 37C includes a housing 7301, the display portion 7000, a speaker 7303, and the like. Also, the digital signage can include an LED lamp, operation keys (including a power switch or an operation switch), a connection terminal, a variety of sensors, a microphone, and the like.

FIG. 37D illustrates a digital signage 7400 mounted on a cylindrical pillar 7401. The digital signage 7400 includes the display portion 7000 provided along a curved surface of the pillar 7401.

The display device of one embodiment of the present invention can be used for each of the display portions 7000 illustrated in FIGS. 37C and 37D.

A larger area of the display portion 7000 can provide more information at a time. In addition, the larger display portion 7000 attracts more attention, so that the effectiveness of the advertisement can be increased, for example.

It is preferable to use a touch panel in the display portion 7000 because a device with such a structure does not just display a still or moving image, but can be operated by users intuitively. Alternatively, in the case where the display device of one embodiment of the present invention is used for providing information such as route information or traffic information, usability can be enhanced by intuitive operation.

Furthermore, as illustrated in FIGS. 37C and 37D, it is preferable that the digital signage 7300 or the digital signage 7400 work with an information terminal 7311 or an information terminal 7411 such as a smartphone a user has through wireless communication. For example, information of an advertisement displayed on the display portion 7000 can be displayed on a screen of the information terminal 7311 or 7411. Moreover, by operation of the information terminal 7311 or 7411, a displayed image on the display portion 7000 can be switched.

Furthermore, it is possible to make the digital signage 7300 or 7400 execute a game with use of the screen of the information terminal 7311 or 7411 as an operation means (controller). Thus, an unspecified number of people can join in and enjoy the game concurrently.

The display system of one embodiment of the present invention can be incorporated along a curved inside/outside wall surface of a house or a building or a curved interior/exterior surface of a vehicle.

An example of installation of the display system of one embodiment of the present invention in a vehicle will be described with reference to FIGS. 38A and 38B.

Figure 38A:
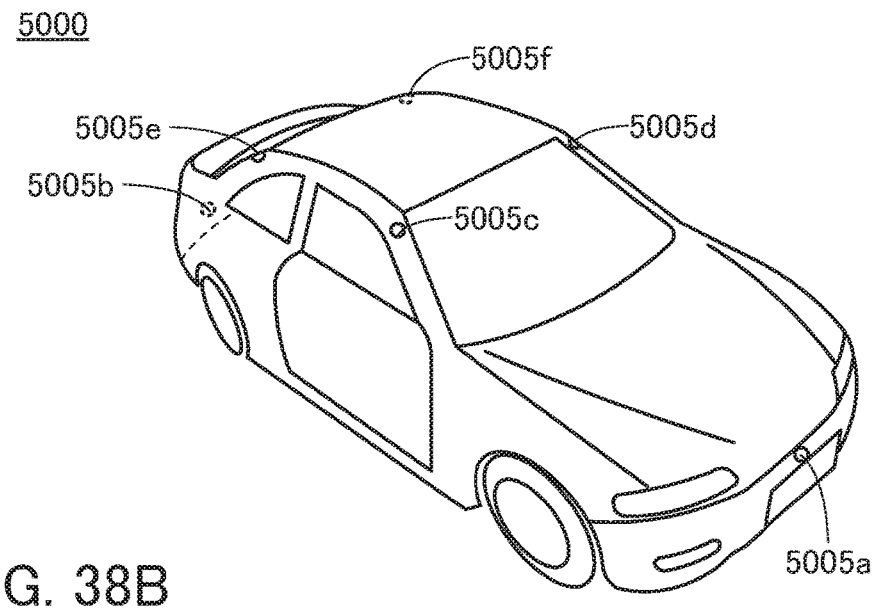
FIGS. 38A and 38B illustrate an example of a vehicle.

FIG. 38A illustrates an example of the appearance of a vehicle 5000. The vehicle 5000 includes a plurality of cameras 5005 (cameras 5005a, 5005b, 5005c, 5005d, 5005e, and 5005f in FIG. 38A). For example, the cameras 5005a, 5005b, 5005c, 5005d, 5005e, and 5005f have a function of taking pictures of situations on the front side, the rear side, the front right side, the front left side, the rear right side, and the rear left side, respectively. Note that the number and the function of cameras that take pictures of the surroundings of the vehicle are not limited to those in the above structure. For example, a camera that takes a picture of a situation on the rear side of the vehicle may be provided on the front side of the vehicle.

Figure 38B:
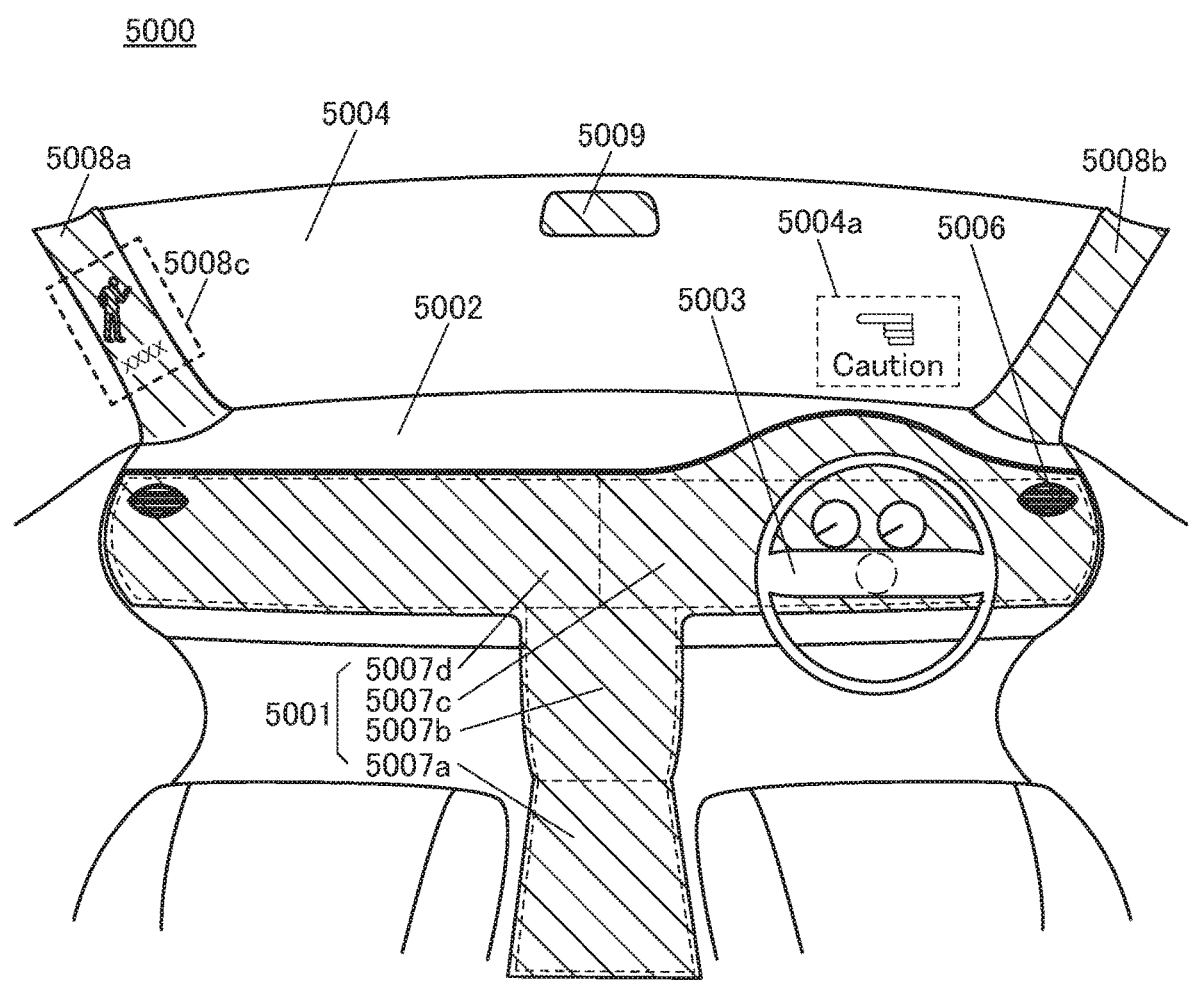

FIG. 38B illustrates an example of the inside of the vehicle 5000. The vehicle 5000 includes a display portion 5001, a display panel 5008a, a display panel 5008b, and a display panel 5009. As one or more of the display portion 5001, the display panel 5008a, the display panel 5008b, and the display panel 5009, a display portion in the display system according to one embodiment of the present invention can be used. Note that although in the example illustrated in FIG. 38B, the display portion 5001 is installed in, but not limited to, a right-hand drive vehicle; installation in a left-hand drive vehicle is possible and in this case the left and right of the components arranged in FIG. 38B are reversed.

FIG. 38B illustrates a dashboard 5002, a steering wheel 5003, a windshield 5004, and the like which are arranged around a driver's seat and a front passenger's seat. The display portion 5001 is placed in a predetermined position in the dashboard 5002, specifically, around the driver, and has a substantially T shape. Although one display portion 5001 formed of a plurality of display panels 5007 (display panels 5007a, 5007b, 5007c, and 5007d) is provided along the dashboard 5002 in the example illustrated in FIG. 38B, the display portion 5001 may be divided and placed in a plurality of portions.

Note that the plurality of display panels 5007 may have flexibility. In this case, the display portion 5001 can be formed into a complicated shape; for example, a structure in which the display portion 5001 is provided along a curved surface of the dashboard 5002 or the like or a structure in which a display region of the display portion 5001 is not provided at a connection portion of the steering wheel, a display portion of a meter, the ventilation duct 5006, or the like can easily be achieved.

The display panels 5008a and 5008b are each provided on a pillar portion. The display panels 5008a and 5008b can compensate for the view hindered by the pillar by showing a picture taken by an imaging unit provided on a car body (e.g., the camera 5005 illustrated in FIG. 38A). A picture taken by the camera 5005d can be displayed on the display panel 5008a as a picture 5008c, for example. Similarly, a picture taken by the camera 5005c is preferably displayed on the display panel 5008b.

The display panel 5009 may have a function of displaying a picture taken by an imaging unit on the rear side (e.g., the camera 5005b).

The display panels 5007, 5008a, 5008b, and 5009 may have a function of displaying legal speed, traffic information, and the like.

The display panels 5008a and 5008b are preferably flexible. In this case, the display panels 5008a and 5008b can be easily provided along the curved surfaces of the pillar portions.

A picture on the display panel provided along the curved surface might be distorted when seen from the driver's seat. Thus, the display panel preferably has a function of displaying an image that is corrected so that the distortion of the picture is reduced. The correction is favorably image processing using a neural network.

Although the cameras 5005c and 5005d are set instead of a side mirror in the example in FIGS. 38A and 38B, both the side mirror and the camera may be set.

As the camera 5005, a CCD camera, a CMOS camera, or the like can be used. In addition, an infrared camera may be used in combination with such a camera. The infrared camera, the output level of which increases as the temperature of the object increases, can detect or extract a living body such as a human or an animal.

An image taken by the camera 5005 can be output to one or more of the display panel 5007, the display panel 5008a, the display panel 5008b, and the display panel 5009. The display portion 5001 and the display panels 5008a, 5008b, and 5009 are mainly used for drive support. The situation around the vehicle is taken at a wide angle of view by the camera 5005, and the image is displayed on the display panels 5007, 5008a, 5008b, and 5009 so that the driver can see a blind area for avoiding an accident.

Furthermore, the use of the display system of one embodiment of the present invention can compensate for the discontinuity of the picture at junctions between the display panels 5007a, 5007b, 5007c, and 5007d. This makes it possible to display a picture with an inconspicuous junction, so that the visibility of the display portion 5001 during driving can be improved.

Furthermore, a distance image sensor may be provided over a roof of the vehicle, for example, so that an image obtained by the distance image sensor may be displayed on the portion 5001. For the distance image sensor, an image sensor, light detection and ranging (LIDAR), or the like can be used. An image obtained by the image sensor and the image obtained by the distance image sensor are displayed on the display portion 5001, whereby more information can be provided to the driver to assist driving.

The display portion 5001 may also have a function of displaying map information, traffic information, television pictures, DVD pictures, and the like. For example, map information can be displayed on the display panels 5007a, 5007b, 5007c, and 5007d as one display screen. Note that the number of the display panels 5007 can be increased depending on the picture to be displayed.

Furthermore, the picture displayed on the display panels 5007a, 5007b, 5007c, and 5007d can be freely changed to meet the driver's preference. For example, television pictures or DVD pictures are displayed on the display panel 5007d on the left, map information is displayed on the display panel 5007b at the center position, meters are displayed on the display panel 5007c on the right, and audio information and the like are displayed on the display panel 5007a near a transmission gear (between the driver's seat and the front passenger's seat). In addition, a combination of the plurality of display panels 5007 can add a fail-safe function to the display portion 5001. For example, even when any one of the display panels 5007 is broken for any reason, a display region can be changed so that display can be performed using another display panel 5007.

The windshield 5004 includes a display panel 5004a. The display panel 5004a has a function of transmitting visible light. A driver can see a background through the display panel 5004a. The display panel 5004a also has a function of performing display for warning a user, for example. Although FIG. 38B illustrates a structure example in which the display panel 5004a is provided on the windshield 5004, one embodiment of the present invention is not limited thereto. For example, the windshield 5004 may be replaced with the display panel 5004a.

This embodiment can be combined with any of other embodiments as appropriate.

Example 1

In this example, results of image correction will be described.

First, image data was input to a display panel, and luminance data of display on the display panel was obtained with a two-dimensional luminance meter. As the image data, data containing coordinate data and gray level data of three colors of RGB was used. The number of gray levels that can be expressed by each gray level data was 8 bits (256 gray levels). The gray level value of all the coordinates of each gray level data was 127, and the display panel performed gray display.

Next, the obtained luminance data was normalized, and then the value of a correction filter was updated by using the normalized luminance data. The value of the correction filter was determined for each coordinate (each pixel). In other words, the values of the correction filter used for three subpixels (RGB) of one pixel were the same.

Subsequently, image data same as the above-described image data was input to the display panel, the data was corrected by using the updated correction filter, and an image was displayed. Then, luminance data was obtained with a two-dimensional luminance meter.

Next, the obtained luminance data was normalized, and then the value of a correction filter was updated by using the normalized luminance data.

In the above manner, obtainment of luminance data and update of the value of the correction filter were performed for five times.

Figure 39A:
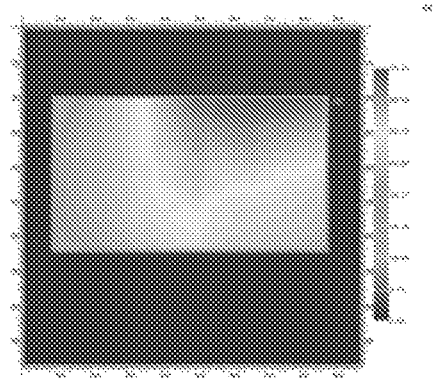
FIGS. 39A to 39F are photographs showing luminance data of Example 1.

FIG. 39A shows luminance data of the display panel before correction, obtained with a two-dimensional luminance meter. FIGS. 39B to 39F show luminance data of the display panel after first to fifth correction, respectively, obtained with a two-dimensional luminance meter. FIG. 40A shows a display result of the display panel before correction. FIGS. 40B to 40F show display results of the display panel after the first to fifth correction, respectively.

A comparison between the luminance data shown in FIGS. 39A to 39F and the display results shown FIGS. 40A to 40F indicates that display unevenness can be identified in more detail by obtaining the luminance data.

Figure 39B:
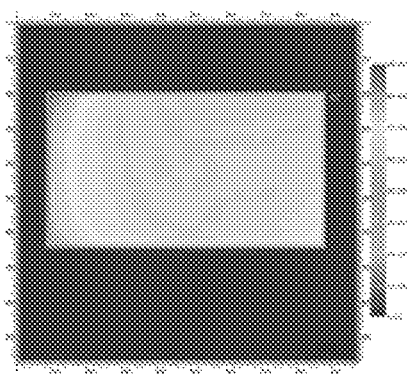
Figure 39C:
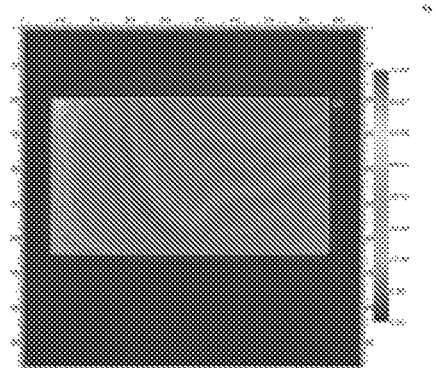
Figure 39D:
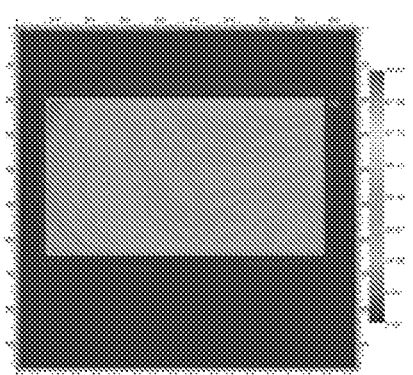
Figure 39E:
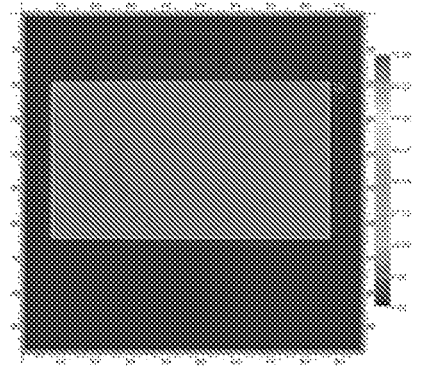
Figure 39F:
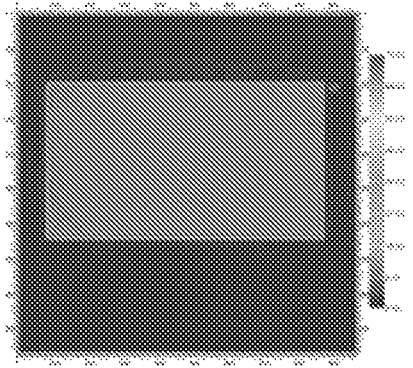
Figure 40A:
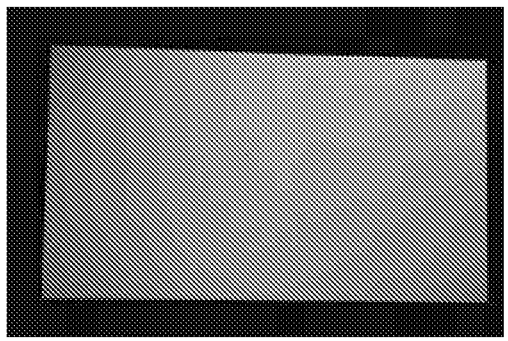
FIGS. 40A to 40F are photographs showing display results of Example 1.
Figure 40B:
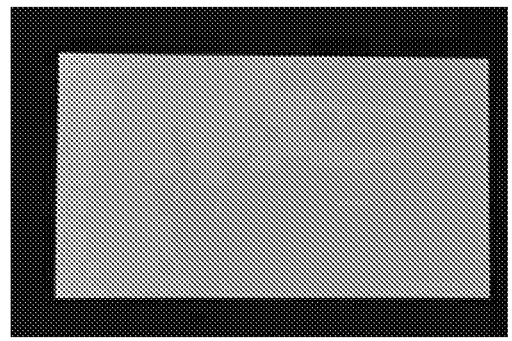
Figure 40C:
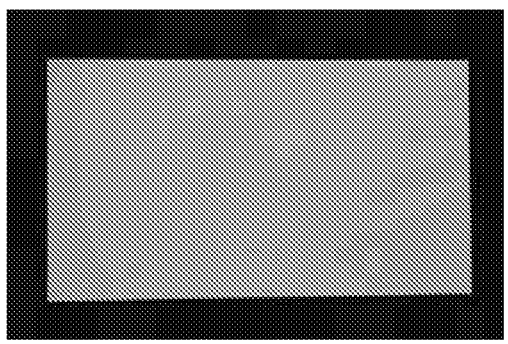
Figure 40D:
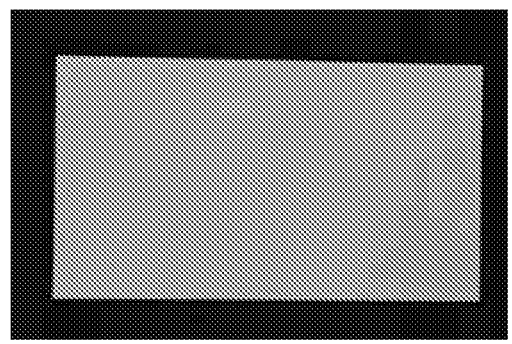
Figure 40E:
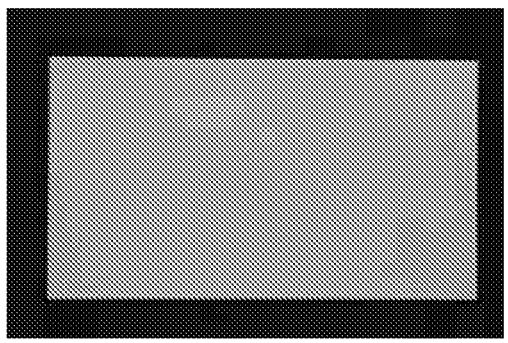
Figure 40F:
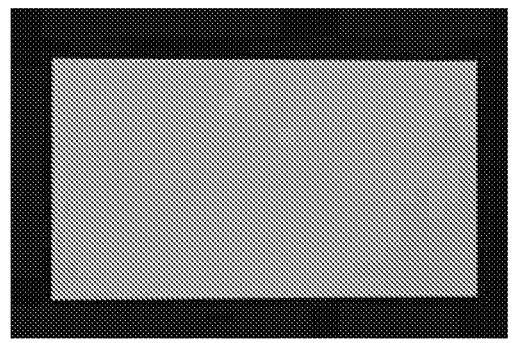

As shown in FIGS. 39A and 39B, display unevenness is reduced even after only one correction. Furthermore, as shown in FIGS. 39B to 39F, display unevenness of the display panel can be further reduced by updating the value of a correction filter repeatedly.

Example 2

In Embodiment 3, the display device including two overlapping display panels was described with reference to FIG. 35. The display device illustrated in FIG. 35 includes a circularly polarizing plate. As the viewing angle of the display device becomes larger, the circularly polarizing plate is less likely to reduce the reflection of external light. Thus, an area where the two display panels overlap with each other (also referred to as an overlapping area) is likely to be recognized by a user.

In this example, a display device including two overlapping display panels 370B in FIG. 33A and a display device including two overlapping display panels 370C in FIG. 33B were fabricated. The visibility of an overlapping area in each of the two display devices was evaluated by measuring the reflectance.

The structure of the display device of this example will be described with reference to FIG. 41A. The display device of this example is formed by overlapping two display panels so that a non-display region between display regions is made small. A circularly polarizing plate 390 is positioned on the display surface side of the two display panels. The light-transmitting layer 389 is provided between the visible light-transmitting region 72 of an upper display panel and a display portion of a lower display panel. A substrate 371a and a substrate 361b are bonded to each other with the light-transmitting layer 389 positioned therebetween.

The two display panels have flexibility. Thus, as illustrated in FIG. 41A, a region near the FPC 74a of the lower display panel can be bent so that part of the lower display panel and part of the FPC 74a can be placed under the display portion of the upper display panel adjacent to the FPC 74a. As a result, the FPC 74a can be placed without physical interference with the rear surface of the upper display panel.

Each of the display panels was formed by attaching a substrate and an element layer with a bonding layer. An element layer 153a is sandwiched between a substrate 361a and the substrate 371a through bonding layers 157, and an element layer 153b is sandwiched between the substrate 361b and a substrate 371b through the bonding layers 157. As the substrates, highly optically isotropic films were used. The element layer 153a has a region 155a including a display element and a region 156a including a wiring electrically connected to the display element. Similarly, the element layer 153b has the region 155b including a display element and a region 156b including a wiring electrically connected to the display element.

For the measurement, an LCD evaluation system (LCD-7200, produced by Otsuka Electronics Co., Ltd.) was used. As illustrated in FIG. 41B, the reflectance was measured in a state in which a floodlight 91 and a photodetector 92 were each inclined at an angle θ to the perpendicular direction of a measurement target 93. The angle θ was changed by every 10° from 10° to 70°.

Figure 41A:
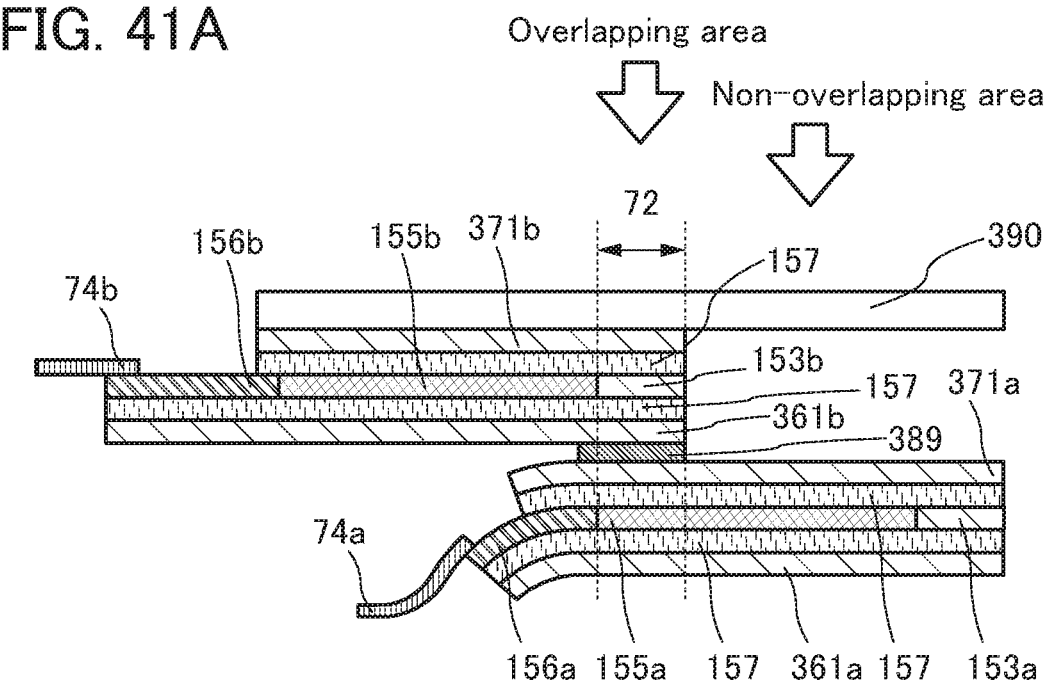
FIGS. 41A and 41B illustrate a display device of Example 2.
Figure 41B:
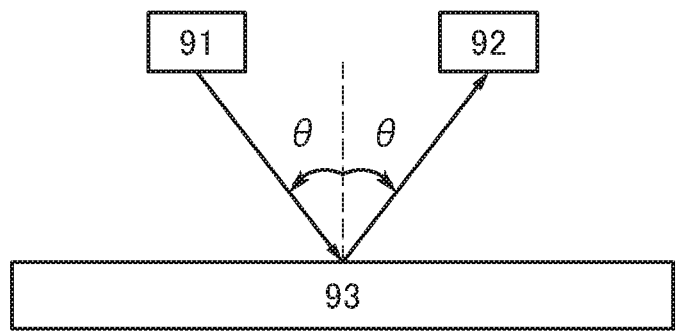

In this example, the reflectance of an area where the two display panels overlap with each other (Overlapping area) and the reflectance of an area where the two display panels do not overlap with each other (Non-overlapping area) illustrated in FIG. 41A were measured.

Figure 42A:
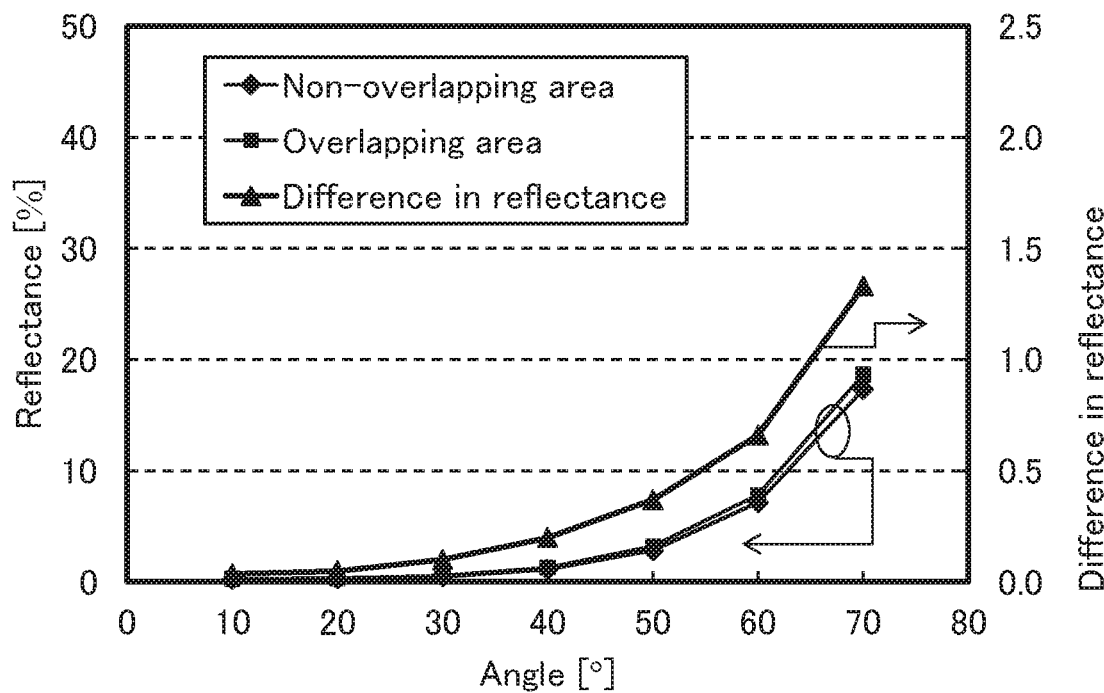
FIGS. 42A and 42B show results of Example 2.

FIG. 42A shows the measurement results of the reflectance of the display device including two overlapping display panels 370B. As shown in FIG. 42A, it was found that as the angle θ increases, the difference in reflectance between the overlapping area and the non-overlapping area increases.

Figure 42B:
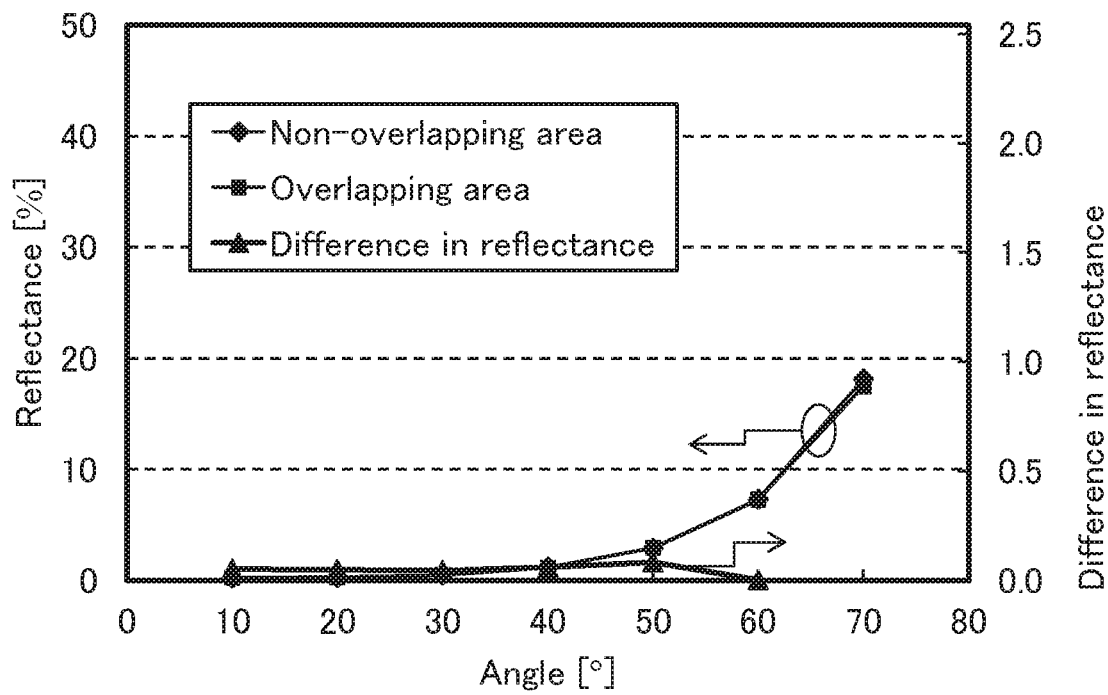

FIG. 42B shows the measurement results of the reflectance of the display device including two overlapping display panels 370C. As shown in FIG. 42B, the difference in reflectance was less than or equal to 0.1 with the angle θ ranging from 10° to 70°; therefore, the angle dependence of the difference in reflectance can be reduced. Since the display panel 370C includes a smaller number of insulating layers in the visible light-transmitting region 72 than the display panel 370B, interference of light is suppressed in the display panel 370C. Thus, the angle dependence of the reflectance of the overlapping area and the angle dependence of the reflectance of the non-overlapping area can be substantially the same. Accordingly, a display device in which a circularly polarizing plate is provided and an overlapping area is less likely to be recognized even when the viewing angle of the display device increases can be obtained.

REFERENCE NUMERALS

C11: capacitor, C21: capacitor, DD1: image data, DD2: image data, DD3: image data, DD4: image data, DP: display panel, DPa: display panel, DPb: display panel, DPc: display panel, DPd: display panel, R1: resistor, S1: region, S2: region, SD1: first image data, SD2: second image data, SD3: third image data, Tr11: transistor, Tr12: transistor, Tr21: transistor, Tr22: transistor, Tr23: transistor, U1: region, U2: region, V0: potential supply line, 10A: display system, 10B: display system, 10C: display system, 10D: display system, 10E: display system, 20: display portion, 20A: display portion, 20B: display portion, 20C: display portion, 20D: display portion, 20E: display portion, 21: pixel portion, 21A: region, 21B: region, 21C: region, 21D: region, 22: scan line driver circuit, 22A: scan line driver circuit, 22B: scan line driver circuit, 22C: scan line driver circuit, 22D: scan line driver circuit, 23: signal line driver circuit, 23A: signal line driver circuit, 23B: signal line driver circuit, 23C: signal line driver circuit, 23D: signal line driver circuit, 24: timing controller, 25: pixel, 25A: pixel, 25B: pixel, 30: signal generation portion, 30A: signal generation portion, 30B: signal generation portion, 30C: signal generation portion, 30D: signal generation portion, 30E: signal generation portion, 31: front end portion, 32: decoder, 33: processing unit, 34: receiving portion, 35: interface, 36: control portion, 40: processing unit, 41: first layer, 42: second layer, 43: third layer, 45: dividing portion, 50: arithmetic processing device, 61: image data, 61B: image data, 61G: image data, 61R:

image data, 62: pixel data, 62B: pixel data, 62G: pixel data, 62R: pixel data, 63: arithmetic data, 64: arithmetic data, 65: arithmetic data, 66: arithmetic data, 67: image data, 67B: image data, 67G: image data, 67R: image data, 67W: image data, 68: pixel data, 68B: pixel data, 68G: pixel data, 68R: pixel data, 71: pixel portion, 71*a*: pixel portion, 71*b*: pixel portion, 71*c*: pixel portion, 71*d*: pixel portion, 72: region, 72*b*: region, 72*c*: region, 72*d*: region, 73: region, 74: FPC, 74*a*: FPC, 75: terminal, 75*a*: terminal, 75*b*: terminal, 76: terminal, 76*a*: terminal, 77: power supply unit, 78: driver circuit portion, 79: display region, 81: image data, 83: arithmetic data, 85: arithmetic data, 87: image data, 91: floodlight, 92: photodetector, 93: measurement target, 102: scan line driver circuit, 103: scan line driver circuit, 111: substrate, 113: substrate, 115: pixel, 120: pixel, 121: overcoat, 125*a*: polarizing plate, 125*b*: polarizing plate, 131: coloring layer, 132: light-blocking layer, 133*a*: alignment film, 133*b*: alignment film, 141: bonding layer, 153*a*: element layer, 153*b*: element layer, 155*a*: region including a display element, 155*b*: region including a display element, 156*a*: region including a wiring, 156*b*: region including a wiring, 157: bonding layer, 162: FPC, 170: light-emitting element, 171: pixel electrode, 172: EL layer, 173: common electrode, 174: bonding layer, 175: insulating layer, 180: liquid crystal element, 181: pixel electrode, 182: common electrode, 183: liquid crystal layer, 200*a*: transistor, 200*b*: transistor, 201*a*: transistor, 201*b*: transistor, 201*c*: transistor, 201*d*: transistor, 211: insulating layer, 212: insulating layer, 213: insulating layer, 215: insulating layer, 216: insulating layer, 217: insulating layer, 218: insulating layer, 220: insulating layer, 221: conductive layer, 222*a*: conductive layer, 222*b*: conductive layer, 223: conductive layer, 225: insulating layer, 231: semiconductor layer, 232: impurity semiconductor layer, 242: connector, 251: transistor, 251*a*: transistor, 251*b*: transistor, 255: conductive layer, 301: transistor, 302: transistor, 303: transistor, 304: light-emitting element, 305: capacitor, 306: connection portion, 307: conductive layer, 311: gate insulating layer, 312: insulating layer, 313: insulating layer, 314: insulating layer, 315: insulating layer, 316: spacer, 317: bonding layer, 319: connector, 321: electrode, 322: EL layer, 323: electrode, 324: optical adjustment layer, 355: conductive layer, 361: substrate, 361*a*: substrate, 361*b* substrate, 363: bonding layer, 365: insulating layer, 367: insulating layer, 370: display panel, 370A: display panel, 370B: display panel, 370C: display panel, 370D: display panel, 370E: display panel, 370F: display panel, 371: substrate, 371*a*: substrate, 371*b*: substrate, 373: bonding layer, 375: insulating layer, 377: insulating layer, 381: λ plate, 383: linear polarizing plate, 385: support member, 387: anti-reflection member, 389: light-transmitting layer, 390: circularly polarizing plate, 411: insulating surface, 431: conductive layer, 432: semiconductor layer, 432_1: semiconductor layer, 432_2: semiconductor layer, 432*p*: semiconductor layer, 433: capacitor, 433*a*: conductive layer, 433*b*: conductive layer, 434: insulating layer, 435: impurity semiconductor layer, 436: insulating layer, 436*a*: insulating layer, 436*b*: insulating layer, 437: semiconductor layer, 438: pixel circuit, 442: display element, 444: transistor, 445: node, 446: transistor, 446*a*: transistor, 446*c*: transistor, 446*d*: transistor, 447: node, 453: opening, 484: insulating layer, 484*a*: insulating layer, 485: insulating layer, 486: conductive layer, 552: backlight unit, 562: display portion, 564: scan line driver circuit, 565: conductive layer, 5000: vehicle, 5001: display portion, 5002: dashboard, 5003: steering wheel, 5004: windshield, 5004*a*: display panel, 5005: camera, 5005*a*: camera, 5005*b*: camera, 5005*c*: camera, 5005*d*: camera, 5005*e*: camera, 5005*f*: camera, 5006: ventilation duct, 5007: display panel, 5007*a*: display panel, 5007*b*: display panel, 5007*c*: display panel, 5007*d*: display panel, 5008*a*: display panel, 5008*b*: display panel, 5008*c*: picture, 5009: display panel, 7000: display portion, 7100: television device, 7101: housing, 7103: stand, 7111: remote controller, 7200: laptop personal computer, 7211: housing, 7212: keyboard, 7213: pointing device, 7214: external connection port, 7300: digital signage, 7301: housing, 7303: speaker, 7311: information terminal, 7400: digital signage, 7401: pillar, and 7411: information terminal.

This application is based on Japanese Patent Application Serial No. 2017-125173 filed with Japan Patent Office on Jun. 27, 2017 and Japanese Patent Application Serial No. 2017-141465 filed with Japan Patent Office on Jul. 21, 2017, the entire contents of which are hereby incorporated by reference.

The invention claimed is:
1. A display system comprising:
a processing unit and a display portion;
wherein the processing unit is configured to generate second image data by using first image data,
wherein the display portion is configured to display an image on the basis of the second image data,
wherein the display portion comprises a plurality of pixels,
wherein the processing unit comprises a first layer, a second layer, and a third layer,
wherein the first image data is supplied to the first layer,
wherein the first image data contains a plurality of pieces of data,
wherein the plurality of pieces of data each correspond to any one of the plurality of pixels,
wherein the first layer is configured to generate first arithmetic data by making the number of data corresponding to one pixel larger than the number of the first image data by using the first image data,
wherein the second layer is configured to generate second arithmetic data by multiplying the first arithmetic data by a weight coefficient, and
wherein the third layer is configured to generate the second image data by making the number of data corresponding to one pixel smaller than the number of the second arithmetic data by using the second arithmetic data.

2. A display system comprising:
a processing unit and a display portion;
wherein the processing unit is configured to generate second image data by using first image data,
wherein the display portion is configured to display an image on the basis of the second image data,
wherein the display portion comprises a plurality of pixels,
wherein the processing unit comprises a first layer a second layer, and a third layer,
wherein the first image data is supplied to the first layer,
wherein the first layer is configured to generate first arithmetic data by using the first image data,
wherein the first layer is configured to supply the first arithmetic data to the second layer,
wherein the second layer is configured to generate second arithmetic data by using the first arithmetic data and a weight coefficient,
wherein the second layer is configured to supply the second arithmetic data to the third layer,
wherein the third layer is configured to generate the second image data by using the second arithmetic data, wherein the first image data contains a pieces of first data corresponding to one pixel, where a is an integer greater than or equal to 1, wherein the first arithmetic data contains b pieces of second data corresponding to one pixel, where bis an integer greater than a, wherein the weight coefficient contains b pieces of third data corresponding to one pixel, wherein the second arithmetic data contains b pieces of fourth data corresponding to one pixel, wherein the second image data contains c pieces of fifth data corresponding to one pixel where e is an integer less than b, and wherein the fourth data is a product of any one piece of the second data and any one piece of the third data.

3. The display system according to claim 1, wherein the display portion further comprises a first display region, a second display region, a first driver circuit, and a second driver circuit, wherein the first driver circuit is configured to drive the first display region, and wherein the second driver circuit is configured to drive the second display region.

4. The display system according to claim 1, wherein the processing unit is configured to correct only data corresponding to part of the pixels among the first image data.

5. The display system according to claim 1, wherein the processing unit is configured to generate the second image data by using a neural network.

6. The display system according to claim 1, wherein the processing unit further comprises a neural network circuit.

7. An electronic device comprising:

the display system according to claim 1, and at least any one of an antenna, a battery, a housing, a camera, a speaker, a microphone, and an operation button.

8. A data processing method comprising the steps of:

obtaining first luminance data based on an image displayed on a display device by inputting first image data to the display device; and updating a value of a correction filter for correcting image data by using the first luminance data, wherein the first image data contains coordinate data and gray level data of a first color, wherein the gray level data of the first color comprises a plurality of gray level values corresponding to different coordinates, and wherein when the number of gray levels expressed by the gray level data of the first color is k bits, where k is an integer greater than or equal to 2, the plurality of gray level values are each greater than or equal to $2^{k-2}$ and less than or equal to $3 \times 2^{k-2}$.

9. The data processing method according to claim 8, wherein the plurality of gray level values are the same value.

10. The data processing method according to claim 8, wherein the first image data further contains gray level data of a second color and gray level data of a third color, wherein the gray level data of the second color comprises a plurality of gray level values corresponding to the different coordinates, wherein the gray level data Hof the third color comprises a plurality of gray level values corresponding to the different coordinates, and wherein the plurality of gray level values of the gray level data of the second color and the plurality of gray level values of the gray level data of the third color are 0.

11. The data processing method according to claim 8, wherein the fast image data further contains gray level data of a second color and gray level data of a third color, wherein the gray level data of the second color comprises a plurality of gray level values corresponding to the different coordinates, wherein the gay level data of the third color comprises a plurality of gray level values corresponding to the different coordinates, wherein when the number of gray levels expressed by the gray level data of the second color is m bits, where m is an integer greater than of equal to 2, the plurality of gray level values of the gray level data of the second color are each greater than or equal to $2^{m-2}$ and less than or equal to $3 \times 2^{m-2}$, and wherein when the number of gray levels expressed by the gray level data of the third color is n bits, where n is an integer greater than or equal to 2, the plurality of gray level values of the gray level data of the third color are each greater than or equal to $2^{n-2}$ and less than or equal to $3 \times 2^{n-2}$.

12. The data processing method according to claim 11, wherein the plurality of gray level values of the gray level data of the second color are the same, and wherein the plurality of gray level values of the gray level data of the third color are the same.

13. The data processing method according to claim 8, wherein the first luminance data is obtained with a two-dimensional luminance meter.

14. A display system comprising:

a processing unit and a display portion, wherein the processing unit is configured to generate output data by using image data and a correction filter whose value is updated by the data processing method according to claim 8, and wherein the display portion is configured to display an image on the basis of the output data.

15. A data processing method comprising the steps of:

obtaining first luminance data based on an image displayed on a display device by inputting first image data to the display device;

updating a value of a correction filter for correcting image data by using the first luminance data;

generating second image data by correcting the first image data by the correction filter Whose value is updated by using the first luminance data;

obtaining second luminance data based on an image displayed on the display device by inputting the second image data to the display device; and updating a value of the correction filter by using the second luminance data, wherein the first image data contains coordinate data and gray level data of a first color, wherein the gray level data of the first color comprises a plurality of gray level values corresponding to different coordinates, and wherein when the number of gray levels expressed by the gray level data of the first color is k bits, where k is an integer greater than or equal to 2, the plurality of gray level values are each greater than or equal to $2^{k-2}$ and less than or equal to $3 \times 2^{k-2}$.

16. The data processing method according to claim 15, wherein the plurality of gray level values are the same.

17. The data processing method according to claim 15,
wherein the first image data further contains gray level data of a second color and gray level data of a third color,
wherein the gray level data of the second color comprises a plurality of gray level values corresponding to the different coordinates,
wherein the gay level data of the third color comprises a plurality of gray level values corresponding to the different coordinates, and
wherein a plurality of gray level values of the gray level data of the second color and a plurality of gray level values of the gray level data of the third color are 0.

18. The data processing method according to claim 15,
wherein the first image data further contains gray level data of a second color and gray level data of a third color,
wherein the gray level data of the second color comprises a plurality of gray level values corresponding to different coordinates,
wherein the gray level data of the third color comprises a plurality of gray level values corresponding to different coordinates,
wherein when the number of gray levels expressed by the gay level data of the second color is m bits, where in is an integer greater than of equal to 2, the plurality of gray level values of the gray level data of the second color are each greater than or equal to $2^{m-2}$ and less than or equal to $3\times2^{m-2}$, and
wherein when the number of gray levels expressed by the gray level data of the third color is n bits, where n is an integer greater than or equal to 2, the plurality of gray level values of the gray level data of the third color are each greater than or equal to $2^{n-2}$ and less than or equal to $3\times2^{n-2}$.

19. The data processing method according to claim 17,
wherein the plurality of gray level values of the gray level data of the second color are the same, and
wherein the plurality of gray level values of the gray level data of the third color are the same.

20. The data processing method according to claim 15,
wherein the first luminance data is obtained with a two-dimensional luminance meter.

21. A display system comprising:
a processing unit and a display portion,
wherein the processing unit is configured to generate output data by using image data and a correction filter whose value is updated by the data processing method according to claim 15, and
wherein the display portion is configured to display an image on the basis of the output data.

* * * * *